(12) United States Patent
Bashen et al.

(10) Patent No.: US 6,985,922 B1
(45) Date of Patent: Jan. 10, 2006

(54) METHOD, APPARATUS AND SYSTEM FOR PROCESSING COMPLIANCE ACTIONS OVER A WIDE AREA NETWORK

(75) Inventors: G. Steven Bashen, Houston, TX (US); Janet Emerson Bashen, Houston, TX (US); Marjana Lindsey Roach, Houston, TX (US); Donnie Moore, Deluth, GA (US)

(73) Assignee: S.J. Bashen, Inc., Houston, TX (US)

( * ) Notice: Subject to any disclaimer, the term of this patent is extended or adjusted under 35 U.S.C. 154(b) by 765 days.

(21) Appl. No.: 10/028,235

(22) Filed: Dec. 21, 2001

(51) Int. Cl.
*G06F 15/16* (2006.01)
*G06F 7/00* (2006.01)
(52) U.S. Cl. .................. 709/203; 707/10; 707/104.1
(58) Field of Classification Search ............ 709/223, 709/201, 203, 219, 236, 237; 707/10, 104.1; 715/500.1, 501.1; 717/103
See application file for complete search history.

(56) References Cited

U.S. PATENT DOCUMENTS

| | | | |
|---|---|---|---|
| 6,044,409 A * | 3/2000 | Lim et al. | 719/315 |
| 6,076,072 A * | 6/2000 | Libman | 705/36 R |
| 6,591,289 B1 * | 7/2003 | Britton | 709/203 |
| 6,859,806 B1 * | 2/2005 | Kamarei et al. | 707/10 |

* cited by examiner

*Primary Examiner*—Bunjob Jaroenchonwanit
*Assistant Examiner*—J. Bret Dennison
(74) *Attorney, Agent, or Firm*—Mark A. Oathout

(57) ABSTRACT

The method, apparatus and system are provided for obtaining information regarding compliance with local laws via client computers to upload information to a centralized server preferably over a wide area network. The data is obtained through interaction with a client device and the data is stored on a server. The server has access to a database engine which provides triggering and alarming capabilities for the tracking of applicable dates and events. The server system is provided with software and/or hardware necessary to perform manipulation of the data provided by the client and enable reconfiguration of the data for investigative and reporting purposes.

72 Claims, 23 Drawing Sheets

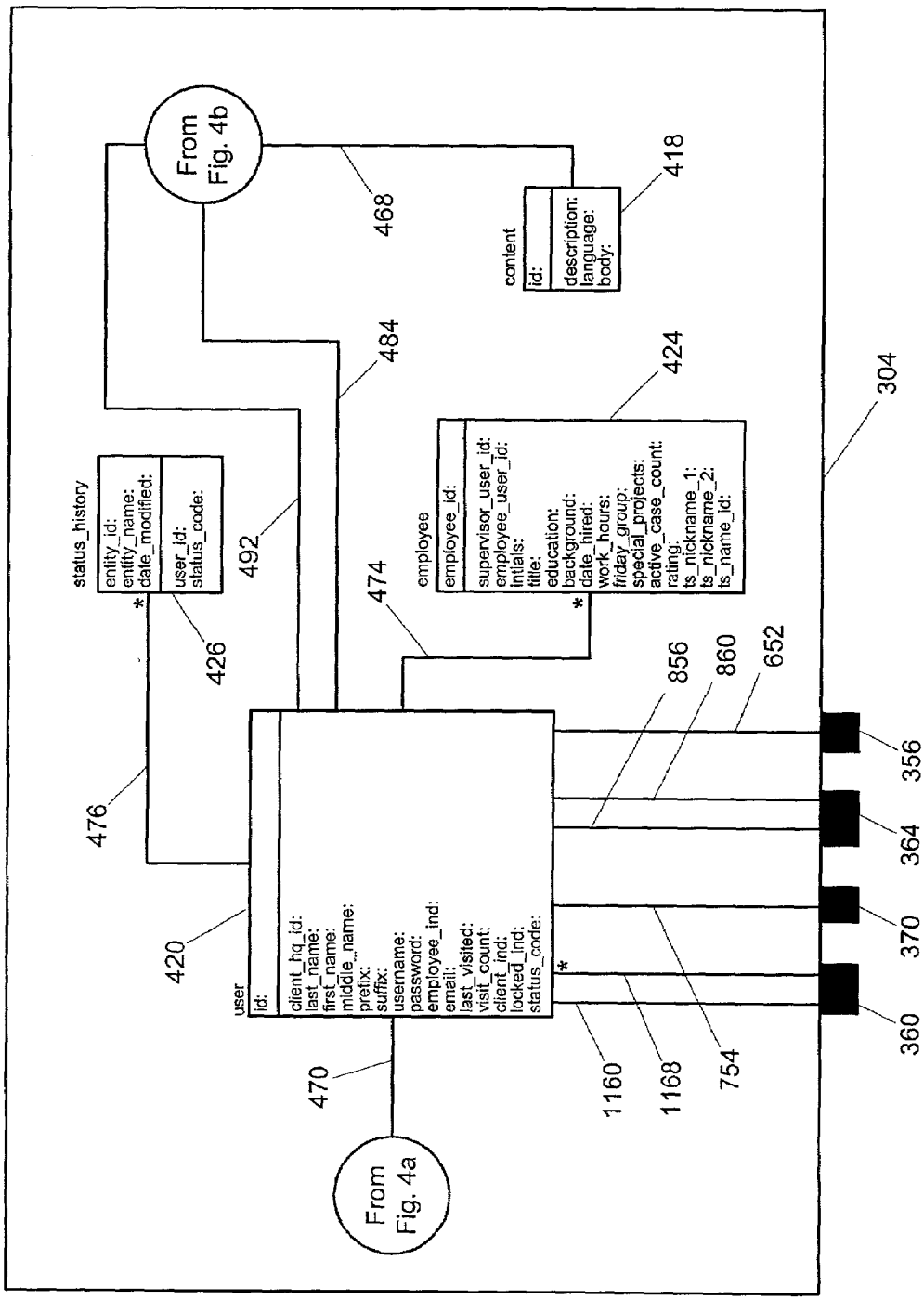

METHOD, APPARATUS AND SYSTEM FOR PROCESSING COMPLIANCE ACTIONS OVER A WIDE AREA NETWORK

TECHNICAL FIELD OF THE INVENTION

This invention relates in general to document generation and management. More particularly, the present invention is related to the solicitation, storage, manipulation, and retrieval of data over a wide area network in the form of documentation in a format that can be submitted for compliance with federal, state and local equal employment opportunity and fair employment practices laws.

BACKGROUND OF THE RELATED ART

Federal and state laws require that public and private employees have an opportunity to complain of discrimination and harassment. With the passage of the first civil rights and employment laws in the mid 1960's and until the mid 1990's, such equal employment opportunity ("EEO") complaints were generally in the form of Charges of Discrimination filed with the Equal Employment Opportunity Commission ("EEOC") or a Fair Employment Practices Agency ("FEPA" or "FEP Agency") or Formal Agency Charges filed with the employee's public sector employer agency. In the late 1990's, the United States Supreme Court mandated that public and private employers provide a mechanism for employees to file informal or internal complaints of discrimination. Most of the employers that implemented a complaint mechanism did not provide a formalized process or means to intake, track or store the complaints.

Currently, an employer has a legal obligation under various state and federal laws and regulations, including EEOC Guidelines and Management Directive No. 110, to investigate and respond to formal charges of discrimination. An employer also has a legal obligation to investigate and respond to internal complaints of fair employment practice issues. Public and private employers must also be able to track complaints, the responses and their respective outcomes. Employers have been encouraged by the courts to provide independent investigations and tracking of such complaints.

In the past, these EEO complaints were received in a typewritten or handwritten form, and all complaints were processed manually. The manual processing of the application is a tedious, labor-intensive and time-consuming operation. Moreover, the requiring of filing either by hand or in typewritten form is cumbersome for the employees. Manual processing of paper documents is prone to loss through mis-filing or other misadventure. In addition to the potential loss of the documents was the potential dissemination of personal information and possible violation of privacy laws.

The advent of the Internet has enabled many users to have access to remote servers and databases via the World Wide Web ("WWW") using standard web browsers on client machines that interact with web servers and other processing capabilities at the remote site. To date, however, no EEO compliance system has utilized the capabilities of the Internet. There is, therefore, a need in the art for an EEO compliance mechanism that is capable of utilizing a wide area network such as the Internet to enhance privacy, to automate routine tasks and to enable the handling of EEO that is applicable to private and public sector employers and governmental compliance entities.

SUMMARY OF THE INVENTION

In accordance with the present invention, the disadvantages and problems associated with the prior art are solved by providing, in a computer system, a group of modules, each containing a set of objects that interact together to form a flexible and scalable framework for obtaining, storing, sorting, retrieving and implementing, in an automated fashion, information regarding equal employment opportunity claims. The present invention enables various users, such as complainants, employers, and consultants to upload, download, or modify information that is kept at a centralized location in order to facilitate the processing of claims.

The present invention includes a computer system having at least one server that is connected to one or more networks, such as a virtual private network, or a wide area network such as the Internet. Users can use a wide variety of client devices, such as personal digital assistants, telephones, facsimile machines, and personal computers to interact with the present invention over standard network protocols. Voice or facsimile information is preferably digitized to facilitate storage and manipulation of the data. For instance, voice transmissions (such as over a telephone connection) can be digitized with Voice over IP ("VoIP") technologies and the voice signals translated into text files by voice recognition software that is executing on the server. Similarly, optical character recognition ("OCR") software can be used by the servers of the present invention to recognize the words in the facsimile and translate them into text information that can facilitate searching and retrieving. Other information, such as web forms and other files, can be stored in the normal fashion. In the preferred embodiment, all of this information can be stored, searched, and retrieved by authorized personnel in a secure manner. Other aspects of the present invention enable the information contained within the system to be reported, either in paper form, or preferably, in electronic form in order to facilitate automatic filing and reporting to governmental agencies.

Other features of the present invention will become apparent upon inspection of the following specification and the drawings.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
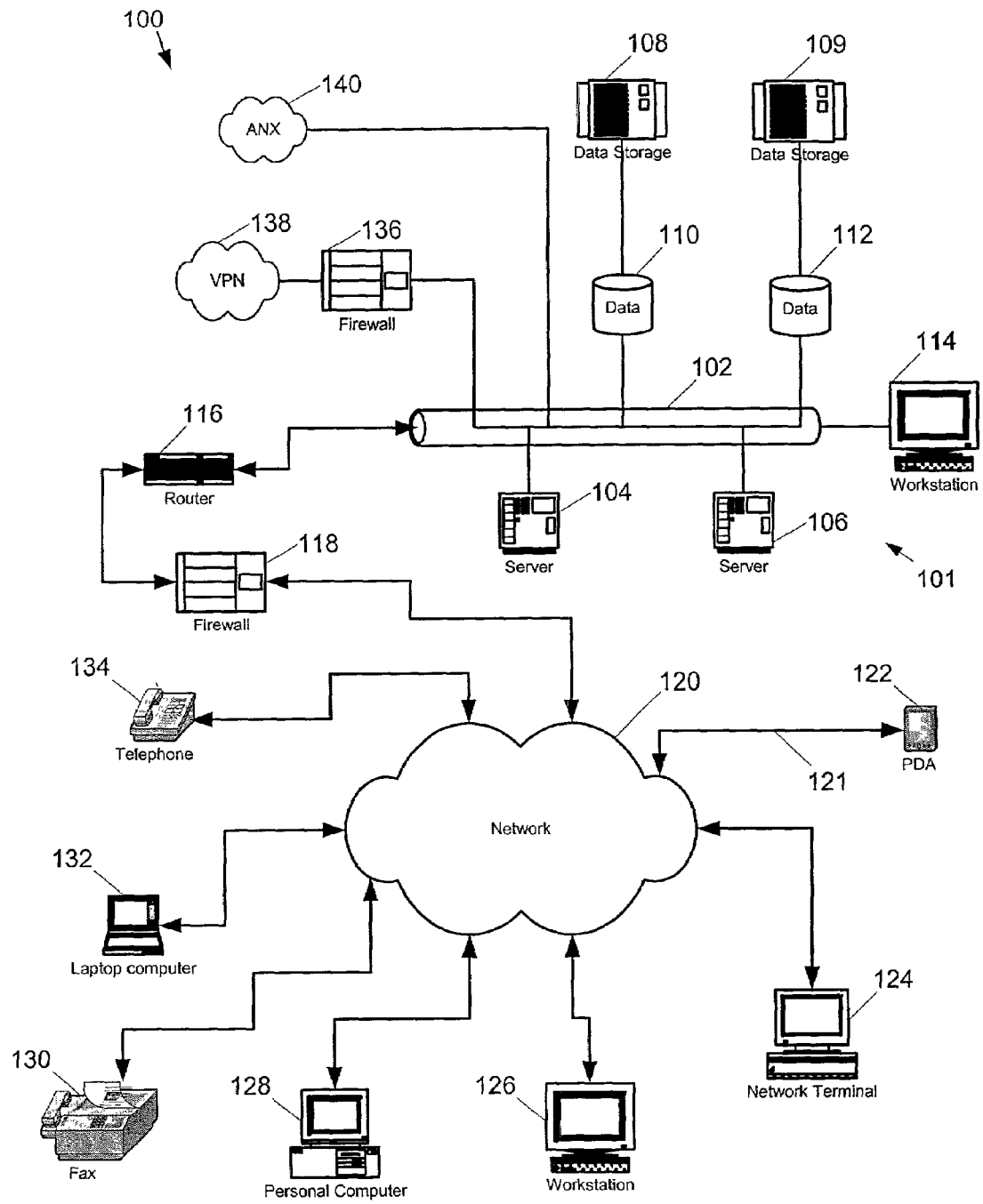
FIG. 1 is a block diagram illustrating the network of the present invention.

The present invention overcomes the problems inherent in the prior art by providing a comprehensive and integrated method, apparatus and system for handling complaints under the various EEO regulations. Specifically, the present invention enables employees of companies to file discrimination complaints, have those complaints investigated, and have the required documents generated in a format required for filing with local authorities. The present invention is useful for complying with various local, state, and national (federal) laws as well as the formal and informal requirements thereof. This enables the present invention to handle internal complaints as well as formal charges by various jurisdictions under, for example, EEOC or FEP agency regulations.

The present invention also provides the capability of compiling data into a database from many organizations regarding their respective EEO compliance instances and performance. This information can be queried to generate comparisons of, for example, a particular company, vis-à-vis, companies of comparable (or dissimilar) size and/or industry. Other comparisons can be made within the same or multiple organizations regarding compliance within specific jurisdictions or geographic areas, and the like, or for specific demographic groups and/or chronological time periods.

As the present invention is best utilized via a web-based paradigm, the present invention is also useful for storing frequently asked questions, and for providing interactive consulting via email; Internet Relay Chat ("IRC"), a system for chatting online; channels, I Seek You ("ICQ"), a program that lets a user know when friends and contacts are online.) messaging, streaming video and streaming audio, VoIP, interactive video, static web pages, and other means of communicating over a wide area network such as the Internet. The present invention can also be equipped with a rules module that can accommodate difference in local, state, and federal laws so that answers to standard questions can be readily tailored to the specific jurisdiction of the user. Similarly, the present invention can have flags and switches that are responsive to language settings of the user's interactive software (such as a browser) so that the user automatically views the resultant documents from the present invention in a language familiar to the user. In addition, the present invention can also be utilized for creating and maintaining a list group or news group of information useful to users of the present invention. The email list groups, web logs, and/or news groups of the present invention may be moderated, although this is an optional feature.

The present invention contains a number of technical terms, an understanding of which is useful to the practitioner and is made possible with the following glossary.

Actor: Anyone or anything with behavior. An actor may, for example, be a mechanical system, a computer system, a person, an organization, or any combination thereof.

Artifact: A product of the use case, e.g., document.

Basis: The reason the Complainant believes he/she has been treated differently—e.g., sex, race, age, disability, religion, and retaliation. In other words, what protected category the individual is complaining about—e.g., sex, race, age, national origin, etc.

Case: The Complaint or Charge(s) filed by one individual that will be assigned to a Consultant. A Case may encompass one or more claims.

Cause Finding: A determination by the EEOC or FEP Agency that the employer acted unlawfully.

Charge of Discrimination (Charge): A document filed by a Complainant with an EEOC, state or local agency alleging unlawful treatment by his/her employer.

Charging Party (CP): An employee who files a charge with the EEOC or FEP Agency against his/her employer. A Charging Party is synonymous with a Complainant.

Claim: (1) A charge or internal complaint; or (2) a claim filed by an insured, broker or insurance carrier. There may be more than one claim associated with an EEO case. Insurance claims are separate and distinct and the Case/claim association does not apply.

Complainant: An employee who files an internal complaint with his/her employer.

Consultant: A person who will investigate a claim, prepare a response to the claim, and manage the claim.

Data Item: A reference to either a specific piece of data (e.g., a phone number) or a more generalized set of data (e.g., contact information). These data are used to track interaction with the database at a high level.

Deductible: The amount that must be paid by an insured before insurance proceeds are paid.

Director: A person who supervises and who otherwise serves as a resource for one or more Consultants. A Director may investigate discrimination complaints and also prepare charge responses and manage claims.

Dismissal: A notice of rights issued by EEOC or FEP Agency when (1) requested by Charging Party; (2) the Commission is unable to establish a violation of the statutes; (3) conciliation has failed; or (4) for other reasons.

Equal Employment Opportunity Commission (EEOC): The federal government agency responsible for enforcing federal civil rights and employment laws. The EEOC accepts discrimination charges, investigates and disposes of these by dismissal, cause finding, conciliation/settlement, or lawsuit.

Exhibits: With regard to the process models, this term refers to sample work product. Exhibits are also relevant documents attached to a Fact Finding Report, Internal Complaint Memorandum or Position Statement.

Exit Interview: Consultant's final telephone call to Complainant notifying him/her of the investigation findings. Conducted primarily for internal complaints.

Extended (or Extension) Use Cases: A Case that is identical to an Extension, but stands on its own. These Cases 'interrupt' the main activity and can occur at any time in a given scenario (similar to spell checking a word processing document).

Extension: A scenario fragment that starts upon a particular condition in another scenario.

External Complaint: A complaint made by an employee to the EEOC or an FEP Agency.

Fact-Finding Report (FFR): Report prepared for the client by a Consultant. This type of report is prepared when a charge is filed.

Fair Employment Practices (FEP): Various federal, state and local laws and regulations regarding fair employment.

Fair Employment Practices Agency (FEPA): State or local equivalent of the EEOC.

File History (FH): A brief investigation history prepared by a Consultant for placement in Case File.

Final Determination: The EEOC or FEP Agency's decision about (1) whether there is cause to believe the employer violated the statute or (2) whether the charge should be dismissed.

Goal: The goal to be achieved at the conclusion of the Use Case. A goal is tested by answering the question: "Can the primary actor go away happy after having done this?"

Guarantee: The fewest promises the system makes to the stakeholder(s), particularly when the primary actor's goal cannot be delivered.

Internal Complaint Memorandum (ICM): Report prepared for the client by Consultant. This type of report is prepared when an internal complaint is filed.

Internal Complaint: A complaint made by an employee to his/her supervisor, HR department, by online submission, by facsimile, or via toll-free reporting number.

Issue: The employee relations practices about which the complainant/charging party is complaining about, e.g., failure to hire, discipline, etc. The basis and issue apply to the claim.

Parameterized Use Case: A Use Case which establishes a common scenario (e.g., finding, creating). The calling Use Case provides the data (or 'parameters') needed to complete the action.

Position Statement (PS): The employer's response to the Charge of Discrimination, which is prepared by the Consultant and is authorized for submission by the client's designee.

Post-Condition: A condition that must be true after the Use Case is executed. This differs from a guarantee in that successful completion of the Use Case has occurred.

Pre-Condition: A condition that must be true before the Use Case is executed.

Reconsideration: A written request by a Consultant urging the EEOC or the FEP Agency to overturn a cause finding.

Request for Information (RFI): Either (1) one or more documents and/or other information requested by a Consultant intended for a client or client's contact; or (2) a formal request for one or more documents from the EEOC, state or local Commission.

Respondent: The complaining party or charging party's employer.

Reports: (1) The work product or result of the investigation; or (2) the information provided as a result of database inquiry.

Scenario: A sequence of actions and interactions that occurs under certain conditions.

Stakeholder: An external actor who has a vested interest in the behavior of the system and is entitled to have its interests protected by the system. Satisfying the interests of a stakeholder requires the system to take specific actions.

Standard Industrial Classification (SIC) Code: A classification system for categorizing industries.

State or Local EEO or Human Rights Commission (FEP Agency): A state or local government agency responsible for enforcing state or local civil rights and employment laws. The FEP Agency accepts discrimination charges, investigates and disposes of these by dismissal, cause finding, conciliation/settlement or lawsuit.

Status Reports: (1) A Consultant's list of Cases with status description for each Case; or (2) a report for the client listing each Case and its status.

Subfunction Level: Low-level goals required to carry out user goals. Subfunction levels encapsulate complex calculations, business logic, or other steps that accomplish the user goal.

Submit Reports: Submission of appropriate reports (typically based on the type of Complaint).

Summary Level: A high-level use case that involves multiple user goals. Summary-level cases show the context in which the user goals operate.

Types of claims: (1) an internal complaint; or (2) an external charge; or (3) an attorney demand letter.

User Level: The goal that the primary actor has in trying to get work done or the one the user has in using the system. See 'Goal'.

Witness Interview: An interview with witnesses conducted by a Consultant; the interview is conducted via telephone or in-person.

The present invention can be implemented on a remote server system, preferably interconnected with a wide area network such as the Internet. Other wide area networks, virtual private networks and other interconnection mechanisms can be utilized with the present invention without departing from the scope and spirit of the appended claims.

In general, the present invention facilitates the gathering, storing, dissemination, and analysis of information. Specifically, information that is gathered from voice via the network communication (e.g., the WWW, email, IRC, etc.), facsimile, telephone, and/or paper is preferably digitized and combined with other digitally-received information. Once received, the information can be tagged, categorized, and stored within a database for analysis, processing, and retrieval. Digitization of analog or paper information can be through standard techniques, including, but not limited to, analog-to-digital ("A/D") conversion, voice recognition, or OCR technologies.

The present invention is intended to be implemented on a wide area network such as the Internet. Various security mechanisms can be implemented in conjunction with the present invention, such as separate (or combined) authentication and authorization procedures. Alternatively, the present invention may be implemented on a local area network that can be separated from unsecured networks by one or more firewalls.

The system of the present invention is illustrated in FIG. 1. Specifically, the server portion of the application is built around local area network 101 through the network connection 102 which may include, but is not limited to, an Ethernet connection, a star configuration, a hub and spoke configuration, a token ring configuration or any other useful network interface connection. The system 100 preferably operates upon an agreed-upon communication protocol, such as, for example, Transmission Control Protocol/Internet Protocol ("TCP/IP").

One or more servers 104 and 106 are connected to the local area network 101 by the network connection 102. Similarly, one or more disk arrays 108 and 109 are used to store application specific information for the databases 110 and 112, respectively, as shown in FIG. 1. A network control station, such as workstation 114, can control the local area network 101. The router 116 can optionally be used for optimizing conductivity between the servers (104 and 106), and database servers (110 and 112), as well as the workstation 114. One or more firewalls 118 and 136 may optionally be placed onto the network for protection against viruses, worms, trojans, and other malicious activities. Optionally, other networks, such as the Virtual Private Network ("VPN") 138 may be connected to the local area network 101 through network connection 102 via the optional firewall 136. Similarly, other networks, such as Automotive Network eXchange ("ANX") 140 may be connected to the local area network 101 at the network connection 102.

The local area network 101 can be connected through, for example, router 116 and firewall 118 to the network 120. The network 120 is typically a wide area network such as the Internet. However, alternate embodiments of the present invention can utilize a VPN 138, an ANX 140, a frame relay network (not shown), or other combinations of local area and wide area networks 120 to which other client computers may become connected to the local area network 101. The network 120 can provide interconnectivity to the local area network 101 to, for example, personal digital assistants 122 via communication channel 121, as illustrated in FIG. 1. The communication channel 121 can encompass a wide variety of mechanisms including infrared, telecommunications, cable, fiber optic, Ethernet, optic, Bluetooth, wireless access protocol ("WAP"), 802.11, frame relay, fiber channel, and any other mechanism capable of transmitting analog and/or digital signals along a network. Other client devices, such as network terminals 124, workstations 126, personal computers 128, facsimile machines 130, laptop computers 132 and telephones 134, are similarly connected to the network 120. Telecommunications connectivity can be, for example, with VoIP in order to handle, for example, facsimile and telephone transmissions. All that the network 102 needs to facilitate is the communications between the client device and the network 102.

It is envisioned that all communication to the local area network 101 will be in digital form using a common protocol, such as, for example, TCP/IP. This includes, but is not limited to, the client devices connected to the wide area network 120, or through other networks such as VPN 138 and ANX 140. For instance, request by clients through telephones (one of the many client devices) would be translated into, for example, VoIP and transmitted to one of the servers 104 or 106 for processing by the present invention. Similarly, hypertext transfer protocol ("HTTP") requests from a client's web browser are handled in the normal fashion. Facsimile messages from, for example, facsimile machines 130 can also be digitized and processed by the servers 104 and 106. The servers may employ, for example, character recognition software and/or hardware to extract the information from the facsimile, or simply to store the image or information in the storage arrays 108 and/or 109 through the database engines 110 and/or 112.

The storage devices 108 and 109 can be of any applicable kind, such as a disk drive, optical storage, tape, or other device. While only one storage device is necessary, it is preferable to have multiple storage devices, or an array of storage devices, in order to ensure high availability of the information stored therein.

The databases 110 and 112 can be relational, object, object-relational database, or other type. The specific type of database used is not important as long as the information contained therein can be mapped to the objects used to manage the information (as described below). While a single database engine/application can be used, it is preferable to utilize multiple database engines in order to balance the loading, provide higher availability, and enable the efficient scaling of the present invention so that large numbers of people can utilize its services.

The servers 104 and 106 can be of any suitable variety that can handle the expected user load. In the preferred embodiment of the present invention, there are multiple servers 104 and 106. The servers are constructed and arranged to service a wide variety of requests, such as web browsing and form filing, email, voice, facsimile, and other tasks associated with communication of information from users on disparate (and/or remote) client devices. Specifically, the servers are expected to have information uploaded to them from users via client devices, or to provide information in the form of a download to the users, or to facilitate the searching and manipulation of the information associated with the various cases.

Multiple databases may be subsumed into servers. For example, it is contemplated that an accounting function may include a relational database within a larger software process to store data related to accounting. Accounting software programs, such as TIMESLIPS, manufactured by Sage U.S. Holdings, Inc. of Dallas, Tex., employ application programming interfaces ("API") that can be used by the present invention to store and to retrieve accounting data. The accounting data so obtained (or provided) is mapped to/from one of the objects of the present invention, typically from one of the objects in the payment module (see the module and object descriptions provided below and in FIGS. 3 and 7).

Figure 2:
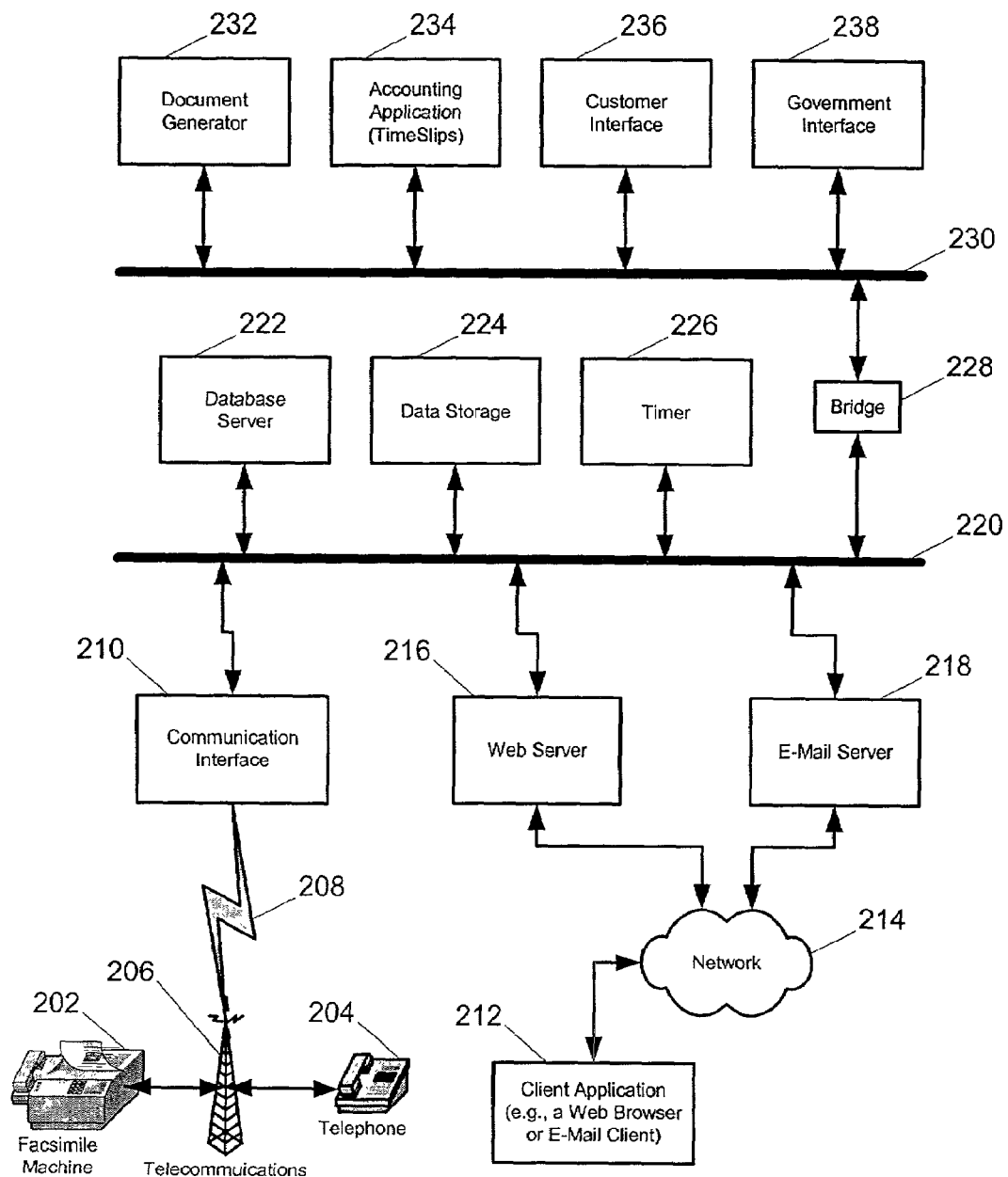
FIG. 2 is a block diagram illustrating the processes of the present invention.

FIG. 2 illustrates the various processes and interfaces of the present invention. The present invention is composed of one or more software processes running on a hardware platform. The specific hardware platform is unimportant, as long as it provides sufficient capacity for the desired tasks. Moreover, the following processes need not be implemented in software; instead, they may be implemented in hardware on, for example, application specific integrated circuits ("ASICS"). Similarly, the processes of the present invention may be implemented on a combination of hardware and software and on one or more central processing units ("CPUs") on one or more computers. The present invention may be implemented as a standalone software program that can be purshased as a unit and installed at the operator's site. The present invention is also amenable to being utilized as an application service provider configuration, wherein the organization that runs the present invention would be separeate from the organization that utilizes the present invention.

Attention is directed to FIG. 2, wherein several of the processes are illustrated. The processes are connected to one or more data busses 220 and 230 that enable information to be shared between processes. The various information bridges 220 and 230 can be connected directly, or they may be interconnected through, for example, bridge 228 as illustrated in FIG. 2. The bridge 228 may facilitate, for example, the communications between disparate CPU's and/or disparate computer servers and thus allow for the scalability of the present invention to meet user demands.

In this example, the information bus 220 is operatively connected to one or more communication processes, namely, communication interface 210, web server 216, and email server 218. Additional processes, such as IRC chat, etc., may also be operatively connected to the information bus 220 to enable the present invention to accept or transmit information from/to particular client devices. The communication processes are themselves operatively connected to a preexisting communications infrastructure. For example, the communication interface 210 is operatively connected to the telecommunications network 206 so that client devices, such as facsimile machine 202 and telephone 204 may communicate with the present invention. Similarly, the web server 216 and the email server 218 are operatively connected to the network 214, which, in turn, is connected to the client devices and their attendant client applications 212, such as a web browser or email client. It is contemplated that some or all of the users of the present invention, such as Complainants, Consultants, clients, private sector and public sector clients, insurance carriers and all other clients, government contacts, and others will access information or be provided with reports and other information in the fashion outlined above. In short, the users of the present invention can include the Complainant, members of the operating organization, employees and/or officers of the client, and individuals associated with one or more government agencies.

The present invention utilizes a set of one or more processes for handling the input, pre-processing, processing, post-processing, storing, and/or dissemination of information. In the preferred embodiment of the present invention, a database server 222 is operatively connected to the information bus 220. Similarly, a data storage device/process 224 is also operatively connected to the information bus 220, as illustrated in FIG. 2. A timer process 226 is provided for issuing time-based signals to the various devices/processes illustrated in FIG. 2 so that certain events, such as time-of-input from a client device, or the issuance of a database trigger or batch job, may be initiated automatically.

The present invention may also implement specific interfaces for customers and/or government agencies. Specifically, the customer interface 236 and the government interface 238 are processes that are tailored for the exchange of information with the specific organization and the present invention. For example, the customer interface 236 can provide a first set of functionality, such as access to the complaint, and documents related to the customer's side of the case. Similarly, an interface can be provided for the Complainant, which would limit access to only that information provided by the Complainant. A government interface 238 can be provided with yet another set of capabilities that allows access to some (or all) of the documents from both the customer and the Complainant, as well as documents held or utilized only by the government agency. Moreover, for each organization (e.g., customer or government), different levels of access to information can be provided that are tailored to specific individuals within that organization. This is accomplished by recording the role that the individual has within the organization, and thus his or her level of access to information stored/received/generated by the present invention.

A document generator process 232 is used for creating new documents, or otherwise governing the storing, searching, indexing and/or retrieval of existing documents. The documents so generated, stored, or retrieved can be transmitted on the information busses 220 and 230 to the other processes or to client devices and client applications through the interfaces, as illustrated in FIGS. 1 and 2. For example, a document may be requested via a web request from a client application 212 that is received over the network 214 to the web server 216, which then transmits the request to the document generator 232. The request may be to transmit a document to a government agency. Consequently, the document generator 232 retrieves the document and forwards the document to the government interface 238 via information bus 230. The government interface process 238 would then determine which government agency should receive the document and how best to transmit it (e.g., email, telephone, facsimile, etc.). The government interface process 238 could, for example, transmit the document to the communication interface 210 for transmission to a facsimile machine 202 via telecommunications network 206.

The present invention may also be equipped with access to an accounting application 234 that is operatively connected to one of the information busses, such as information bus 230. The accounting application 232 provides a handy mechanism for performing common functions (such as accounting) that are not unique to the present invention. Other third-party software modules (or processes), such as timekeeping, inventory control, and the like, may be similarly connected to the present invention.

A detailed discussion of the data model, as well as the operation of the present invention, is provided below.

The Data Model

The data model of the present invention is used to implement the method of the present invention (discussed below). Specifically, the present invention is a computer network that is composed of one or more client devices that are operative with the computer network, and one or more servers that service the requests sent by the clients. Depending upon the request by the client, the server will receive information, store information, and/or transmit information to the requesting or other client devices, or to other elements within the computer network. It will be appreciated that having a specific object in a specific module may be a matter of convenience or convention. However, it is possible to rearrange objects within the data model as described and achieve the functionality desired. Consequently, the arrangement of objects described herein is for the preferred embodiment. Other embodiments of the present invention can have different arrangements of objects and modules yet provide the same or substantially the same functionality. Yet other embodiments of the present invention may remove objects, albeit with a corresponding loss of functionality. Still other embodiments may exchange properties and methods from one object to another object within the present invention with a corresponding effect on association and performance.

The servers contain hardware and/or software that enable the functionality desired. In the preferred embodiment of the present invention, the server has one or more processes executing on a central processing unit. One or more of these processes are constructed and arranged to instantiate objects in a preferably persistent, or at least temporary, manner. In the preferred embodiment, the objects are stored persistently on, for example, an object database. In addition, or in lieu of an object database, a relational database can be used. However, if a relational database is used, there will be some object-to-relational mapping issues that must be addressed. This is particularly true for those objects that are based on records in tables that are associated with other records in the same table through a common object that is, for example, stored as a record in a second table. Alternatively, an object-relational database, such as PostrgreSQL (see http://www.postresq1.org) or Oracle 8$i$, the latter manufactured by the Oracle Corporation of Redwood Shores, Calif., can be utilized to handle the object-to-relational mapping in an automated fashion.

Figure 3:
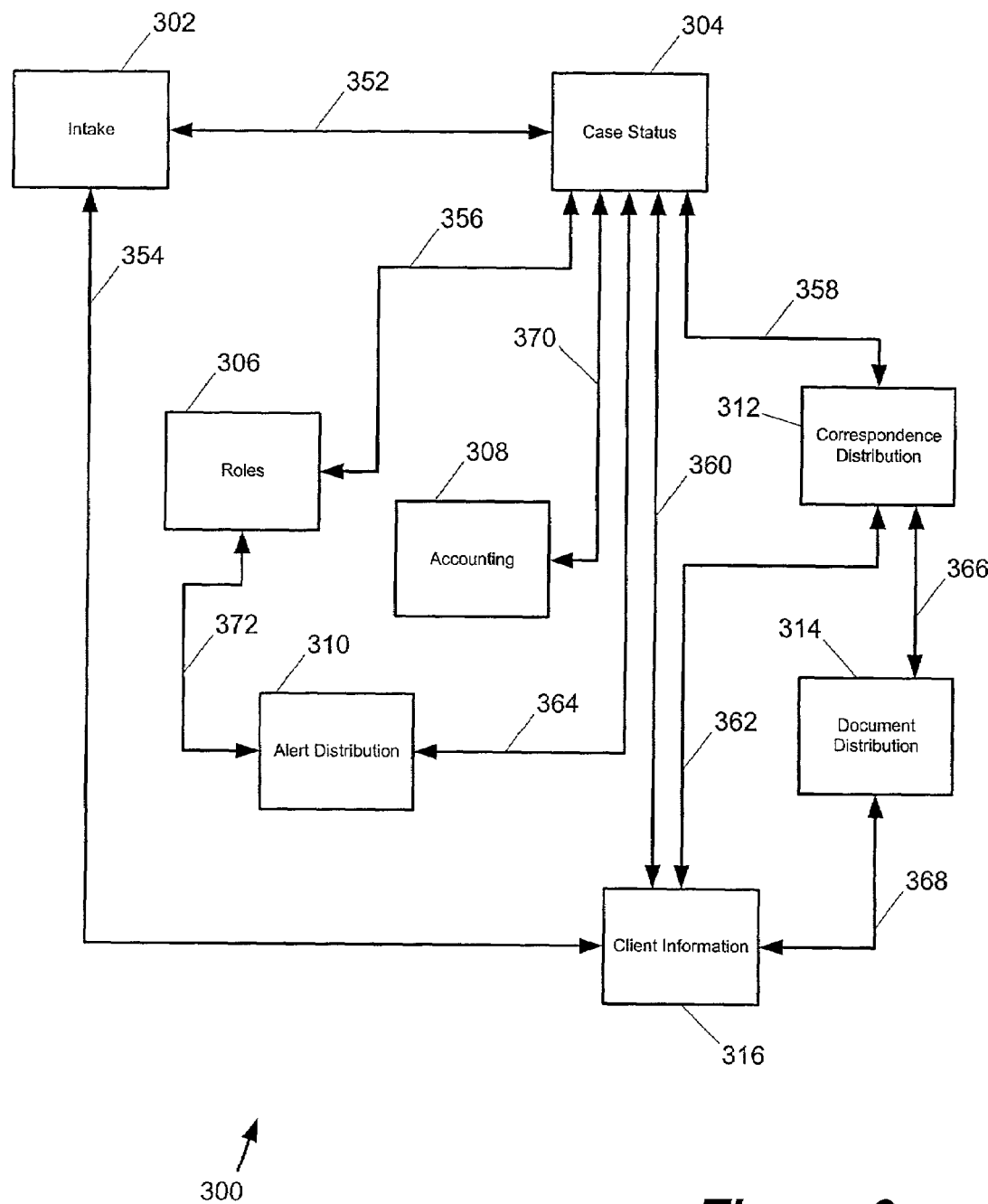
FIG. 3 is a block diagram illustrating the modules of the present invention.

The data structure within the server or servers is designed and arranged in such a fashion so as to facilitate the functionality required for servicing the requests issued by the client devices. The objects of the present invention can be conveniently grouped into modules and interconnected as illustrated in FIG. 3. The modules illustrated in FIG. 3 capture and store information within the present invention that describe the set-up and particulars of internal complaints and charges. All of the information related to the charge itself, such as final disposition, are stored in one or more instantiations of objects in one or more of the modules illustrated in FIG. 3. One or more instantiations are used because the case may be comprised of more than one charge, and each charge can have separate agency affiliations and agency contacts.

The various modules 300 are described in general below. For example, a case status module 304 encompasses all case specific information such as the Complainant identity, type of case, date of receipt, assigned consultant, insurance information if the client is insured, settlement information, final disposition, and all activities associated with the case including calendar events, documents posted and correspondence sent. The case status and activity tracking module 304 comprises the bulk of the information, but it relies heavily on the devices and techniques mentioned above to import and export information.

An intake module 302 has an operative relationship 352 with the case status module 304. The intake module 302 is used to retain and reference various charges, government agencies, and related contact information.

A role module 306 has an operative relationship 356 with the case status module 304 as well as an operative relationship 372 with the alert distribution module 310. The role module is used to retain report information and descriptions of the tasks (roles) of the various people associated with one or more cases. The role module 306 captures the user's role and specifications that are utilized by the present invention to tailor the application to the user's general and/or unique requirements.

An accounting module 308 has an operative relationship with the case status module 304 as illustrated in FIG. 3. The payment module 308 is used to track billing invoices and their payment status. Time and Expense ("TE") information can be input and stored through the payment module 308. In addition, invoices can be generated via a third party accounting package that is integrated with the present invention. These invoices can be viewed by users of the present invention and payments may be made online.

An alert distribution module 310 is in an operative relationship 364 with the case status module 304. The alert distribution module 310 is used for issuing alerts, such as docketing items indicating that some activity is due to be completed on a certain date. Alerts to the operator of the present invention, their users, and clients are preferably pre-set based on client preferences and user set-up. Typically, alerts are generated and disseminated based upon a number of parameters and events that occur during the life-cycle of a case.

The system of the present invention also includes a correspondence distribution module 312 that has an operative relationship 358 with the case status module 304. The correspondence distribution handles correspondence that is sent to the present invention, including receipts, responses and approvals. Correspondence are also tracked through this correspondence module 312 which allows the Consultant to generate pre-set or other correspondence and attach uploaded documents to the correspondence for client review. The correspondence module 312 may also retain information regarding the correspondence between individuals, employers, insurers, courts, and/or government agencies that are associated with the case.

A document distribution module 314 has an operative relationship 368 with the client information module 316, and an operative relationship 366 with the correspondence distribution module 312. The document distribution module 314 ensures that documents associated with the various cases remain stored, searchable, and retrievable by the various people associated with the case. Documents are uploaded from other sources (e.g., word processing documents on the storage device or forms documents that are received through, for example, a facsimile server) and posted to the present invention. Documents may also be modified, replaced, and/or deleted from the storage device within the present invention. Documents may be distributed as an attachment to correspondence and/or email or other electronic means. Information about various documents may be compiled by electronic processes and a compiled or synthesized version can be electronically uploaded or otherwise sent to remote servers, such as those owned by customers, employers, courts, or government agencies.

Finally, a client information module 316 is included with the preferred embodiment of the present invention. The client information module 316 has a series of operative relationships. First, there is the operative relationship 360 with the case status module 304, the operative relationship 362 with the correspondence module 312, the operative relationship 368 with the document distribution module, and the operative relationship 354 with the agency module 302. Generally, the client information module 316 contains all information about the client, its business, its primary contacts, organizational structure, divisions, locations, unions, and one or more specifications affecting the performance of the intended operator of the present invention.

All of the modules and associated relationships there between enable the present invention to service one or more requests from the client device. It will be understood that modules can be removed from the present invention in order to consume fewer resources, albeit with reduced functionality and capability for the system as a whole. Conversely, modules can be added to the present invention in order to increase functionality, or to incorporate new client devices some time in the future. The modular design of the present invention also increases the scalability of the system, i.e., the system's ability to handle large amounts of use by a large number of people.

The structure and interrelationships among the objects of the present invention, and a description of how the data they process perform tangible and useful results, are described below.

As mentioned before, the preferred embodiment of the present invention includes a computer network that has at least one client device that is operative with the computer network. There is also at least one server that is constructed and arranged to receive one or more requests from the client device. The server enables (facilitates) the execution and operation of the various objects of the present invention.

Figure 4A:
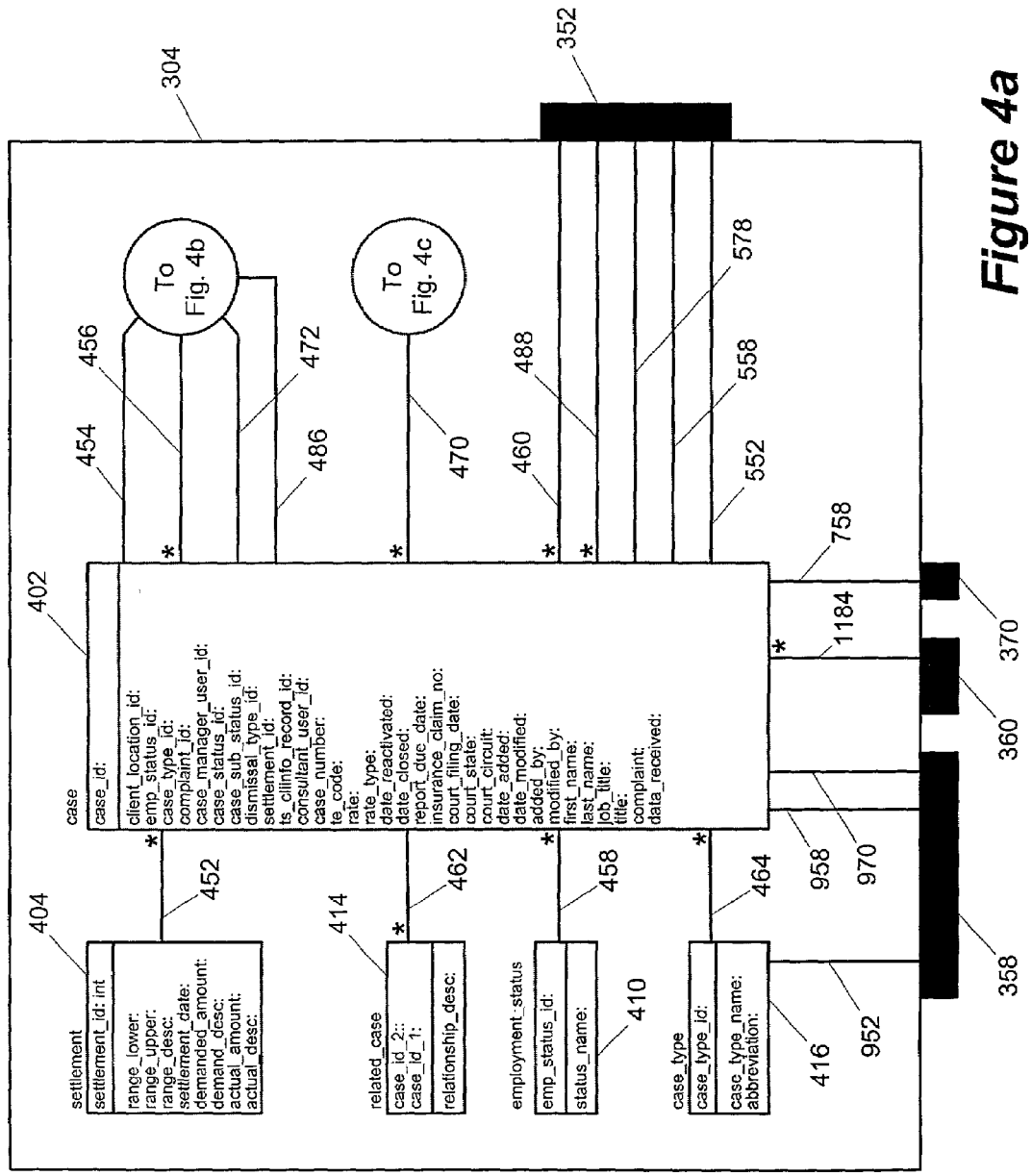
FIG. 4 is a block diagram illustrating the set of objects that make up the case status module of the present invention.
Figure 4B:
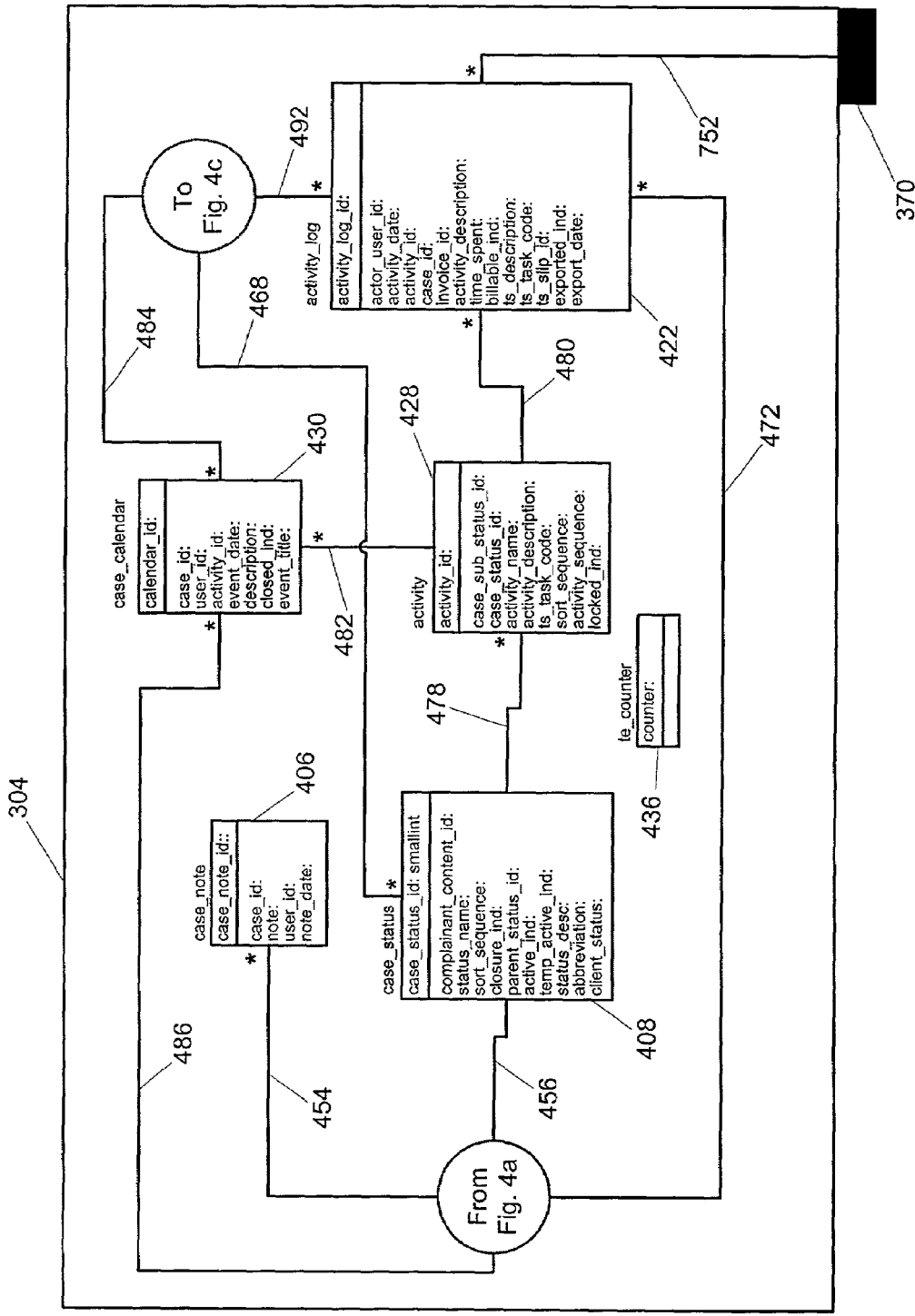

As illustrated in FIGS. 4a, 4b, and 4c, in the preferred embodiment of the present invention, the execution and operation of the case status module 304 (FIG. 4a) is enabled (facilitated) by, for example, one or more case objects 402 (FIG. 4a); at least one settlement object 404 (FIG. 4a) in association 452 with one or more case objects 402; one or more case_note objects 406 (FIG. 4b) in association 454 with one of the case objects 402; a case_status object 408 (FIG. 4b) in association 456 with one or more case objects 402; an employment_status object 410 (FIG. 4a) in association 458 with one or more case objects 402; one or more related_case objects 414 (FIG. 4a) in association 462 with a case object 402; a case_type object 416 (FIG. 4a) in association 464 with one or more case objects 402; a content object 418 (FIG. 4c) in association 468 with one or more case_status objects 408; one or more user objects 420 (FIG. 4c) in association 470 with one or more case objects 402; one or more activity-log objects 422 (FIG. 4b) in association 472 with one of the case objects 402, and one or more activity-log objects 422 in association 492 with one of the user objects 420; one or more employee objects 424 (FIG. 4c) in association 474 with one of the user objects 420; one or more status_history objects 426 (FIG. 4c) in association 476 with one of the user objects 420; one or more activity objects 428 (FIG. 4b) in association 478 with one of the case_status objects 408, and the activity object 428 in association 480 with one or more activity_log objects 422; one or more case_calendar objects 430 (FIG. 4b) in association 482 with one of the activity objects 428 (FIG. 4b), one or more of the case_calendar objects 430 in association 484 with one of the user objects 420, and one or more of the case_calendar objects 430 in association 486 with one of the case objects 402.

The objects described above perform various functions. For example, the case_status object 408 defines the various states that cases can have, e.g., OPEN, ASSIGNED, CLOSED, or SETTLED.

The user object 420 contains user profiles for use by the present invention. Many individuals may be represented by separate object instantiations of the user class. This is a general class that may include (but is not limited to) employees of the operating organization (a.k.a., consultants) (that operates the present invention), client contacts, Complainants, consultants, and agency contacts and investigators, to name but a few. Incidentally, the employee object 424 is intended only for employee-specific information for employees of the operating organization.

Figure 5A:
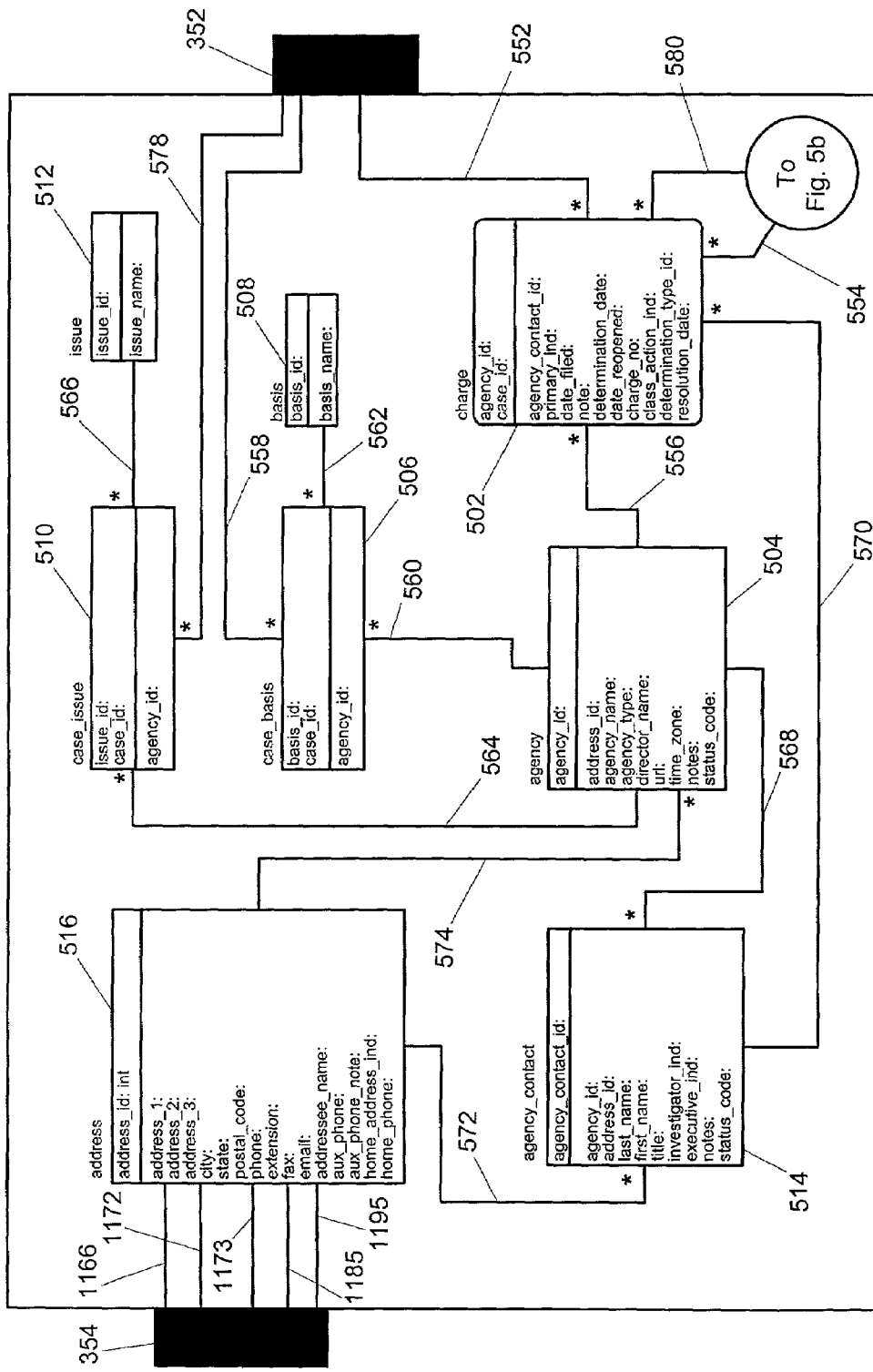
FIG. 5 is a block diagram illustrating the set of objects that make up the agency module of the present invention.
Figure 5B:
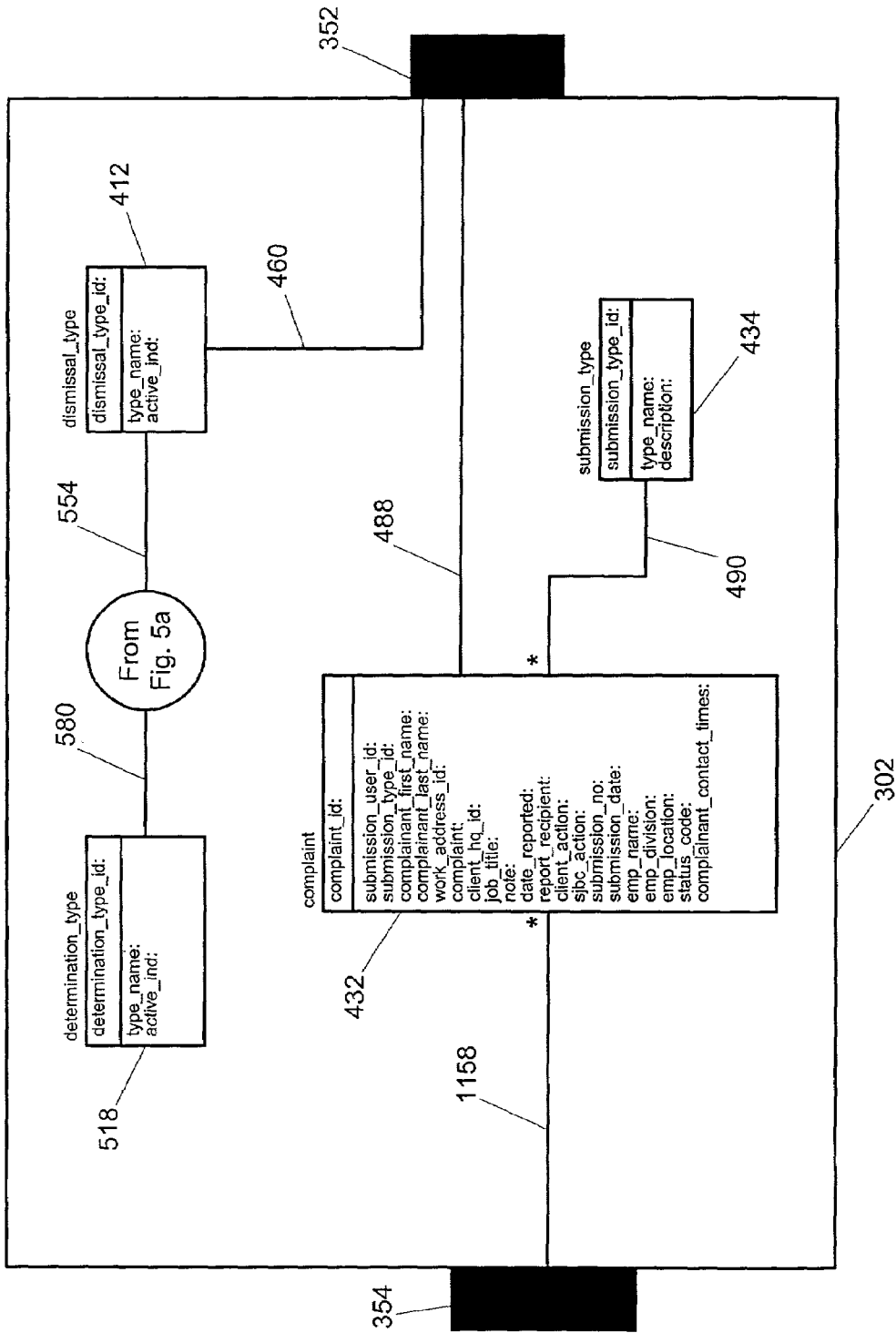

As illustrated in FIGS. 5a and 5b, in the preferred embodiment of the present invention, the execution and operation of the intake module 302 is enabled (facilitated) by, for example: one or more charge objects 502 (FIG. 5a), one or more of the charge objects 502 in association 552 with one of the case objects 402, one or more of the charge objects 502 in association 554 with the dismissal_type object 412, one or more agency objects 504 (FIG. 5a), one of the agency objects in association 556 with one or more of the charge objects 502; one or more case_basis objects 506 (FIG. 5a), one or more of the case_basis objects 506 in association 558 with one of the case objects 402, one or more of the case_basis objects 506 in association 560 with one of the agency objects 504; a basis object 508 (FIG. 5a), the basis object 508 in association 562 with one or more of the case_basis objects 506; one or more case_issue objects 510 (FIG. 5a), one or more of the case_issue objects 510 in association 564 with one of the agency objects 504, and one or more of the case_issue objects 510 in association 578 with one of the case objects 402; an issue object 512 (FIG. 5a), the issue object 512 in association 566 with one or more of the case_issue objects 510; one or more agency_contact objects 514 (FIG. 5a), one or more of the agency_contact objects 514 in association 568 with one of the agency objects 504, one of the agency_contact objects 514 in association 570 with one or more of the charge objects 502; and an address object 516 (FIG. 5a), the address object 516 in association 572 with one or more of the agency-contact objects 514, and the address object 516 in association 574 with one or more of the agency objects 504; one or more complaint objects 432 (FIG. 5b), one of the complaint objects 432 in association 488 with one or more of the case objects 402; a submission-type object 434 (FIG. 5b) in association 490 with one or more of the complaint objects 432; a dismissal_type object 412 (FIG. 5b) in association 554 with one or more of the charge objects 502; and at least one determination-type type objects 518 (FIG. 5b) in association 580 with one or more of the charge objects 502.

The address class contains information for any entity in the database that requires an address. The object includes properties for telephone, facsimile, email, as well as physical location, mailing address, etc.

Figure 6:
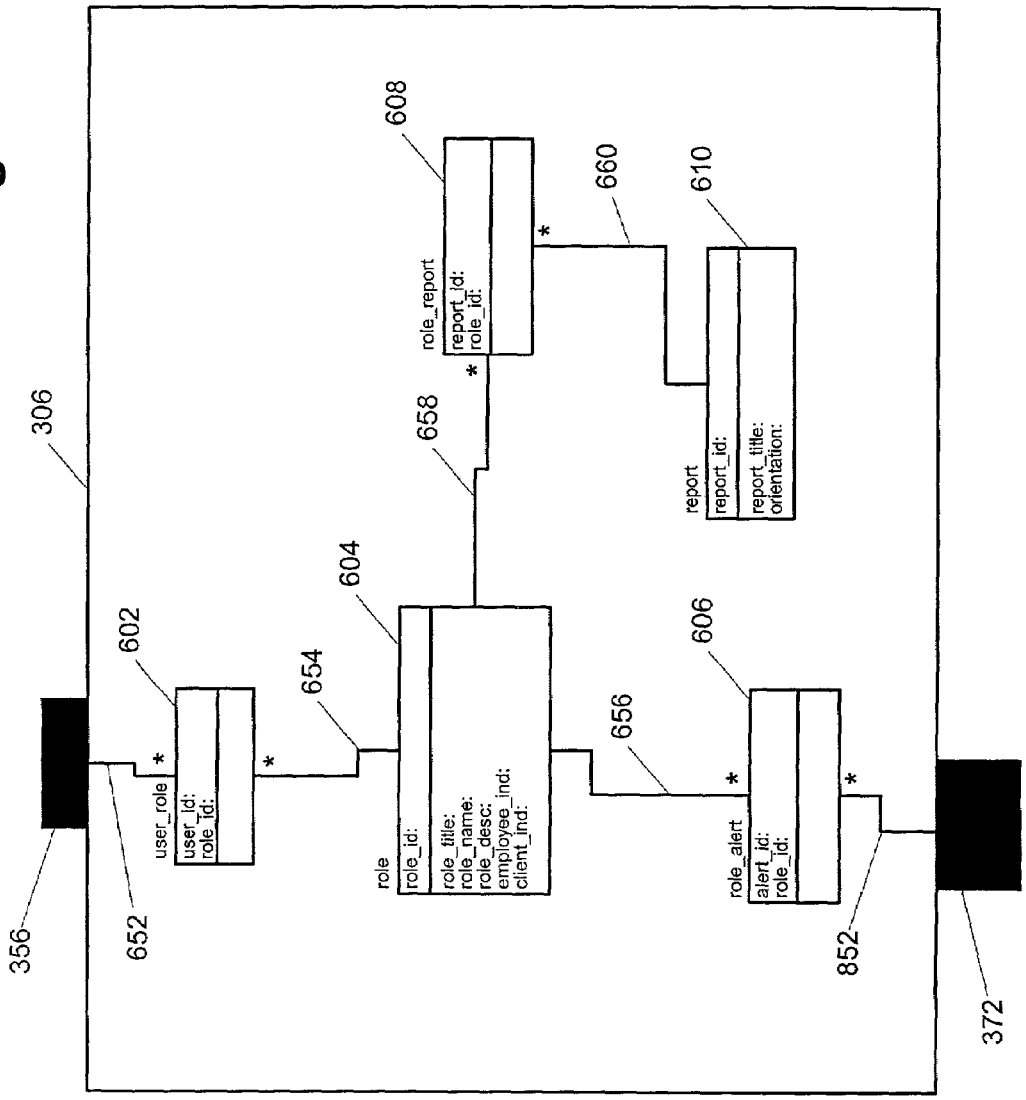
FIG. 6 is a block diagram illustrating the set of objects that make up the roles module of the present invention.

As illustrated in FIG. 6, in the preferred embodiment of the present invention, the execution and operation of the role module 306 is enabled (facilitated) by, for example: one or more user-role objects 602, one or more of the user-role objects 602 in association 652 with the user object 420 of the case status module 304; a role object 604, the role object 604 in association 654 with one or more of the user_role objects 602; one or more role_alert objects 606, one or more of the role_alert objects 606 in association 656 with the role object 604; one or more role_report objects 608, one or more of the role_report objects 608 in association 658 with the role object 604; and a report object 610, the report object 610 in association 660 with one or more of the role_report objects 608.

The report object 610 can contain a pre-formatted report specification which, when combined with a database query (such as a SQL or OQL statement) will enable the printing or exporting of information contained within the present invention. It is contemplated that one or more of the instances of the report class may be specifically designed to format a report in such a way as to facilitate electronic filing with clients, agencies, or governmental entities.

Figure 7:
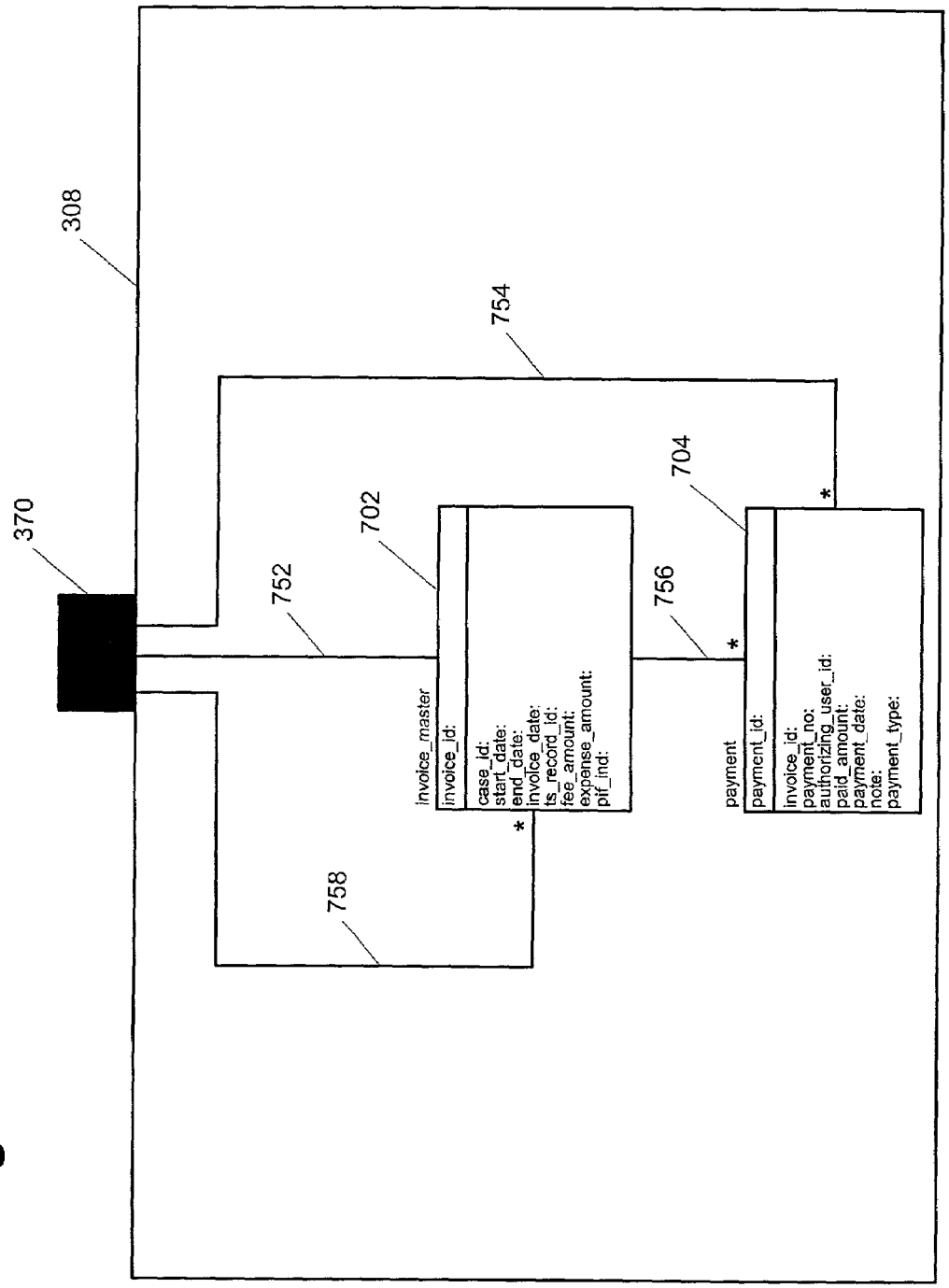
FIG. 7 is a block diagram illustrating the set of objects that make up the payment module of the present invention.

As illustrated in FIG. 7, in the preferred embodiment of the present invention, the execution and operation of the payment module 308 is enabled (facilitated) by, for example: one or more invoice_master objects 702, one of the invoice_master objects 702 in association 752 with one of the activity_log objects 422, one or more invoice master objects 702 in association 758 with a case object 402; and one or more payment objects 704, one or more of the payment objects 704 in association 754 with one of the user objects 420, one or more of the payment objects 704 in association 756 with one of the invoice_master objects 702.

Figure 8:
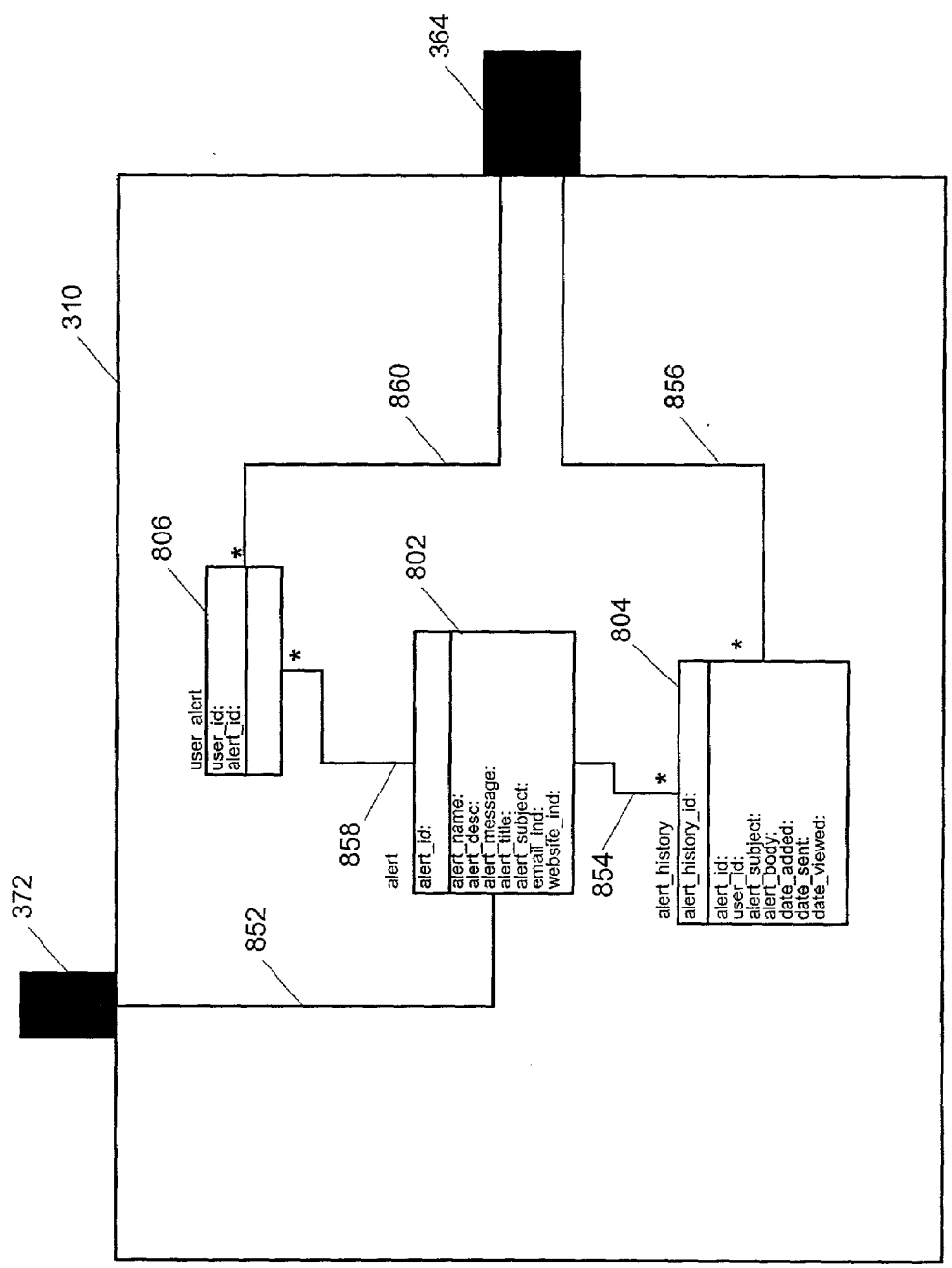
FIG. 8 is a block diagram illustrating the set of objects that make up the alert distribution module of the present invention.

As illustrated in FIG. 8, in the preferred embodiment of the present invention, the execution and operation of the alert distribution module 310 is enabled (facilitated) by, for example: an alert object 802, the alert object 802 in association 852 with one or more of the role_alert objects 606 of the role module 306; at least one alert_history objects 804, one or more of the alert-history objects 804 in association 854 with the alert object 802, one or more of the alert-history objects 804 in association 856 with the one or more of the user objects 420; and one or more user_alert objects 806, one or more of the user_alert objects 806 in association 858 with one of the alert objects 802, and one or more of the user_alert objects 806 in association 860 with one of the user objects 420.

Figure 9:
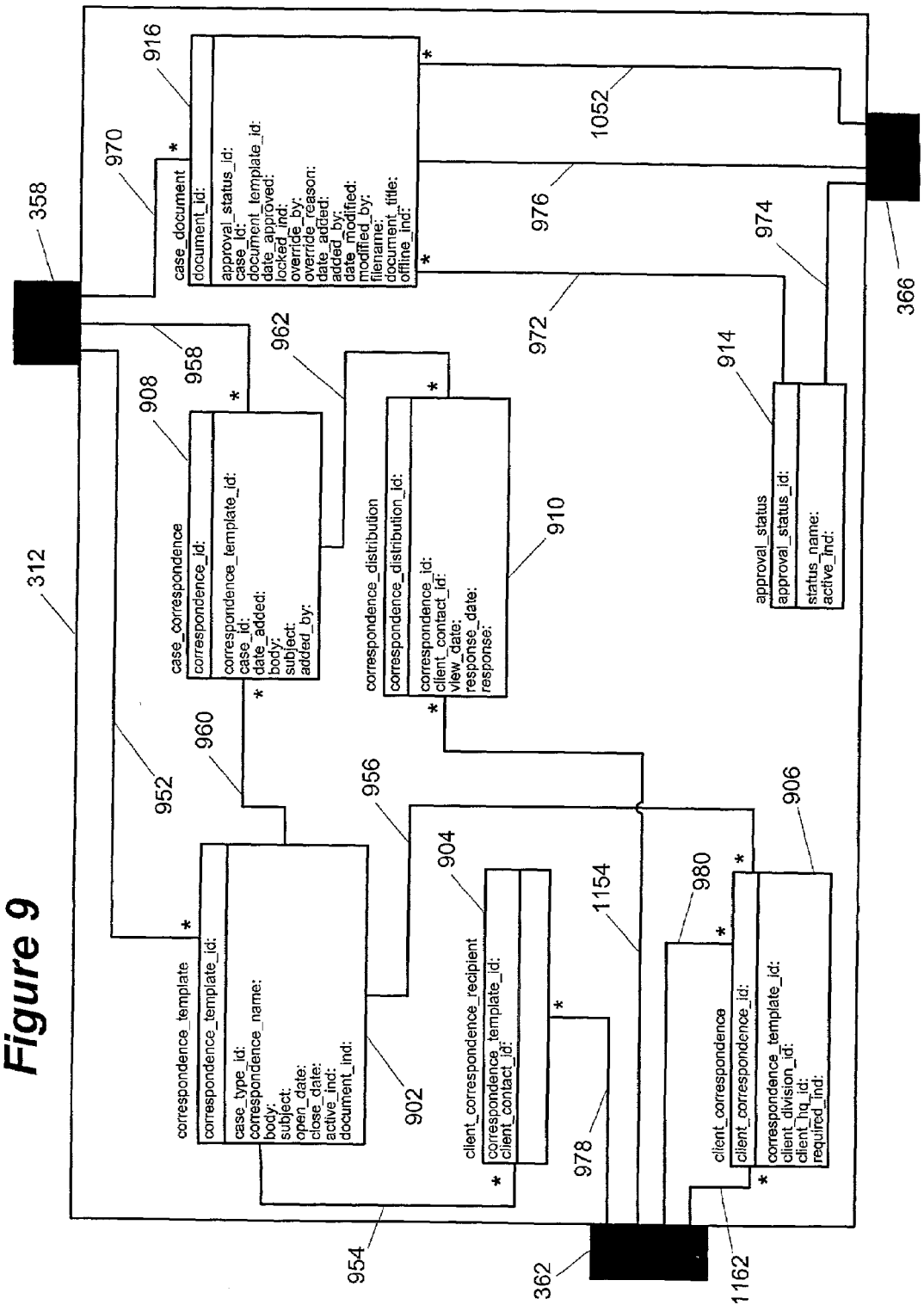
FIG. 9 is a block diagram illustrating the set of objects that make up the correspondence distribution module of the present invention.

As illustrated in FIG. 9, in the preferred embodiment of the present invention, the execution and operation of the correspondence distribution module 312 is enabled (facilitated) by, for example: one or more correspondence_template objects 902, one or more of the correspondence_template objects 902 in association 952 with the case-type object 416; one or more client_correspondence-recipient objects 904; one or more of the client-correspondence_receipient objects 904 in association 954 with one of the correspondence_template objects 902; at least one client_correspondence objects 906, one or more of the client_correspondence objects 906 in association 956 with one of the correspondence_template objects 902; one or more case_correspondence objects 908, one or more of the case_correspondence objects 908 in association 958 with one of the case objects 402 of the case status module 304; and one or more of the case_correspondence objects 908 in association 960 with one of the correspondence_template objects 902; one or more correspondence_distribution objects 910, one or more of the correspondence_distribution objects 910 in association 962 with one of the case_correspondence objects 908; an approval_status object 914, and one or more case_document objects 916; one or more of the case_document objects 916 in association 970 with one of the case objects 402; and one or more of the case_document objects 916 in association 972 with the approval-Status object 914.

Figure 10:
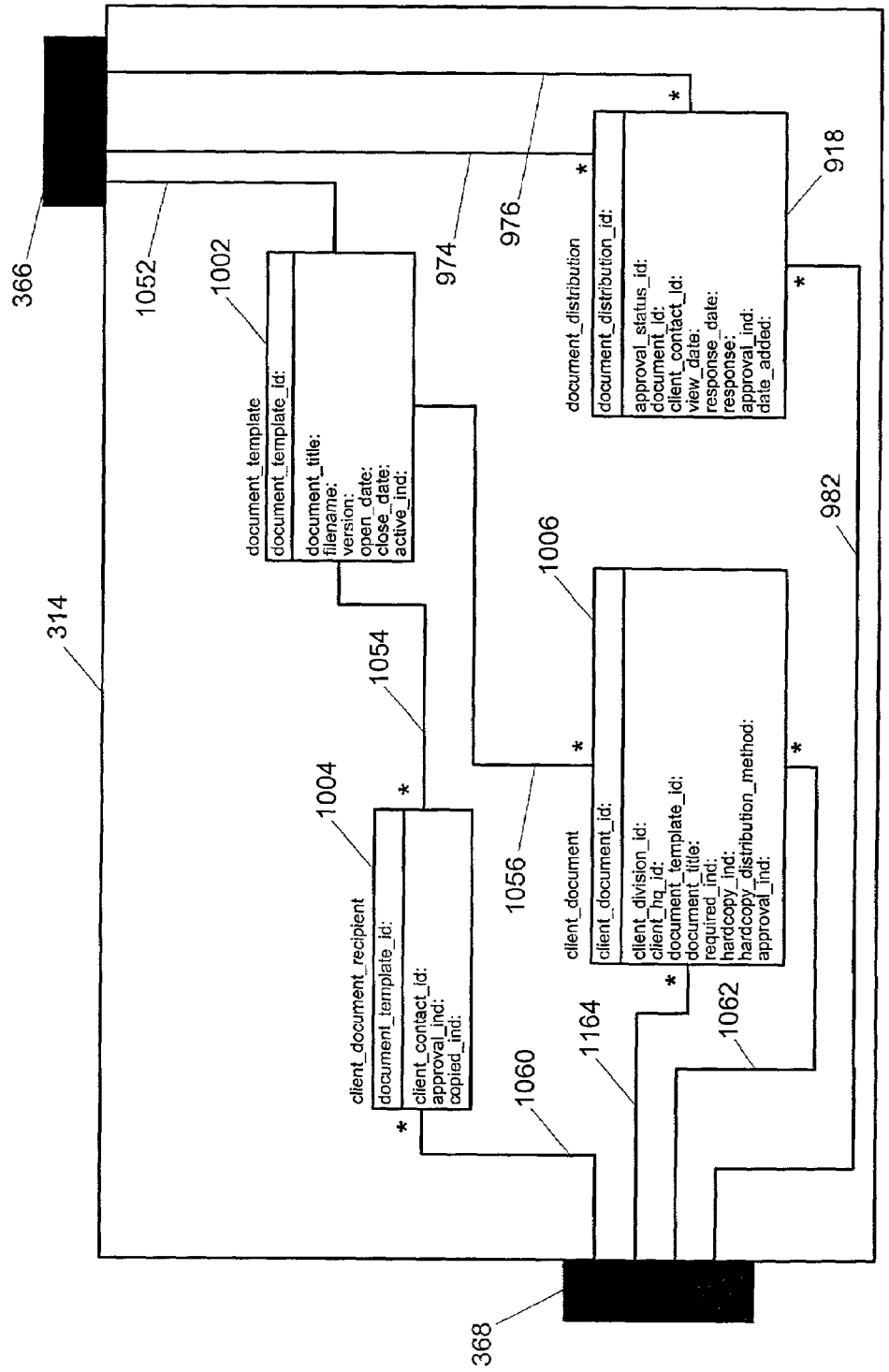
FIG. 10 is a block diagram illustrating the set of objects that make up the document distribution module of the present invention.

As illustrated in FIG. 10, in the preferred embodiment of the present invention, the execution and operation of the document distribution module 314 is enabled (facilitated) by, for example: a document_template object 1002, the document_template object 1002 in association 1052 with one or more case_document objects 916; one or more client_document_recipient objects 1004, one or more of the client_document_recipient 1004 objects in association 1054 with the document_template object 1002; one or more client_document objects 1006, one or more of the client_document objects 1006 in association 1056 with the document_template object 1006; and one or more document_distribution objects 918, one or more document_distribution objects having an association 974 with an approval_status object 914 of the correspondence distribution module 312, and one or more document_distribution objects 918 having an association 976 with a case_document object 916.

Figure 11A:
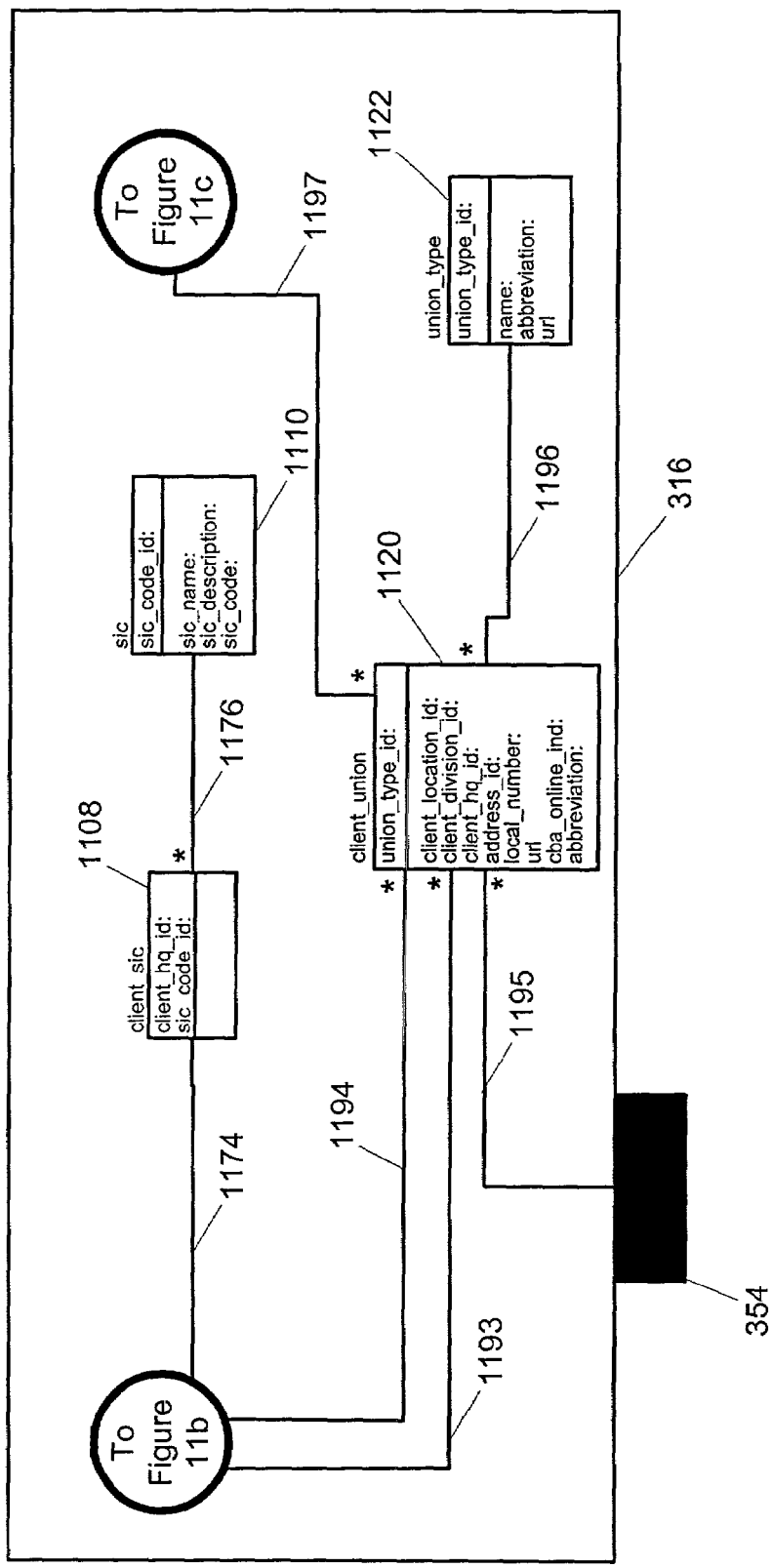
FIG. 11 is a block diagram illustrating the set of objects that make up the client information module of the present invention.
Figure 11B:
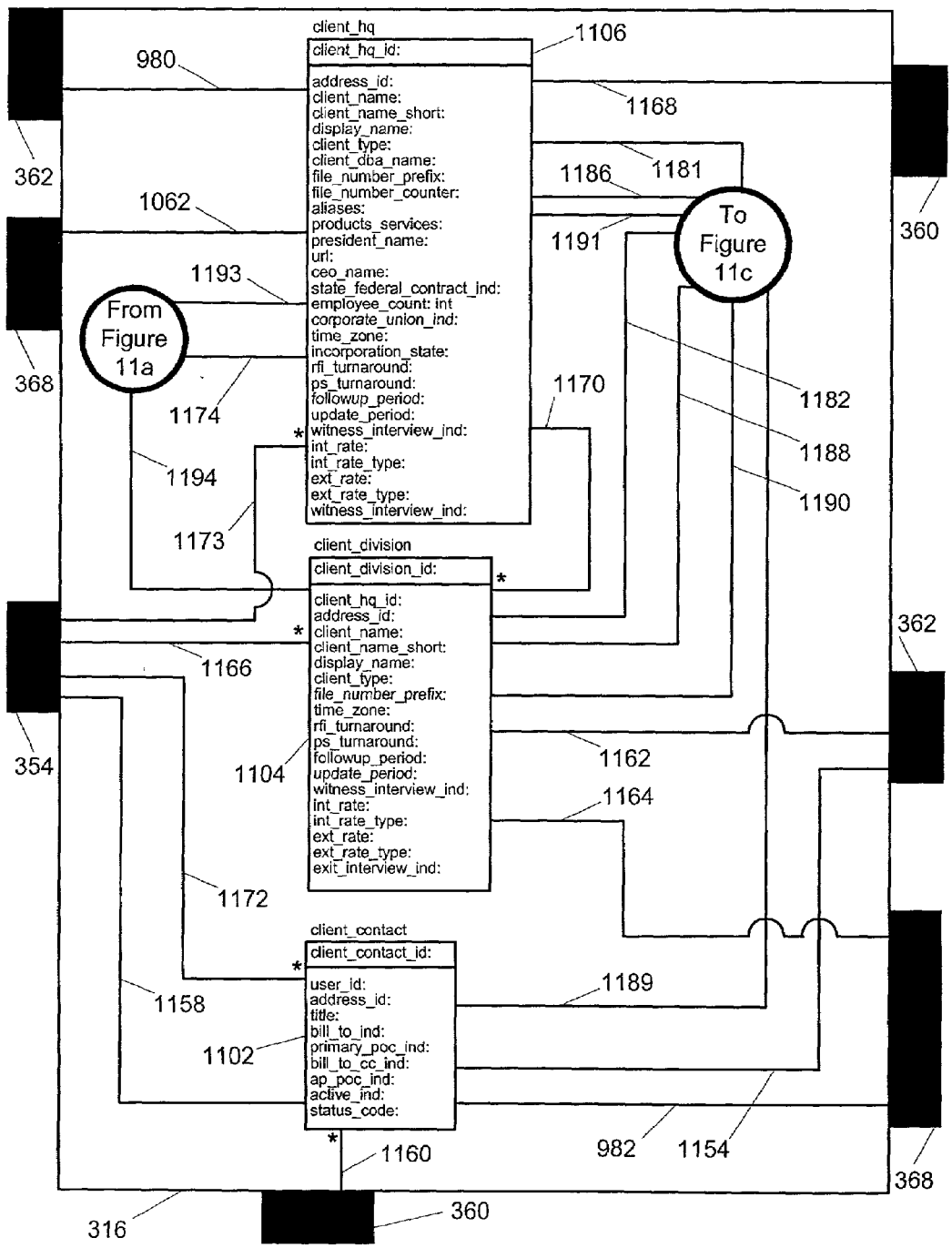
Figure 11C:
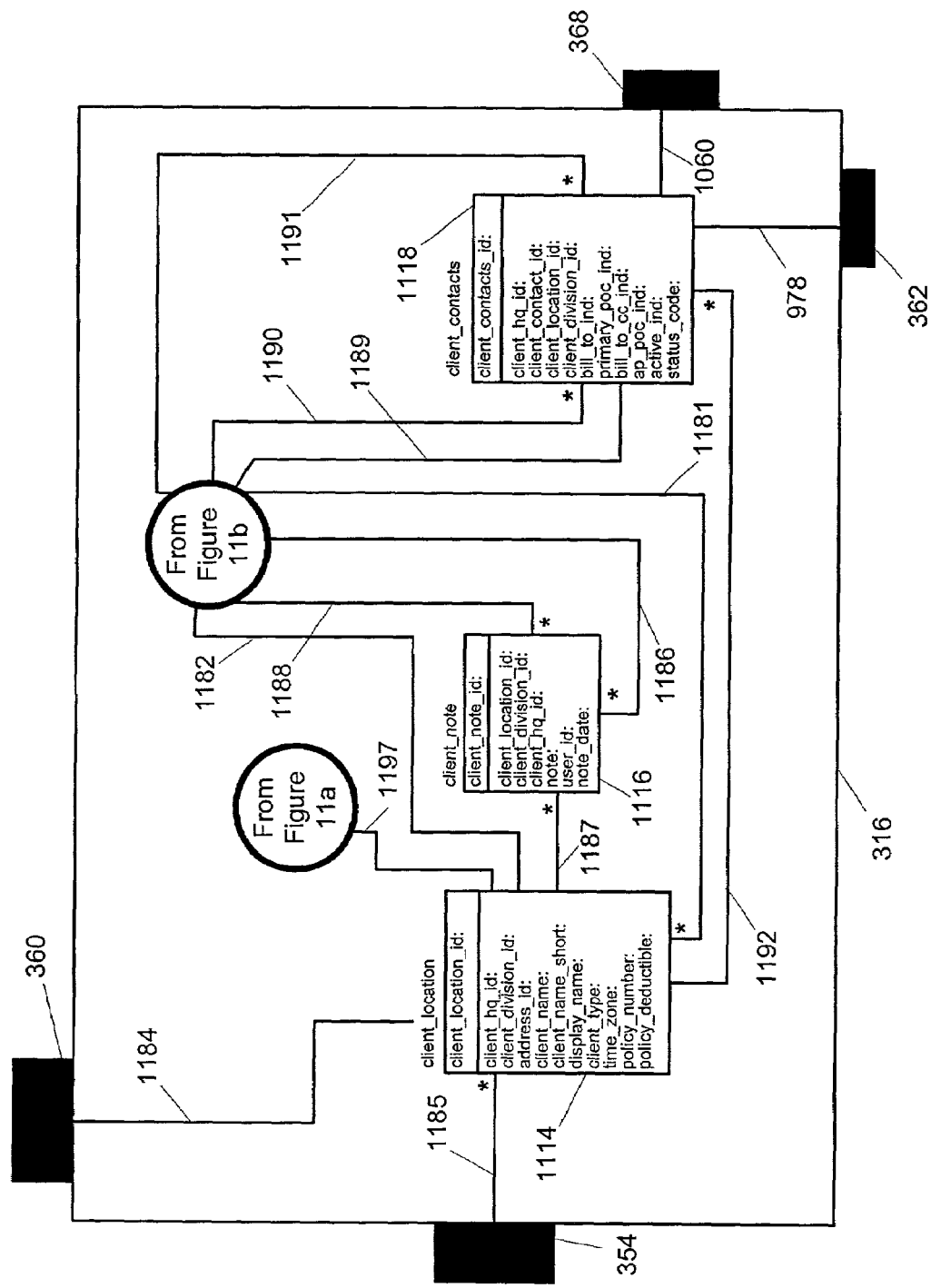

As illustrated in FIGS. 11*a*, 11*b*, and 11*c*, in the preferred embodiment of the present invention, the execution and operation of the client information module 316 is enabled (facilitated) by, for example: one or more client_contact objects 1102 (FIG. 11*b*), one of the client-contact objects 1102 in association 1154 with one or more of the correspondence_distribution objects 910, one of the client_contact objects 1102 in association 1158 with one or more of the complaint objects 432, one or more of the client_contact objects 1102 in association 1172 with the address object 516 of the intake module 302, and one or more of the client_contact objects 1102 in association 1160 with one of the user objects 420 of the case module 304; one or more client_division objects 1104 (FIG. 11*b*), one of the client_division objects 1104 in association 1162 with one or more client_correspondence objects 906 of the correspondence module 312, one of the client_division objects 1104 in association 1164 with one or more client_document objects 1006 of the document distribution module 314, and one or more of the client_division objects 1104 in association 1166 with one of the address objects 516 of the intake module 302; one or more client_hq objects 1106 (FIG. 11*b*), one of the client_hq objects 1106 in association 1168 with one or more user objects 420 of the case module 304, one of the client_hq objects 1106 in association 1170 with one or more of the client_division objects 1104, one or more of the client_hq objects 1106 in association 1173 with the address object 516, one of the client_hq objects 1106 in association 980 with one or more client_correspondence objects 906 of the correspondence module 312; one of the client_hq objects 1106 in association 1062 with one or more client_document objects 1006 of the document module 314; one or more client_sic objects 1108 (FIG. 11*a*), one or more of the client_sic objects 1108 in association 1174 with one of the client_hq objects 1106; a sic object 1110 (FIG. 11*a*), the sic object 1110 in association 1176 with one or more of the client_sic objects 1108; one or more client_location objects 1114 (FIG. 11*c*), one or more of the client_location objects 1114 in association 1181 with one of the client_hq objects 1106, one or more of the client_location objects 1114 in association 1182 with one of the client_division objects 1104, one of the client_location objects 1114 in association 1184 with one or more case objects 402 of the case module 304, and one or more client_location objects 1114 in association 1185 with the address object 516 of the intake module 302; one or more client_note objects 1116 (FIG. 11*c*), one or more of the client_note objects 1116 in association 1186 with one of the client_hq objects 1106, one or more of the client_note objects 1116 in association 1187 with one of the client_location objects 1114, and one or more of the client_note objects 1116 in association 1188 with one of the client_division objects 1104; one or more client_contacts objects 1118 (FIG. 11*c*), one or more of the client_contacts objects 1118 in association 1189 with one of the client_contact objects 1102, one or more of the client_contacts objects 1118 in association 1190 with one of the client_division objects 1104, one or more of the client_contacts objects 1118 in association 1191 with one of the client_hq objects 1106, and one or more of the client_contacts objects 1118 in association 1192 with one of the client_location objects 1114; one or more client_union objects 1120 (FIG. 11*a*), one or more of the client_union objects 1120 in association 1193 with one of the client_hq objects 1106, one or more of the client_union objects 1120 in association 1194 with one of the client_division objects 1104, one or more of the client_union objects 1120 in association 1195 with an address object 516 of the intake module 302, and one or more of the client_union objects 1120 in association 1197 with one of the client_location objects 1114; and a union_type object 1122 (FIG. 11*a*), the union_type object 1122 in association 1196 with one or more of the client_union objects 1120.

The client_hq object 1106 contains data that pertains to a client of the organization that operates the present invention (the "operating organization"). Certain information stored in the client_hq object 1106 is made available to "child" client entities for use directly, or for copying from the parent. A copy of the information would be an independent source object (e.g., a separate instantiation), which may be changed within the scope of the child client. This is useful for clients that are holding companies that have subsidiaries that are themselves corporations in their own right.

The client_contacts object 1118 is used to contain any client_contact. This object contains links to an individual's object representation (e.g., the object within the present invention that contains that person's specific information).

The sic object 1110 represents the many-to-many relationships between the Standard Industrial Classifications ("SIC") and the clients represented within the present invention.

The union_type object 1122 is specific to union organizations. Local unions refer to this as their "union type" within the client information retained within the present invention. An example of a union type would be "United Auto Workers." The union_type object 1122 is used to identify certain unions and to enable linking to their names, web sites, abbreviations, and other information.

Incidentally, it is contemplated that the objects of the present invention will perform certain functions on behalf of, or otherwise representing, the individuals about whom the objects pertain.

Properties of the Various Objects

As mentioned before, the present invention is implemented on a computer system, preferably having a server capable of executing one or more processes that facilitate the creation of objects. The objects preferably have data composed of properties that may be stored/retrieved in an object or relational database or in another manner. The properties of the objects of the present invention are of standard types that enable the property to retain the kind and amount of information necessary to fulfill the requirements of the object and the overall system of the present invention. For example, the properties may be a standard integer, or a string variable of finite length. Other properties are specific for datetime and real (non-integer) numbers. Still other properties are of type "bit" for use as boolean variables or simple flags, as well as tinyint, varchar(x), char(x), smallint, numeric(a, b), or other type allowable under the language, database and/or platform upon which the application of the present invention operates.

The case object 402 has, for example: a case_id property; a client_location_id property; an emp_status_id property; a case_type_id property; a complaint_id property; a case_manager-user_id property; a case-status_id property; a dismissal_type_id property; a case_sub_status_id property; a settlement_id property; a ts_cliinfo_record_id property; a consultant_user_id property; a case_number property; a te_code property; a rate property; a rate_type property; date_reactivated property; a date_closed property; a report_due_date property; an insurance_claim_no property; a court_filing_date property; a court_state property; a court-circuit property; a date_added property; a date_modified property; an added_by property; a modified_by property; a first_name property; a last name property; a job_title property; a title property; a complaint property; and a data_received property.

The case object 402 contains pertinent information about the case being processed within the present invention. The court_state property contains the two-letter abbreviation for the state in which the court is located where the case litigation is filed, e.g., "ME" for Maine. A value placed in this property does not imply, nor is it to be inferred, that this is a state circuit court. Rather, the court_circuit property indicates the federal circuit in which the case is filed, whereas the court_state only indicates the geographical location of the court of the initial filing. Within the court_circuit property, a non-null value indicates that this is a Federal court case, while a null value indicates a State court case. The court_filing_date property contains the date the case was filed with a court. The date-added property indicates the date that the case is added to the table. The date_closed property indicates the date that the case is closed, i.e., the date that the main status is set to "Closed". The insurance_claim_no property contains the identification number of the claim, as reported by the client (insurance company), e.g., "23654-002." The report_due_date property indicates the date that the Report is due for this case.

The date_reactivated property contains the date that the case was "re-activated." Possible reasons for case reactivation may include the RFI requiring considerable time to reach a compliance. The title property is the title, or citation, of the case, e.g., "Smith v. ACME, Inc." The job-title property contains the job property of the Complainant. The complaint property can be either internal or external. Typically, for "internals," this property contains the online submission of the Complainant or the operating organization's employees' notes if the complaint was received by telephone, facsimile or mail, whereas for "externals" it includes a copy of the original charge. The date_modified property contains the date of the last modification to the case in question. The added_by and modified_by properties contain the user identifier of the person adding and modifying, respectively, this particular row. The last_name and first_name properties contain the last name, e.g., "Burns", and the first name, e.g., "George", respectively, of the Complainant in the case. The date_received property contains the date that the complaint or charge, i.e., primary charge only, was received by the operating organization. However, this date is not always the same as the date-added property. A example of this may be a case that was received on a Friday, but not entered into the system until the following Monday. The complaint_id property contains the database identification for the complaint. The case_type_id property contains the database-unique identifier which uniquely identifies the object in the database. The case_manager_user_id property contains the user identifier of the case manager who set up the case. The case_status_id property contains the current status of the case, e.g., "Closed", "Active", "Monitoring", "Reactivated." The case_id property contains the database unique identifier which uniquely identifies the case within the database of the present invention. The emp_status-id property contains a database unique identifier to an employee_status object. The client_location_id property contains a database-unique identifier for the client_location object within the database. The rate_type property determines the nature of the rate in the rate column, i.e., either "F" for a flat rate, or "H" for an hourly rate. The te_code property uniquely identifies the TE charge account for this case, and that number is the present invention's "foreign key" into the accounting program database, created independently at the case set-up in both the present invention and the accounting program. The case_number property contains the case number that is assigned to the case by the operating organization in order to identify the case uniquely. Typically, the case number corresponds to the alphanumeric code placed on case folders and is used in the accounting program, i.e., "Name.Nickname1". This case_number is read from the accounting program after the TE code (te-code) is created in both the present invention and the accounting program. The rate property contains the rate charged by the operating organization for time spent on the case in question. A default value is extracted from the Client table and is a flat rate "F" and/or an hourly rate "H", as determined by the rate_type property. The case_sub_status_id property contains the current sub-status of the case. An example is "Dismissed, No Cause", which is a sub-status of the status "Closed." The dismissal_type_id property contains the identification representing the type of dismissal for this case, if applicable. An example of a dismissal_type_id property is "Successful Conciliation." The settlement_id property contains a database-unique identifier that uniquely identifies the settlement object in the database. The ts_cliinfo_record_id property is a "foreign key" into the accounting program Cliinfo table (RecordID) and identifies the case, allowing the present invention to access case-specific accounting program data. The ts_cliinfo_record_id property is read by the accounting program after the te_code is created in both the present invention and the accounting program.

The settlement object 404 has, for example: a settlement_id property; a range_lower property; a range-upper property; a range_desc property; a settlement_date property; a demanded_amount property; a demand_desc property; an actual_amount property; and an actual_desc property.

The settlement object 404 contains the details of a settlement. The settlement-id property contains a database-unique identifier which uniquely identifies the settlement object in the database of the present invention. The range-lower property contains the lower boundary or minimum amount, in U.S. dollars, e.g., 1500, or $1,500.00, for the settlement. Similarly, the range_upper property contains the upper boundary or maximum amount, in U.S. dollars, e.g., 5000, or $5,000.00, for the settlement. The range_desc property contains any textual description which needs to accompany the settlement. The settlement_date property contains the date the settlement was reached. The demanded_amount property contains the amount of money demanded by the Complainant/charging party, in U.S. dollars, i.e., 5000, or $5,000.00. The demand-desc property contains a description of the non-monetary demands, or an elaboration upon the monetary demands, e.g., "reinstatement and a 10% pay increase." The actual_amount property contains the amount finally settled upon by the Complainant charging party, in U.S. dollars, i.e., 3000, or $3,000.00. The actual_desc property contains a description of the non-monetary final settlement, or an elaboration upon the monetary settlement, e.g., "reinstatement and a 5% pay increase."

The related_case object 414 has, for example, a case_id_2 property, a case_id_1 property, as well as a relationship_desc property.

The related_case object 414 relates two cases to one another, such as when an internal case is later filed by the complainant as a charge or when an internal or external case later results in litigation. Other case relationships could be related here by utilizing the relationship_desc property column to describe the relationship. Each relationship is represented once, so queries need to inspect both columns when searching for a relationship, i.e., "where case_id_1=2039 OR case_id_2=2039." The case_id_1 and the case_id_2 properties each contain a database-unique identifier which uniquely identifies the related_case object within the database of the present invention. The relationship_desc property contains a textual description of the nature of the relationship represented here, e.g., "CSC-EEO from the same claim."

The employment_status object 410 has, for example: an emp_status-id property; and a status_name property.

The employment_status object 410 represents the valid statuses applicable to a Complainant regarding his or her employment status with the client. Valid values include, for example, Hourly, Salary, Contract, Applicant, etc. The emp_status-id property contains a database-unique identifier which uniquely identifies the employment status identifier within the database. The status_name identifier property contains the name of the employment status, i.e., Hourly, Salary, Contract, Applicant, etc.

The dismissal_type object 412 has, for example, a dismissal_type-id property, as well as a type-name property and an active_ind property.

The dismissal_type object 412 represents the possible types of dismissals which can be associated with a case. The dismissal-type-id property contains a database unique identifier which uniquely identifies the dismissal_type object within the database. The type_name property contains the name of the dismissal_type, e.g., "Successful Conciliation." The term "Dismissed" is contained in the case_status property column and hence, is not stored in the dismissal_type object 412. Finally, the active_ind property, if set to, for example, the value 1, indicates a valid dismissal_type. Otherwise, this type is no longer considered a valid option.

The case_status object 408 has, for example: a case_status_id property; a complainant_content_id property; a status_name property; a sort-sequence property; a closure_ind property; a parent-status_id property; an active-ind property; a temp_active_ind property; a status_desc property; an abbreviation property; and a client_status property.

The case_status object 408 defines the various states that EEO cases can have, such as, "Open", "Assigned", "Closed", or "Settled". The case_status_id property contains a database-unique identifier which uniquely identifies the case_status object in the database. The complainant_content_id property contains an identifier tag which links to, for example, a Content table and identifies the status message to be displayed for a case with such a status. The status_name property contains the name of the status as it appears in the user interface ("UT"), e.g., "Open" or "Closed". The sort_sequence property contains the numerical indicator of the order in which the status values are listed. The closure_ind property contains information on how a case was closed, as a case can reach "closed" status in several different ways. The parent_status_id property identifies the status of the "parent" case in the case_status table and is used to denote that a status is a sub-status. "Settled" is one example of a sub-status of "Closed," because any case which is "Settled" is "Closed" as well. The active-ind property, if set to, for example, the value 1, indicates a valid status; otherwise, this status is no longer considered a valid option. The temp_active_ind property, if set to, for example, the value 1, indicates that a case status is "temporarily inactive," such as when the case is in the "monitoring" state. The status_desc property contains a brief description, available to the user, to assist the user in the status assignment or transition of the case. The abbreviation property contains an abbreviated representation of the status which is used where physical space is limited, such as in a report, on a display grid, etc. The client_status property is the status as it is represented to the client. Typically, client statuses are more generalized than consultant statuses.

The case_note object 406 has, for example: a case_note_id property; a case_id property; a note property; a user_id property; and a note_date property.

The case_note object 406 enables multiple notes to be stored for a single case. The note property contains the actual text of the note. The user_id property contains the name of the author of the note. The note_date property contains the date the note was written (or edited). The case_id property contains a database-unique identifier which uniquely identifies the case_note object within the database to which the note pertains. The case_note_id property contains a database unique identifier that uniquely identifies the note in the database.

The case_type object 416 has, for example: a case_type_id property; a case_type_name property; and an abbreviation property.

The case_type object 416 contains the various claim types under which a case can fall. Some examples of claim types include "charge", "internal", and "attorney demand". The case_type_id property contains a database_unique identifier which uniquely identifies the case-type object in the database. The case_type_name property contains the name of the claim type as it appears in documents, checkbox labels, etc., e.g., "Internal Complaint." Finally, the abbreviation property contains the abbreviated representation of the case type for use in places where physical space is limited such as in a report or on a display grid.

The content object 418 has, for example, an identifier property, as well as a set of properties including, for example: a description property; a language property; and a body property.

The content object 418 maintains "copy" used with the present invention and is where some of the textual content originates. The id property contains a database identifier which is a text identifier to enable the content object (and its message) to be identified meaningfully within the code referencing it, e.g., complainant:status_page:open_case. The description property contains a description of the use of this content. The language property contains the language in which the content is supplied. If this is "null," then the language is English. Finally, the body property contains the actual "content" displayed on the site.

The user object 420 has, for example: an id property; a client_hq_id property; a last_name property; a first-name property; a middle_name property; a prefix property; a suffix property; a username property; a password property; an employee-ind property; an email property; a last_visited property; a visit_count property; a client_ind property; a locked-ind property; and a status_code property.

The user object 420 contains the user profiles. The users of the present invention are many individuals including the operating organization's employees, client contacts and agency contacts. It may be useful to create a table or other objects to store contacts that are not standard users but who need to be represented in the database, such as agency investigators. The id property contains a database-unique value that uniquely identifies the particular user object (or database table row) within the database. The client_hq_id property, if set to, for example, the value 1, identifies a user who is associated with a client, i.e., not an employee. The last_name property contains the user's last name, e.g., "Howser." Similarly, the first_name and middle_name properties contain the user's first, e.g., "Doogie," and middle names, e.g., "Bartholomew," respectively. Likewise, the prefix and suffix properties contain the user's prefix, e.g., "Dr.", "Ms.", "Mr." and user's suffix, e.g., "M.D.", "Esq.", "Jr.", respectively. The username property contains the user's username, e.g., "dbhowser." The password property contains the user's password. The employee ind property, if set to, for example, the value 1, indicates that the user is an employee of the operating organization and thus, alleviates the present invention from having to issue, for example, a SQL JOIN statement to an Employee table to determine this fact. Similarly, the client_ind property, if set to, for example, the value 1, identifies the user as a client. The email property contains the email address of the user. The last_visited property contains the date and time of the user's last visit to the present invention, whereas the visit_count property contains the number of sessions on the present invention for this particular user. The locked-ind property, if set to, for example, the value 1, indicates that the user's account has been locked. The status_code property indicates the status of the particular user with respect to notes and authorization to use various aspects of the present invention.

The activity_log object 422 has, for example: an activity_log_id property; an actor_user_id property; an activity_date property; an activity_id property; a case-id property; an invoice_id property; an activity_description property; a time_spent property; a billable_ind property; a ts_description property; a ts_task_code property; a ts_slip_id property; an exported_ind property; and an export_date property.

The activity_log object 422 is a log of all activities which occur in relation to a specified case 402. Billable entries in this table (where the billable_ind property is equal to the value 1) are exported to the accounting program for processing. The ts_description property contains the accounting program description. The ts_task_code property contains the accounting program task code, when the default is equal to, for example, the value 1. The billable_ind property, when set to, for example, the value 1, indicates that this entry represents billable activity that should be exported to the accounting program. The export date property records the date and time at which the activity log entry was exported to Accounting program. The ts_slip_id property is uniquely identified in the accounting program via a value of SLPTRANS.RecordID. The exported-ind property, when set to, for example, the value 1, indicates that this activity has been exported to the accounting program. The invoice_id property contains the invoice in which this slip is included. The actor_user_id property identifies the user who carried out the activity. The activity_date property records the date on which the activity occurred. The activity_log_id property is a database-unique identifier which uniquely identifies the particular activity_log object within the database of the present invention. The time_spent property records, in increments of an hour, the amount of time the user spends on a given activity. The activity_description property is a description of the action performed. The activity_id property identifies the specific activity on which time was spent. Finally, the case_id property has a database-unique identifier which uniquely identifies the case object 402 within the database of the present invention.

The employee object 424 has, for example: an employee_id property; a supervisor_user_id property; an employee_user_id property; an initials property; a title property; an education property; a background property; a date_hired property; a work_hours property; a friday_group property; a special_projects property; an active_case_count property; a rating property; a ts_nickname_1 property; a ts_nickname_2 property; and a ts_name$_{id}$ property.

The employee object 424 contains supplemental data about employees of the operating organization only. The employee id property contains the database-unique identifier of the individual employee object in the database of the present invention. The supervisor_user_id property contains the identifier in the User table of this employee's supervisor (the user table containing instances of the user object 420). The employee_user_id property contains a foreign key in the user table. The initials property contains the employee's initials, e.g., MLR, and is used for reporting and displays where space is limited. The title property contains the employee's job position within the operating organization, i.e., "Director", "Management", "Consultant", etc. The education property contains information on the employee's educational background, e.g., "M.S., Horticulture, J.D., Brown University, 1977". The background property contains background information on the employee. The date_hired property contains the date this employee was hired. The work_hours property contains information on the employee's typical work schedule, e.g., "6:30 a.m.–4:30 p.m." Similarly, the friday_group property contains information on which Friday the employee works, e.g., "A" or "B". The special_projects group contains notes on any special projects in which the employee is involved. The active_case_count property contains the number of cases currently assigned to the Consultant and is used to "suggest" assignment options. The ratings property contains a numerical evaluation of the relative capability of the Consultant regarding EEO cases which in turn may assist in formulating assignment suggestions made by the present invention. A higher number is better than a lower number. The ts_nickname_1 and ts_nickname_2 properties contain the employee's "nickname" (NAME.Nick.Name1) for the accounting program, e.g., "MRoach," and secondary "nickname" (NAME.NickName2), e.g., "9", respectively. Finally, the ts_name_id property contains the accounting program's identifier of the individual, (NAME.RecordID), e.g., "13".

The status_history object 426 has, for example: an entity_id property, an entity_name property; a date_modified property a user_id property; and a status_code property.

The status_history object 426 represents changes to entities within the database, including the new status, the user involved in the change, and the date the change was made. The previous status will be derived by examining all entries for a specific entity in date order. The entity_id property contains a Primary Key indicator into, for example, an <entity> table. The entity_name property contains the table name which represents the entity, and is used in conjunction with the entity_id property as a key. The date_modified property contains the date on which the change was made. The user_id property contains the database-unique identifier for the user. The status_code property contains the status code resulting from the change to the entity.

The activity object 428 has, for example: an activity_id property; a case_sub_status_id property; a case status_id property; an activity_name property; an activity_description property; a ts_task_code property; a sort_sequence property; an activity_sequence property; and a locked_ind property.

The properties of the activity object 428 are the "approved activities" that may be logged into the activity_jog object 422. This standardization is done primarily to promote consistency in reporting and billing. The activity_id property contains a database-unique identifier for this activity that is used to identify uniquely the object in the database. The case_sub_status_id and the case_status_id properties reveal a sub-status and a status, respectively, of the case after this activity has occurred, i.e., by looking at the latest logged activity for a case on a given date, one can discern the status of the case on that day. The activity_name property gives a brief, descriptive name for the activity, e.g., "File Assigned." The activity_description property allows for a more lengthy exposition on the nature of the activity, e.g., "The case has been reviewed by management and assigned the responsibility of an individual consultant." The ts_task_code property contains the accounting program equivalent activity code for this activity. The default value for the ts_task_code property is equal to "I." The sort_sequence property indicates the order in which items are displayed in controls such as dropdowns. The activity_sequence property indicates where in the life cycle this activity occurs in relation to other activities, thus enabling the interface to determine which activity or activities should occur "next," and suggests same to the user. The locked_ind property, if set, for example, to the value 1, allows only the system to make entries using this activity, thereby "locking out" the user to prevent him or her from entering activities such as "Case Created" which are under sole control of the application. The activity_nd property, if set to, for example, the value 1, allows for a_valid entry in the Activity Log. Likewise, the calendar_ind property, if set to, for example, the value 1, allows for a valid entry in the Case Calendar.

The case_calendar object 430 has, for example: a calendar_id property, a case_id property; a user_id property; an activity_id property; an event_date property; a description property; a closed_ind property; and an event-title property.

The case_calendar object 430 tracks the calendar of events for a specific case. The description property contains a textual description of the event for the case. The event-date property contains the date and time of the scheduled event. The closed_ind property, if set, for example, to the value 1, indicates that the event has taken place. The event_title property contains the title of the calendar event. The calendar_id property contains the database-unique identifier which uniquely identifies the case_calendar object within the database. The activity_id property contains the activity which has been scheduled for the case. The case_id property contains the information on the specific case to which the calendar of events pertains. Finally, the user_id property contains the name of the operating organization's Consultant who is scheduling the event.

The complaint object 432 (FIG. 5*b*) has, for example: a complaint_id property; a submission_user_id property; a submission_type_id property; a complainant_first_name property; a complainant_last_name property; a work_address_id property; a complaint property; a client_hq_id property; a job_title property; a note property; a date_reported property; a report recipient property; a client_action property; a sjbc_action property; a submission_no property; a submission_date property; an emp_name property; an emp_division property; an emp_location property; a status_code property; and a complainant_contact_times property.

The complaint object 432 (FIG. 5*b*) contains the salient characteristics of an internal complaint which is filed online, by telephone, facsimile or mail. In internal complaint is not filed with the EEOC or an FEP Agency. The sjbc_action property contains the action to be taken by the operating organization regarding this complaint, if any, as directed by the client. The submission_no property contains the identifier number assigned by the present invention for the complaint and which uniquely identifies the complaint. The submission_no identifier number may not be the same as the case number of the case to which the complaint is assigned. The client-action property contains the action taken to date by the client on this complaint, if any. The report-recipient property contains a concise description of the recipient of the complaint, if the complainant form is completed by one other than the complainant, e.g., "Bess Motta, HR, Workout Productions, Inc." This corresponds to the date-reported property column in this table, which contains the date the complaint was actually reported to an appropriate agency, authority, consulting firm, etc. This in turn corresponds to the report recipient property in this table, as above. The emp_location property contains the employer's location. The status_code property, if set, for example, to the value 1, indicates that this complaint has been deleted from the perspective of the present invention's users. The submission_date property indicates the date on which the complaint was submitted to the operating organization. The emp_division property indicates the employer's division. The emp_name property contains the name of the employer, i.e., the name of the operating organization's client, e.g., "ACMI, Inc." The complainant_contact_times property contains information on the best time to contact the Complainant and is entered into the system during the complaint creation, as provided by the complainant. The submission_type_id property contains a database unique identifier, e.g., "2", which uniquely identifies the submission-type object in the database of the present invention. The complainant_first_name and the complainant_last_name properties contain the first name, e.g., "Michael," and the last name, e.g., "Jackson," of the complainant, respectively. The submission_user_id property contains a database-unique identifier which uniquely identifies this contact. This contact identifier changes when a modification to the address or title properties is made. The complaint_id property contains a database-unique identifier which uniquely identifies the complaint in the database of the present invention. The note property allows for storage of special notes pertaining to this case. The client_hq_id property contains the identifier of the Top-Level-Client (such as Employer) in this particular case, e.g., "3124." The job-title property contains the job title of the Complainant, e.g., "Line Foreman." The complaint property contains the textual complaint, submitted by the Complainant or a representative. A "charge" indicates the text is submitted by the agency. The work_address_id property indicates the office address of the complainant. The home phone of the Complainant is included in the address table row, specifically, in the aux_phone property.

The submission-type object 434 has, for example: a submission_type id property; a type_name property; and a description property.

The submission-type object 434 defines the various ways a complaint can be input to the present invention. Valid values may include "Online", "Fax" or "Phone." Other potential designations may include "by Proxy" and "by Agency". The submission_type_id property contains the database-unique identifier which uniquely identifies the submission_type object within the database, e.g., "2." The type_name property contains the type of submission, e.g., "phone." Finally, the description property contains a short description of the submission type.

The te_counter object 436 has, for example: a counter property. The te_counter object 436 is a table which serves as a sequence counter for generating unique, sequential TE codes for use in the accounting program. The counter property contains a counter value, such as a large integer.

The issue object 512 has, for example: an issue_id property and an issue_name property. The issue object 512 contains the various issues surrounding a claim, e.g., discipline, promotion, harassment, etc. The issue_id property contains a database-unique identifier which uniquely identifies the particular issue object in the database. The issue_name property contains the name of the issue as it appears in documents, checkbox labels, etc., e.g., "Discipline."

The case_issue object 510 has, for example: an issue_id property; a case_id and an agency_id property. The case_issue object 510 contains the legal issue under which a case is filed. Examples may include hiring, discipline or promotion issues. The issue_id and case_id properties contain database_unique identifiers which uniquely identifies the case_issue object 510 within the database. The agency_id property contains a database-unique identifier which uniquely identifies the agency associated with the case issue.

The basis object 508 has, for example: a basis_id property and a basis_name property. The basis object 508 contains the various bases, or criteria, under which a discrimination claim may be filed. Examples include, but are not limited to, age discrimination, sex discrimination, race discrimination, and the like. The basis_id property contains a database-unique identifier which uniquely identifies an object in the database. The basis_name property contains the name of the individual case basis as it appears in the corresponding documents, checkbox labels, etc., e.g., "sex."

The case_basis object 506 has, for example: a basis_id property; a case_id; and an agency_id. The case_basis object 506 contains the legal basis (or bases) under which a case is filed, e.g., sex discrimination, race discrimination or age discrimination. The case_id and agency_id properties contain database-unique identifiers that uniquely identifies the particular case_basis object within the database of the present invention. Likewise, the basis_id property contains a database-unique identifier which uniquely identifies the legal basis for the case, e.g., "sex".

The charge object 502 (FIG. 5a) has, for example: an agency_id property; a case_id property; an agency_contact id property; a primary_ind property; a date_filed property; a note property; a determination_date property; a date_reopened property; a charge no property; a class_action_ind property; a resolution_date property; and a determination_type_id property.

The charge object 502 (FIG. 5a) contains a claim which is associated with a particular case and which represents a filing with an individual agency regarding a complaint. The set of claims referencing an individual complaint is assigned to a single case object 402. The date_reopened property contains the date the case was reopened by the agency. The determination_date contains the date of the final determination that is rendered by the agency. The note property pertains to the particular claim filing. The charge-no property contains the charge number assigned by the filing agency, e.g., "1267-A-00121". The class_action_ind property, if set, for example, to the value 1, indicates that this charge has the potential for a class action suit. The resolution_date property contains the date that the charge was resolved. The case_id property contains a database-unique identifier which uniquely identifies the charge object within the database of the present invention. The agency_id property contains a database-unique identifier which uniquely identifies the associated agency within the database. The date_filed property contains the date on which this claim was filed with the agency. The primary_ind property indicates that this claim is the primary claim in a case. Only the primary agency receives the reports and other like correspondence, although secondary agencies may receive requests to approve a claim closure but only after the primary agency has rendered the final decision. The determination_type id property contains a database-unique identifier which uniquely identifies the determination_type object associated with the charge object. Finally, the agency_contact_id property contains a database-unique identifier for the agency_contact object with the charge object.

The agency object 504 has, for example: an agency_id property; an address_id property; an agency_name property; an agency_type property; a director-name property; a url property; a time-zone property; a notes property; and a status_code property.

The agency object 504 contains information on EEOC and FEP agencies association with specific cases. The agency_id property contains a database-unique identifier that is used to identify uniquely the agency object in the database. The address_id property contains the database-unique identifier to the address object of the agency office. Similarly, the agency-name property contains the name of the agency, e.g., "Nebraska Equal Opportunity Commission." The agency_type property indicates the level at which the agency exists. Values are controlled by user interface and include "Federal," "State," "Local," or "Other." The director_name property contains the full name of the Executive Director of the agency, e.g., "Mr. Al E. Katt, Esq." The url property contains the Uniform Resource Locator ("URL") of the agency's office web site, e.g., http://www.state.ne.us/home/NEOC/. The time_zone property, abbreviated with E, C, M or P, lists the time zone in which the agency is located, that is, Eastern, Central, Mountain or Pacific time, respectively. The notes property allows for special notations regarding the agency, e.g., the agency's extension policy. Finally, the status_code property contains a code identifier indicating the status of the agency.

The agency_contact object 514 has, for example: an agency_contact id property; an agency_id property; an address_id property; a last_name property; a first_name property; a title property; an investigator_ind property; an executive_ind property; a notes property; and a status_code property.

The agency_contact object 514 contains information on points of contact at the EEO or FEP agency. The investigator_ind property indicates whether this individual is an Investigator for the agency. The individual's title, e.g., "Investigator," is contained in the title property. The executive_ind property indicates whether or not the individual is the Executive Director of the agency. The notes property allows for the user to include his or her own notes regarding the agency contact, e.g. "never finds in favor of the respondent." The status_code property, if set to, for example, the value 1, indicates that this contact is no longer an active contact. The agency_id property contains a database-unique identifier which uniquely identifies the agency object in the database that is related to the particular agency contact. The agency-contact_id contains a database-unique identifier that uniquely identifies the agency-contact object in the database. The first_name property contains the first name of the agency personnel, e.g., "Ronald". Likewise, the last_name property contains the last name of the agency personnel, e.g., "McDonald." The address_id property allows the user to include the address of the person, with a default value derived from EEO_AGENCY.ADDRESS_ID.

The address object 516 has, for example: an address_id property; an address_1 property; an address_2 property; an address_3 property; a city property; a state property; a postal-code property; a phone property; an extension property; a facsimile property; an email property; an addressee_name property; an aux_phone property; an aux_phone_note property; a home_address_ind property; and a home-Phone property.

The address property 516 contains address information for any entity in the database which requires an address. Optional information for a given entity, such as the entity's telephone or facsimile numbers or electronic mail address, may need to be included in certain situations, e.g., when a user has a corporate address_id but a personal telephone number. The address_id property contains a database-unique identifier that identifies a particular address object in the database. The address_1 property contains the user's specific street address information. Likewise, the address_2 property allows for a second street address line to include additional information such as an office's suite number within a multi-office complex. The third address line, contained within the address-3 property, is used primarily for large offices which may have their own internal mail department codes. The city, state and postal code properties are used to further identify the user's address. The phone property contains the telephone number associated with the user's address. In cases where the address is an office for multiple individuals, this property would contain the main "switchboard" telephone number. The extension property contains the user's specific extension, again used where the address is an office for multiple users. The facsimile property contains the user's facsimile number and can be the user's personal or direct facsimile number or the general facsimile number used in an office with multiple individuals. The email property identifies the electronic mail address of the individual user. The addressee_name property contains the name of the addressee. However, in cases where this is the user, the addressee value will be null. This column exists to reference individuals who are addressed in the present invention cases but who are not users of the present invention. The aux_phone property can contain an auxiliary telephone number for the address entry. In the case of a Complainant, for example, this would be used for the home telephone number. Other addresses, however, may use it for a cellular telephone number, a main receptionist telephone number, and the like. The aux_phone_note property allows for a brief description of the telephone number listed in the aux_phone property, such as "Home Phone," "Cell Phone" "Number for Weekends," etc. The home_address_ind property, when set to, for example, the value 1, indicates that the address listed in this record is a Home address. Similarly, the home_phone property, when set to, for example, the value 1, indicates that the telephone number listed in this record is the user's home telephone number.

The determination_type object 518 has, for example: a determination_type id property; a type_name property; and an active_ind property.

The determination_type object 518 represents types of determinations that can be associated with an external charge. The determination_type id property contains a database-unique identifier which uniquely identifies the determination_type object within the database. The type_name property contains the name of the dismissal type, e.g., "Cause", "Dismissal" and "Other." The term "Dismissed" is contained in the case_status property column and therefor, is not stored in the determination-type object 518. Finally, the active_ind property, if set, for example, to the value 1, indicates a valid dismissal type. If set to other than 1, this type is no longer a valid option.

The user_role object 602 has, for example: a user_id property; and a role_id property. The user_role object 602 is used to indicate a user's role within a case or organization. The user_id property links the particular user_role object to the user object 420. Similarly, the role_id property links the user_role object to the particular role object 604.

The user_role object 602 associates users with their respective roles in the present invention. The user_id property contains a database-unique identifier which uniquely identifies the user in the user_role database. Likewise, the role_id property contains a database-unique identifier which uniquely identifies the role of the user in the user_role database.

The role object 604 has, for example: a role_id property; a role_title property; a role_name property; a role_desc property; an employee ind property; and a client_ind property.

The role object 604 represents the roles that users can play in the present invention, as indicated with a corresponding number. Illustrative examples include role 1, Management; role 2, Administrative Assistant; role 3, Consultant; role 4, Client Executive Management; role 5, Client Human Resources Management; role 6, Client Legal; role 7, Client claims; role 8, Client Law Firm; role 9, Government Agency; role 10, Client Contact; role 11, Director; role 12, Complaint Filer; or role 13, Client A/P. The role_id property contains a database-unique identifier which uniquely identifies the role in the database. The role-title property contains what is displayed to the user as the name of the role, e.g., "Management." The role_name property contains the name of the type of role, used internally to the system as a key, e.g., "MGT." The role_desc property contains an extended description of the role, e.g., "The people within the operating organization who make initial decisions as to which cases get assigned to which consultants." The employee-ind property, when set, for example, to the value 1, indicates the role is applicable to the operating organization employees and is used by the graphical user interface ("GUI") to populate the selection object. Finally, the client_ind property, when set, for example, to the value 1, indicates that this role is applicable to clients of the present invention and is used by the GUI to populate the selection object.

The role_report object 608 has, for example: a report_id property; and a role_id property.

The role_report object 608 defines which roles within the present invention are candidates to receive which Alerts. Case affiliation must also be accounted for in alert distribution. The report_id property and the role_id property each contain a database-unique identifier which uniquely identifies the report and the role, respectively, within the database.

The report object 610 has, for example: a report_id property; a report title property; and an orientation property.

The report object 610 represents reports generated with the present invention, e.g., Client General Report, Client Specific Report, Client Numerical Report, Weekly Status Report, etc. Position Reports, Fact Finding Reports, etc. are considered documents and thus, are not represented in this report object 610. The report_id property contains a database-unique identifier which uniquely identifies the report in the database. The report-title property contains the default title for the report, i.e., "claims Summary." If desired, each client can have a unique name for the report as defined in the client_report table. Finally, the orientation property contains a single character code to designate whether the report is in "P" for Portrait format or in "L" for Landscape format.

The role_alert object 606 has, for example, an alert_id property and a role_id property. The role_alert object 606 defines which roles within the present invention are candidates to receive which Alerts. Case affiliation must also be accounted for in Alert distribution. The role_id property contains a database-unique identifier which uniquely identifies the role in the database of the present invention. Likewise, the alert_id property contains a database-unique identifier which uniquely identifies the alert in the database of the present invention.

The user_alert object 806 has, for example, a user_id property and an alert_id property. The user_alert object 806 defines which users of the present invention are recipients of which alerts. Case affiliation must also be accounted for in alert distribution. The alert_id property contains a database-unique identifier which uniquely identifies the alert in the user_alert database. The user_id property contains a database-unique identifier which uniquely identifies the user in the user_alert database.

The alert object 802 has, for example: an alert_id property; an alert_name property; an alert_desc property; an alert_message property; an alert_title property; an alert_subject property; an email_ind property; and a website_ind property.

The alert object 802 represents alerts delivered by the present invention, some of which will be represented in the database while others will be represented in code. The alert_id property contains a database-unique identifier which uniquely identifies the alert object in the database. The alert_name property contains the name of the specific alert, e.g., "Exit Interview Conducted," and is used internally by the system code. The alert_desc contains a textual description of the alert. The alert_message contains the content of the message to be included in any alert notification, e.g., "The case noted above has been opened." This could be concatenated into the specifics of the alert, e.g., "Case #", enabling the tone of the message to be modified at a later date as necessary by the administrator. The alert_title property is the "name" of the alert to be used when assigning recipients to alerts during client set-up. The alert_subject property contains textual information on the specific subject to which the alert pertains. The email_ind property, if set, for example, to the value 1, delivers the alert to the user via electronic mail. Similarly, the website ind property, if set, for example, to the value 1, delivers the alert to the user via the web site of the present invention.

The alert_history object 804 has, for example: an alert_history d property; an alert_id property; a user_id property; an alert-subject property; an alert_body property; a date_added property; a date_sent property; and a date_viewed property.

The alert_history object 804 contains history of alerts delivered by the present invention. The alert_history_id property uniquely identifies the alert_history object in the database. The alert_id property contains a database-unique identifier which links the alert_history object to an alert object 802. The user_id property links the alert_history object 804 to a user object 420. The alert_subject property stores a subject line of the alert. The alert_body property stores a detailed description of the alert event. The date_added property indicates when the alert_history object was added to the database. The date-sent property contains the date the alert was sent. The date_viewed property contains the date the user viewed the alert.

The invoice_master object 702 has, for example: an invoice_id property; a case_id property; a start_date property; an end-date property; an invoice_date property; a ts_record-id property; a fee_amount property; expense_amount property; and a pif_ind property.

The invoice_master object 702 contains a master file of invoice information associated with all cases of the present invention. The invoice_id property identifies the invoice_master object 702 and contains a database-unique identifier which uniquely identifies the invoice in the database. The ts_record_id property contains the database unique identifier from the accounting program where the invoice is generated. This is used to transfer data between the accounting program and the present invention. The invoice_date property contains the date of the invoice as extracted from the accounting program. The fee_amount property contains the amount due in expenses as extracted from the accounting program. The pif_ind property, if set, for example, to the value 1, indicates the invoice has been acknowledged as "Paid in Full." This is useful if a portion of an invoice is "forgiven" so that the invoice can be designated as "PIF" even though the paid-amount is less than the total of the fee_amount plus the expense_amount. The invoice_id property contains a database-unique identifier which uniquely identifies the invoice in the database. The start_date property and the end_date property identify the beginning date of the billing period and the ending date of the billing period, respectively, for the invoice. The case_id property contains a database-unique identifier which uniquely identifies the case within the database of the present invention.

The payment object 704 has, for example: a payment_id property; an invoice_id property; a payment_no property; an authorizing_user_id property; a paid_amount property; a payment_date property; a note property; and a payment_type property.

The payment object 704 represents payments made against invoices in the invoice_master table. The payment_id property identifies the payment object 704. The invoice_id property contains a database-unique identifier which uniquely identifies the invoice in the database. The payment no property contains the sequential number of the payment relative to the invoice indicated by invoice_id, e.g., "2". The authorizing_user_id property indicates the client representative and user of the present invention who authorized the payment. The paid_amount property indicates the amount which has been paid by the client. Similarly, the payment-date property indicates the date of the client's payment. The note property contains miscellaneous textual notes about the payment, for example, the check number. Finally, the payment-type property contains the single character code denoting the payment type. Valid values for the payment-type property include: "D" for payment via direct deposit; "W" for payment via wire transfer; "C" for payment via credit card; "H" for payment via check; and "0" for payment via other means such as cash, money order, etc.

The client_hq object 1106 has, for example: a client_hq_id property; an address_id property; a client_name property; a client_name_short property; a display_name property; a client_type property; a client_dba_name property; a file_number prefix property; a file_number_counter property; an aliases property; a products_services property; a president_name property; a url property; a ceo_name property; a state_federal_contract_ind property; an employee_count property; a corporate_union_ind property; a time_zone property; an incorporation_state property; an rfi_turnaround property; a ps_turnaround property; a followup_period property; an update_period property; a witness_interview_ind property; an int_rate property; an int rate_type property; an ext_rate property; an ext_rate_type property; and an exit_interview_ind property.

The client_hq object 1106 contains data pertaining to the client of the present invention. Certain information stored here, e.g., accounting, addresses, etc., is available for "child" client entities to use either directly, or to copy from the parent. A copy would be an independent source which may be changed within the scope of the client, whereas an inherited address, for example, experiences change whenever the parent is changed. The client_hq property contains a database-unique identifier which uniquely identifies the client in the database. The address_id property uniquely identifies the instance of the client_hq object 1106 in the database of the present invention. The client_name property contains the name of the client, e.g., "Sam's Trout Packing Co., Ltd.", whereas the client_name_short property contains an abbreviated 8-character name for the client, e.g., "GM-PTDiv" which uniquely identifies the client within the present invention and is used for dropdown lists and other places. The display-name property contains the name of the client as it is to be displayed on reports, forms, correspondence, etc., e.g., "GM PowerTrain Division." The client-type property contains a single-character code to indicate the type of client, i.e., "C" for Corporate; "R" for Carrier; and "I" for Insured. The client_dba_name property contains the "Doing Business As" name of the client, e.g., "S. J. Bashen, Inc., d.b.a., S. J. Bashen Corporation", or "S. J. Bashen, Inc., d.b.a., S. J. Bashen EEOC Investigators." The file_number-prefix property contains the first portion of the case_number property identifier which has been assigned to all cases associated with this client, e.g., "AAA". This identifier would, in turn, have a sequential case number appended to it at case set-up time which results in a unique identifier such as, "AAA-BBB-0012," or, <client><complainant last name><sequential number>. In the event a last name has fewer than 3 characters, e.g., Wu, zeros are added to the end of the name to make it 3 characters, e.g., Wu0. The file_number_counter property is incremented as cases are created for the client and used when creating the case number. It may be necessary to "prime" this number for existing clients so that the file numbers do not overlap with existing cases. The aliases property contains other names by which the client may be known, especially in the case where a buyout has occurred. The products_services property contains the products and/or services offered by the client. The Standard Industrial Classification ("SIC"), however, is stored within the Client-Sic object 1108 table. The president_name property contains the name of the client president and is kept separately for information purposes in the event the president is not a user of the present invention. The url property contains the address of the client's web site. The ceo_name property contains the name of the client's Chief Executive Officer ("CEO") and is kept separately for informative purposes in the event the CEO is not a user of the present invention. The state_federal_contract_ind property indicates whether the client has contracts with the state of federal government. The Commissions always ask this question in Request for Information ("RFI"). The employee-count property contains the number of employees the client has. This property is relative to the scope of the client, e.g., if this client instance represents a single location, then this will only represent the number of employees at that location. For a "parent" client, however, this column may be used for conglomerate populations. The corporate_union_ind property, if set to, for example, the value 1, indicates that this client is a "union" shop, whereas if set to, for example, the value 0, indicates that it is not a union shop. The time_zone property is defined using a single character abbreviation to indicate the client's time_zone, i.e., "E" for the Eastern time zone; "C" for the Central time zone; "M" for the Mountain time zone; and "P" for the Pacific time zone. The incorporation_state property indicates the client's state of incorporation which may or may not be the same as the location state. The rfi_turnaround property indicates the number of days required for the client to respond to an RFI and is used to determine a client-specific RFI turnaround time. The ps_turnaround property contains the number of days required by the client to review a Position Statement. This number can be used to determine how many days in advance of the due date a Position Statement should be submitted for client review. The possibility of Rejection/sb is accounted for here. The followup_period property contains the number of weeks for which the operating organization will monitor and subsequently inform a client of the activity of a case after the submission of the Position Statement. The default for this followup_period property is typically set to the value 24. The update_period property contains the numbers of days between follow-up updates submitted to the client by the operating organization on a "closed" case, e.g., "The operating organization will submit a change update every X days after a case is closed." The default for this update_period property is set to the value 30. The witness_interview-ind property, if set, for example, to the value 1, indicates that the operating organization conducts witness interviews, and if set, for example, to the value 0, indicates that the client or other organization conducts the witness interviews. The exit_interview property, if set, for example, to the value 1, indicates that the client requires an exit interview to be performed by the operating organization prior to the closure of the case. The int-rate property, with a default value rate set in U.S. dollars, is applied to work done for this client for internal cases. This default value rate is inherited by cases pursued for this client. Similarly, the int_rate_type property contains a single code indicating the default rate_type for this client for internal cases. Specifically, valid values are set at "F" for a flat rate and at "H" for an hourly rate. Likewise, the ext_rate property, with a default value rate set in U.S. dollars, is applied to work done for this client for external cases. The default value rate is inherited by cases pursued for this client. Similarly, the ext_rate_type property contains a single code indicating the default rate_type for this client for external cases. Specifically, valid values are set at "F" for a flat rate and at "H" for an hourly rate.

A client_contact object 1102 has, for example, a client_contact_id property, as well as a series of properties including, for example: a user_id property; an address_id property; a title property; an active_ind property; and a status_code property.

Any client_contact can be represented in the client_contact object 1102. The client_contact_id property contains a database-unique identifier for this particular contact. The identifier of the contact will change when a modification to Address or Title occurs. The user_id property contains the client_contact which may be one of many client contacts. The address-id property uniquely identifies the instance of the client_contact object 1102 in the database of the present invention. The title property contains the title of the contact within the scope of the client, e.g., "President." The active_ind property allows deactivation of contact, whereas when set to, for example, the value 0, indicates normal activation, and when set to, for example, the value 1, indicates deactivated. Deactivation is not the equivalent of deletion, however. Finally, the status_code property contains the status of the contact, wherein when set to, for example, the value 0, indicates normal status, and when set to, for example, the value 1, indicates it has been deleted.

A client_division object 1104 has, for example, a client_division_id property, as well as a series of properties including, for example: a client_hq_id property; an address_id property; a client_name property; a client_name_short property; a display-name property; a client_type property; a file_number_prefix property; a time_zone property; an rfi_turnaround property; a ps_turnaround property; a followup_period property; an update_period property; a witness_interview property; an int_rate property; an int_rate_type property; an ext_rate property; an ext_rate_type property; and an exit_interview_ind property.

The client_division property 1104 contains data pertaining to the client of the present invention. Certain information stored here, e.g., addresses, accounting, etc., will be available for "child" client entities to use directly or to copy from the parent. A copy would be an independent source which may be changed within the scope of the client, whereas an inherited address, or child, will experience change whenever the parent is changed. The update_period property indicates the number of days between follow-up updates submitted to the client by the operating organization on a "closed" case, with a default value equal to 30. An example may read, "S. J. Bashen Corporation will submit a change update every X days after a case is closed." The witness_interview_ind property, when set to, for example, the value 1, indicates that the operating organization conducts witness interviews, whereas when set to, for example, the value 0, indicates that the client (or other organization) conducts them. The followup_period property indicates the number of weeks the operating organization will monitor a case after the submission of a "Position Statement" and subsequently inform the client of the activity. The default value for this followup_period property is set to 24. The ps_turnaround property indicates the number of days required by the client to review the Position Statement. This number can be used to determine how many days in advance of the due date a Position Statement should be submitted for client review. The possibility of rejection s/b is accounted for here. The rfi_turnaround property contains the number of days required for the client to respond to an RFI and is used to determine client-specific RFI turnaround time. The ext_rate property indicates the default rate, in U.S. dollars, which is applied to work done for this client for external cases. This value is inherited by cases pursued for this client. Similarly, the ext_rate_type contains a single character code indicating the default rate_type for this client for external cases. Valid values for this property are "F" for flat rate and "H" for hourly rate. Likewise, the int_rate property indicates the default rate, in U.S. dollars, which is applied to work done for a client for internal cases and is inherited by cases pursued for this client. Similarly, the int_rate_type property is a single character code containing an indication of the default rate type for this client for internal cases. Valid values for this property are "F" for flat rate and "H" for hourly rate. The exit_interview_ind property, if set to, for example, the value 1, indicates that the client requires an exit interview to be performed by the operating organization prior to closure of the case. The value for this property is inherited from the client_hq property upon the row creation. The address_id property uniquely identifies the instance of the client_division object 1104 in the database of the present invention. The client_name property contains the name of the client, e.g., "Sam's Trout Packing Co., Ltd." The client_hq_id and client_division properties each contain a database-unique identifier which uniquely identifies the client. The time_zone property indicates the time zone of the client using the following abbreviations: "E" for Eastern time zone; "C" for Central time zone; "M" for mountain time zone; and "P" for Pacific time zone. The file_number_prefix property contains the first portion of the case_number identifier assigned to cases affiliated with this client, e.g., "AAA." This would have a sequential case number appended to it at case set-up time, to result in a unique identifier such as "AAA-BBB-0012," which indicates <client><complainant last name><sequential number>. In the event a last name is fewer than 3 characters, e.g., Wu, the name is padded with 0's so that it is at least 3 characters. The client_name_short property contains an abbreviated 8-character name for the client which uniquely defines it within the present invention for use in dropdown lists and other places, e.g., "GM-PTDiv". The client_type property contains the single-character code which indicates the type of client, i.e., "C" for Corporate; "R" for Carrier; or "I" for Insured. Finally, the display-name property contains the name of the client as it is to be displayed on reports, forms, correspondence, etc., e.g., "GM PowerTrain Division."

The client_contacts object 1118 has, for example: a client_contacts_id property; a client_hq_id property; a client_contact_id property; a client_location_id property; a client_division_id property; a bill_to_ind property; a primary_poc_ind property; a bill_to_cc_ind property; an ap_poc_ind property; an active_. . . ind property; and a status-code property.

The client_contacts object 1118 is a table which allows an existing client contact record to be associated to additional clients and supports the case where a single Human Resources person or Manager may be the contact for several locations or divisions. The bill_to_cc_ind property, if set to, for example, the value 1, copies the contact on the invoices. This applies more to recipients of hard copy invoices rather than online invoices. Similarly, the bill_to_ind property, if set to, for example, the value 1, indicates the contact who is to receive the original invoices. The primary_poc_ind property, if set to, for example, the value 1, establishes this contact as the main point of contact for the client. The ap_poc_ind property, if set to, for example, the value 1, establishes Accounts Payable as the point of contact for the client and may or may not be the same person indicated in the bill_to recipient property. The active_ind property, if set to, for example, the value 1, allows deactivation of contact, whereas when set to, for example, the value 0, indicates a normal status. Deactivation is not the same as deletion, however. The status_code property indicates the status of the client contacts, whereas when set to 0 indicates a normal status, and when set to 1 indicates a deleted status. The client_hq_id property contains a database-unique identifier which uniquely identifies the client. The client_contacts_id uniquely identifies the instance of the client_contacts object 1118 in the database of the present invention. The client_division_id contains a database-unique which uniquely identifies the client. The client_contact_id property contains a database-unique identifier for this contact and changes with any modification to the Address or Title properties. Finally, the client_location_id property contains a database-unique identifier which uniquely identifies the client.

The client_note object 1116 has, for example: a client_note_id property; a client_location_id property; a client_division_id property; a client_hq_id property; a note property; a user_id property; and a note-date property.

The client_note object 1116 enables multiple notes to be stored per client. The note property contains the text of the note. The client_h id property, the client_division_id property and the client_location property each contain a database-unique identifier which uniquely identifies the specific client in the client_note object. The user_id property identifies the user (author) of the note. The note_date property indicates when the note was created or edited. The client_note property uniquely identifies the instance of the client_note object 1116 in the database of the present invention.

The union_type object 1122 has, for example: a union_type_id property; a name property; an abbreviation property; and a url property.

The union_type object 1122 contains the union organizations. Local unions refer to this as their union_type in the client table. An example of a union_type is the "United Auto Workers." The union_type_id property uniquely identifies the union type. The name property contains the full name of the union, e.g., the "United Auto Workers", whereas the abbreviation property contains the abbreviation for the union, e.g., "U.A.W."

The client_union object 1120 has, for example: a union_type_id property; client_location_id property; a client_division_id property; a client_hq_id property; an address_id property; a local_number property; a url property; a cba_online_ind property; and an abbreviation property.

The client_union object 1120 represents the relationship between the client and the union(s) which exist(s) in its shop. The local_number property contains the union's local_number, e.g., "UAW Local #524". A null value implies that there is no local union. The address_id property uniquely identifies the instance of the client_union object 1120 in the database of the present invention. The url property contains the URL address to the web site of the local union. The cba_online_ind property, if set, for example, to a value of 1, indicates that the Local Union's Collective Bargaining Agreement ("CBA") is available online, presumably at the web site of the Local Union. The abbreviation property indicates the client union's abbreviation, e.g., "UAW" for United Auto Workers. The union_type_id property indicates that the type of union, typically the national or world organization under which the local union exists, e.g., "United Auto Workers". The client_hq_id property, the client_location_id property and the client_division_id property each has a database-unique identifier which uniquely identifies the client union in the database.

The client_location object 1114 has, for example: a client_location_id property; a client_hq_id property; a client_division_id property; an address_id property; a client_name property; a client_name_short property; a display-name property; a client_type property; a time_zone property; a policy-number property; and a policy_deductible property.

The client_location object 1114 contains the specific client_location for this case. The client_location_id, the client_h id and the client_division_id properties each contain a database-unique identifier which uniquely identifies the client in the database. The address_id property uniquely identifies the instance of the client_location object 1114 in the database of the present invention. The client_name property contains the name of the client, e.g., "Sam's Trout Packing Co., Ltd." The display-name property contains the name of the client as it is to be displayed on reports, forms, correspondence, etc., e.g., "GM PowerTrain Division," whereas the client_name_short property contains an abbreviated 8-character name for the client which uniquely identifies it within the present invention for use in dropdown lists and other places. An example of a client's short name may be "GM-PTDiv." The client_type property contains a single character code to indicate the type of client, i.e., "C" for Corporate; "R" for Carrier; "I" for Insured. The time-zone property uses a single character code to indicate the time zone where the client is located, i.e., "E" for the Eastern time zone; "C" for the Central time zone; "M" for the Mountain time zone; and "P" for the Pacific time zone. The policy-number property contains the policy number of the insured. The policy_deductible property contains the amount of the deductible on the insurance policy of the insured.

The sic object 1110 has, for example: a sic_code_id property; a sic_name property; a sic_description property; and a sic_code property.

The sic object 1110 contains a sic-code property which identifies the sic object 110. The sic_code_id property contains the actual Standard Industrial Classification ("SIC") codes and is also used as a database id. The sic_name property contains the name of the classification, whereas the sic_description property contains the description of the classification.

The client_sic object 1108 has, for example: a client_h id property; and a sic_code_id property. The client_sic object 1108 represents the M:M relationship between SICs and clients of the present invention. The sic_code_ind property is the actual SIC code which is also used as a database id. The client_hq_id property contains a database-unique identifier which uniquely identifies the client in the database.

The document-template object 1002 has, for example: a document-template-id property; a document-title property; a filename property; a version property; an open-date property; a close_date property; and an active_ind property.

The document-template object 1002 represents templates for client reports. When a Consultant requires communication to a client, the Consultant can generate a document-template and modify it to suit the specific details of the case. The DAT-002 has a list of available templates. The document_template_id property identifies the document_template object 1002 and if set, for example, to the value 1, indicates a valid document_template. The document_template_id property, when set to the value 0, for example, indicates that this template is retained for historical purposes only and is not to be used. The document_title property indicates a general but identifying name for the document, e.g., "Acknowledgment Letter." The filename property indicates the location of the physical file containing the template documents, typically in Microsoft WORD, manufactured by the Microsoft Corporation of Redmond, Wash., or an equivalent software application. In order to maintain an historical audit trail on the templates, a new physical file is made whenever there is an edit to a template. The previously active template is then denoted as "inactive" and the close_date is set appropriately. The version property indicates a version number used to track revisions of the template, e.g., "1.3a". The open date property indicates the date that this template became effective, e.g., Jul. 12, 2001. Likewise, the close-date property indicates the date that this template became inactive, e.g., Jul. 12, 2002. One reason a template may become inactive, for example, is possibly due to revision. Finally, the active-ind property, when set to the value 1, indicates that this is an active document_template.

The client_document_recipient object 1004 has, for example: a document_template_id property; a client_contacts_id property; an approval-ind property; and a copied-ind property.

The client_document-recipient object 1004 contains the relationship between reports and client_reps who receive the reports. Reports are associated with individuals rather than with roles which enables customization at every client level. The document_template_id property contains a database-unique identifier which uniquely identifies the document_template within the database. The client_contacts-id property uniquely identifies the instance of the client_document-recipient object 1004 in the database of the present invention. The approval_ind property, if set to, for example, the value 1, indicates that the user has approval authority to access the document. Typically, the default for the approval_ind property is set to, for example, the value 0. Finally, the copied_ind property, if set to, for example, the value 1, indicates that this client representative receives a copy of this document, i.e., in cases where a "cc" is distinguished from an original.

The client_document object 1006 has, for example: a document_template_id property; a client_division_id property; a document_title property; a required_ind property; a hardcopy_ind property; a hardcopy_distribution_method property; an approval_ind property; a client_document_id property; and a client_hq_id property.

The client_document object 1006 contains reports that are required by a client. The required_ind property, if set to, for example, the value 1, indicates that this document must be delivered to the client as appropriate in a case. The document_title property contains the tile applied to the document for this client. The default value is defined by document_template.document_title but can be changed should a client require a different title. The hardcopy_ind property indicates whether the client requires a hard copy of the report or reports submitted. Similarly, the hardcopy_distribution_method property indicates how a hard copy, if required, is distributed, e.g., by facsimile, by standard mail, via a weekly basket, etc. The approval_ind property, if set to, for example, the value 1, indicates that this document, e.g., the Position Statement, requires client approval. The default for this approval_ind property is set to, for example, the value 0. The client_document_id property uniquely identifies the instance of the client_document object 1006 in the database of the present invention. The document_template_id property contains a database-unique identifier which uniquely identifies the document in this database. The client_division_id property contains a database-unique identifier which uniquely identifies the client division. Typically, locations will inherit the documents. Finally, the client_hq_ind property contains a database-unique identifier which uniquely identifies the client.

The document_distribution object 918 has, for example: a document_distribution_id property; a response_date property; a view_date property; a response property; an approval_ind property; a date_added property; a client_contact_id property; an approval_status_id property; and a document-id property.

The document_distribution object 918 contains the individual distributions of documents to clients. It tracks data regarding view_date, approval status and distribution date. Further, multiple approvers are handled by this table via the approval_status_id property which is summarized to determine the ultimate approval status of the document. The document_distribution_id property identifies the document_distribution object 918. The response_date property contains the date the response was made by the client_contact. The view_date property contains the date that the client_contact first viewed the correspondence. The response property contains the content of the response by the client_contact. The approval_ind property, if set, for example, to the value 1, indicates the recipient must participate in the approval process for this document. The date_added property indicates the date that this distribution was made by the consultant. The approval_status_id property indicates approval status for an individual recipient of a document. The approval status for the documents overall is stored in case_document and represents a summarization of the approval statuses logged herein.

The correspondence-template object 902 has, for example: a correspondence_template-id property; a case_type_id property; a correspondence_name property; a body property; a subject property; an open_date property; a close_date property; an active_ind property; and a document_ind property.

The correspondence_template object 902 represents templates for client correspondence. When a Consultant requires communication to a client, the Consultant can generate a correspondence and modify it to suit the specific details of the case. The DAT-005 has a list of the available templates. The correspondence_template_id property contains a database-unique identifier which uniquely identifies the correspondence in the database. The case_type_id property, when specified, can offer multiple templates with the same purposes, customized by case type and can be used to filter offerings made to consultants. The correspondence_name property contains a general yet identifying name for the correspondence, e.g., "Acknowledgement Letter." The body property contains the "boilerplate" body of the correspondence and is presented to the user for completion of specifics. The subject property contains the subject line to appear with this correspondence. The open-date property contains the date that this template became effective, e.g., Jul. 12, 2001. Similarly, the close_date property contains the date that the template became inactive, e.g., Jul. 12, 2002. One reason a template may become inactive is because of a revision, for example. The active_ind property, if set, for example, to the value 1, indicates an active document_template. Finally, the document_mid property indicates if the correspondence has an attachment to send with it.

The client_correspondence_recipient object 904 has, for example: a client_correspondence_template_id property; and a client_contact_id property. The client_correspondence_recipient object 904 contains the relationship between the correspondence and client_reps who receive the correspondence. Correspondences are associated with individuals rather than with role which enables customization at every client level. The client_contacts_id property uniquely identifies the instances of the client_correspondence object 906 in the database of the present invention. The correspondence_template_id property contains a database-unique identifier which uniquely identifies the client correspondence in the database.

The client-correspondence object 906 has, for example: a correspondence_template_id property; a client_division_id property; a required-ind property; a client_hq_id property; and a client_correspondence_id property.

The client_correspondence object 906 represents those correspondences which are valid and/or required of the client, e.g., an acknowledgement letter. The client_division_id, the client_hq_id and the correspondence_template_id properties each contain a database-unique identifier which uniquely identifies the client. The required ind property, when set to, for example, the value 1, indicates that the correspondence MUST be delivered to the client as appropriate in a particular case. Finally, the client_correspondence_id property uniquely identifies the instance of the client_correspondence object 906 in the database of the present invention.

The case_correspondence object 908 has, for example: a correspondence_id property; a correspondence_template_id property; a case_id property; a date_added property; a body property; a subject property; and an added_by property.

The case_correspondence object 908 contains the correspondence information which has been published to different users of the present invention for a specific case. The body property contains the actual content of the body of the correspondence after the Consultant has modified it. The date_added property contains the date the correspondence was sent to the user. The subject property contains the actual content of the subject line of the correspondence after the operating organization Consultant has modified it. The added_by property contains the user identifier of the operating organization Consultant who constructs the correspondence. The correspondence_id property contains an identifier which uniquely identifies the instance of the case_correspondence object 908 in the database of the present invention. The case_id property contains the database-unique identifier which uniquely identifies the case within the database of the present invention. The correspondence_template_id property contains a database-unique identifier which uniquely identifies the correspondence within the database of the present invention.

The correspondence_distribution object 910 has, for example: a correspondence_distribution_id property; a correspondence_id property; a client_contact_id property; a view_date property; a response_date property; and a response property.

The correspondence_distribution object 910 contains a history of case correspondence that has been distributed to various client contacts. The view_date property contains the date that the client_contact viewed the correspondence, whereas the response_date property contains the date the response was made by the client_contact. The response property contains the content of the response by the client_contact. The correspondence_distribution_id property contains an identifier which uniquely identifies the instance of the correspondence_distribution object 910 in the database of the present invention. The client_contact_id property contains the identifier of the client_contact who is receiving the correspondence. Likewise, the correspondence_id property contains the identifier of the case_correspondence constructed for distribution to various client_contacts.

The approval_status object 914 has, for example, an approval_status_id property, as well as a series of properties including, for example: a status_name property; and an active_ind property.

The approval_status object 914 contains those valid values for approval status, e.g., Approved, Rejected, etc. The approval_status_id property contains a database-unique identifier which uniquely identifies the object in the database. The status_name property contains the text of the status, e.g., "Approved." Finally, the active_ind property, if set, for example, to a value of 1, indicates a valid status; otherwise, i.e., if set, for example, to a value of other than 1, it has been deactivated from further use.

The case_document object 916 has, for example: a document_id property; an approval_status_id property; a case_id property; a document_template-id property; a date-approved property; a locked_ind property; an override_by property; an override-reason property; a date_added property; an added_by property; a date_modified property; a modified_by property; a filename property; a document_title property; and an offline_ind property.

The case_document object 916 contains the present invention client reports. Examples of reports may include a "Tact Finding Report", a "Position Statement Report", etc. The added_by property contains the user identifier of the present invention Consultant who created the document. The date_modified property contains the date of the most recent modification to the document, while the date_added property contains the date the report was associated with a specific case. The override_reason property contains the reason the user performs the approval override action. The user who performs the approval override_reason action is identified in the override_by property. Override actions always require an explanation and are warranted when an approver is unavailable for review of the document. The document_title property contains the title of the document to distinguish it from other documents upon user review. The modified_by property contains the user identifier of the Consultant modifying the document. The filename property pertains to the name of the physical file which contains the actual case document generated using a document_template id property. The document_template_id property contains a database-unique identifier which uniquely identifies the document in the database. The offline_ind property, when set to, for example, the value 1, indicates that the "attached" document exists in hardcopy or electronic form for outside the present invention only. The approval_status_id property contains the code indicating the status of approval. The case_id property contains a database-unique identifier which uniquely identifies the case within the Database of the present invention. The document_id property uniquely identifies the instance of the case_document object 916 in the database of the present invention. The locked_ind property indicates that the case can no longer be modified. Finally, the date_approved property contains the date the document received approval by the client. This date-approved property indicates complete approval, i.e., all client representatives who are designated to approve a particular document have done so.

Operation of the Present Invention

In operation, the present invention can be accessed by a user on a client device such as a telephone, facsimile machine, email, company intranet, or via a wide area network such as the WWW of the Internet. While the present invention is accessible from the client devices mentioned above, the below explanation assumes that the user (Complainant) is accessing the present invention through the WWW. It should be noted that any other device that is capable of communicating with the server via a standardized protocol, such as TCP/IP, WAP, Bluetooth, or other protocol can be used as a client device and enable interaction with the present invention.

In the examples that follow, the user is accessing the present invention through a web browser on a personal computer that is connected to the Internet. The user designates the URL of the company intranet or web site that acts as a portal or interface for the user and the present invention. In the preferred embodiment of the present invention, the user is challenged to authenticate himself or herself. The authentication is accomplished by having the user enter a username and password. Once the user is authenticated to the present invention, the user is free to use the services of the present invention. It is contemplated with the present invention that access to the server may be accomplished by a proxy, such as an employee of the employer's human resources department. In such a scenario, the present invention may be enabled to restrict some, none, or all of the user's information stored on the present invention from the proxy, depending upon the requirements of the situation. While web-based examples are illustrated, other types of client devices, such as telephone and facsimile machines, are equally useful with the present invention.

In the preferred embodiment, the user is first presented with a welcome page that contains announcements, information regarding the user's case status, and one or more navigation aids. At this point, the user has several options, all accessible via navigation hyperlinks. The following example is illustrative of various tasks that may be accomplished by the present invention.

Adding a Calendar Event

The present invention is equipped with a calendar option that utilizes one or more of the objects in the alert distribution module 310 (see FIG. 8). To enter a calendar event, the user first gains access to the present invention through the authentication/authorization procedures, typically through a device such as personal computer 128. On the web page retrieved by server 104, a hyperlink to the calendar feature can be selected by the user. A Hyper Text Markup Language ("HTML") form is then presented to the user, who then inputs the appropriate data and submits the form for processing by the server, e.g., server 104 of FIG. 1.

Generally, data between the objects of the present invention and the data stored on the various database, either the databases of the present invention, or other database, are synchronized on a periodic, or on an as-needed basis. Other tasks or activities that can be accomplished by the present invention include, but are not limited to, the following:

Opening or closing a case;
Logging in to the present invention;
Associating a document with a case;
Selecting a user account;
Resetting a password obtained from a server;
Submitting a form to a server;
Generating a report;
Forwarding phone messages to a server of the present invention;
Forwarding an electronic facsimile to a server of the present invention;
Creating/editing contact information;
Completing a calendar event;
Creating an activity log entry;
Approving a pending item including, but not limited to, a payment, an invoice, a document, a task, and/or a request;
Viewing a case document;
Creating a case correspondence;
Viewing a case correspondence;
Selecting a document template;
Establishing a secure connection with the present invention;
Exchanging data in a secure manner between a server of the present invention and a client device in a secure manner;
Logging out of the present invention;
Searching for anything stored within the present invention;
Sending an email to the present invention;
Submitting an extension request;
Closing a file by a client;
Confirming a submission of a request or other activity to the server;
Reassigning a case;

Exporting an item to the accounting database;
Importing an item from the accounting database;
Sending a facsimile message internally within the present invention;
Obtaining a consensus among members of a project; and
Displaying and maintaining related cases.

Workflow

The following description and accompanying drawings illustrate the preferred methods of the present invention. While an order of steps is described herein, it will be understood by those skilled in the art that many of the steps described herein may be reordered without effect to the useful result of the present invention. Consequently, the order to the steps described herein are intended as a guide and not as a specific requirement of the order of steps.

Figure 12:
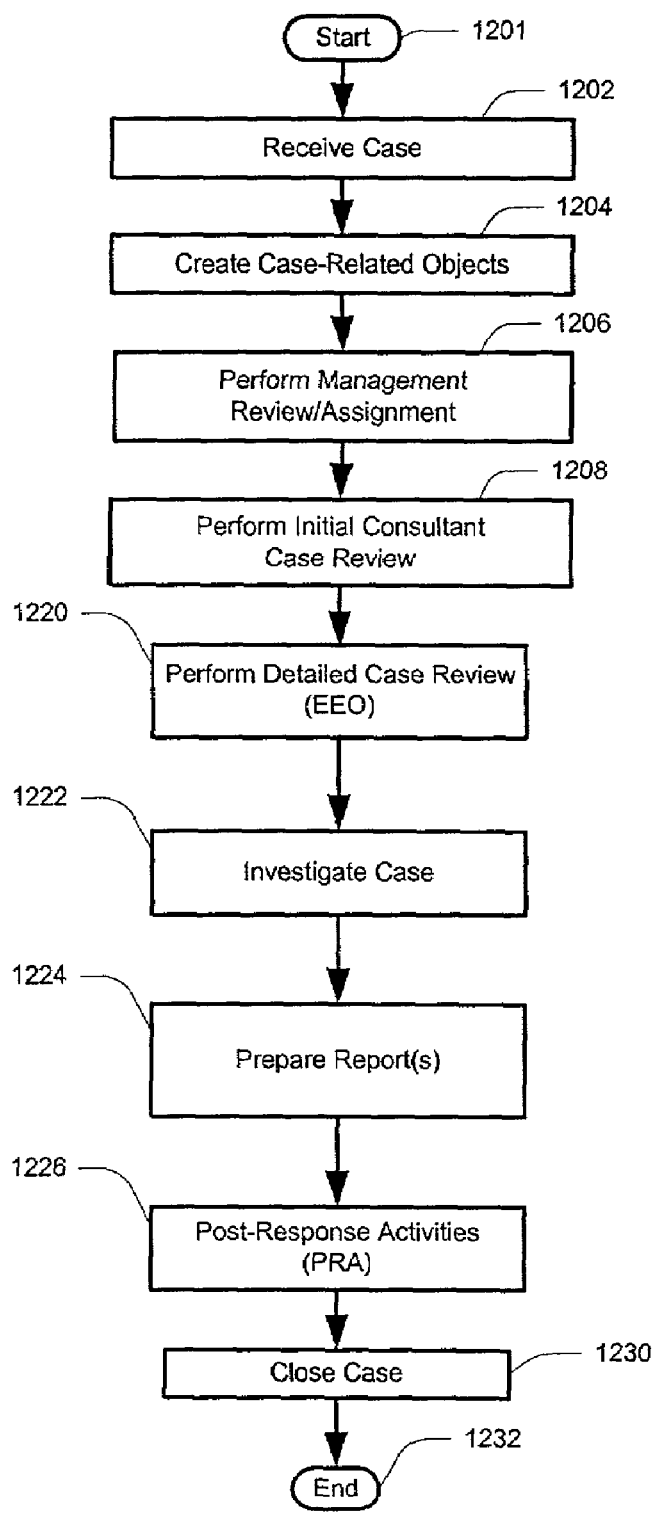
FIG. 12 is a flowchart illustrating the life cycle of a case according to the method of the present invention.

The lifecycle of a typical case is illustrated in FIG. 12. The method starts generally at step 1201. It should be noted that at any step within the method illustrated in FIG. 12, the case may settle, be reassigned, be closed by the client or be queried for a status check. In any one of those four instances mentioned previously, the method illustrated in FIG. 12 would immediately halt and execution would resume within the sub-methods for settling, reassigning, closing, or checking status. In the case of checking status, however, execution could resume at the point where the status check was called.

In the method according to FIG. 12, the case is received in step 1202. Next, case-related objects, such as the case object 402, the user object 420, etc., are instantiated and appropriate records committed to the database 110 and/or 112, in step 1204.

The purpose of the method illustrated in FIG. 12 is to depict the flow of business activity required to process complaints and agency charges with the operating organization. The business activity being accomplished via the present invention enables the receipt of a complaint or charge through any of the communications mechanisms supported by the present invention, including, but not limited to: telephone, facsimile and/or email.

Once the claim is submitted, a case object 402 (see FIG. 4) is created in the database of the present invention and displayed for review, typically by the management of the operating organization. Eventually, the case is assigned to a Consultant who is generally (although is not required to be) employed by the operating organization. The Consultant subsequently performs a review, investigation, and prepares one or more reports for the client of the operating organization (typically, the employer of the Complainant). The various reports can then be reviewed and/or approved by the client or local/state/federal agencies. The objects within the database of the present invention facilitate the storage, categorization, searching, and retrieval of the various documents used in the investigation and reporting. The objects and methods of the present invention also enable automatic docketing of various events and can generate, automatically, many of the reports as well as file (electronically) certain formal documents or reports to governmental agencies so that those government agencies will render their opinions and/or rulings. The Consultant then monitors and coordinates the complaint or charge case activities until the case is closed, i.e., the case_status_id property of the particular instance of the case object 402 is set to "Closed."

In step 1204, a new case object 402 is instantiated. This new object represents a submitted claim that is ready to be assigned and investigated within the present invention. In this step, case object 402 is the primary object; however, one or more related objects are also instantiated in order to capture and process related case information. FIG. 4 contains examples of objects that are set up for case status and tracking tasks. For example, in addition to the case object 402, a user 420, an employee object 424, an activity_jog object 422, an activity object 428, a case_calendar object 430, a case_status object 408, a content object 418, a case_note object 406, a settlement object 404, a related_case object 414, an employee_status object 410, a case_type object 416, and a te_counter object 436 are also instantiated.

The intake module 302 (see FIGS. 3 and 5) may have other critical objects that are also generally instantiated upon the creation of a new case, such as: a complaint object 432, a submission_type object 434, a charge object 502, a case_basis object 506, a basis object 508, an agency object 504, an agency_contact object 514, an address object 516, a case_issue object 510, and an issue object 512. Other objects in other modules, such as the client information module 316 (see FIGS. 3 and 11), and the Accounting module 308 (see FIGS. 3 and 7) are other modules (among others) that have new objects instantiated upon the creation of a new case.

Thereafter, in step 1206, a management review is conducted and one or more personnel are assigned to the case. Once the personnel are designated, appropriate objects, such as employee object 424 (see FIG. 4) are instantiated and appropriate records committed to the database 110 and/or 112. Next, in step 1208, an initial case review is conducted by a consultant. Then, in step 1220, a detailed case review is performed. Next, in step 1222, the case is investigated. In some cases, one or more reports can be prepared, using, for instance, report object 610. Thereafter, in step 1226, post-response activities ("PRA") are performed. The case is then closed in step 1230 and the method ends generally at step 1232.

Figure 13:
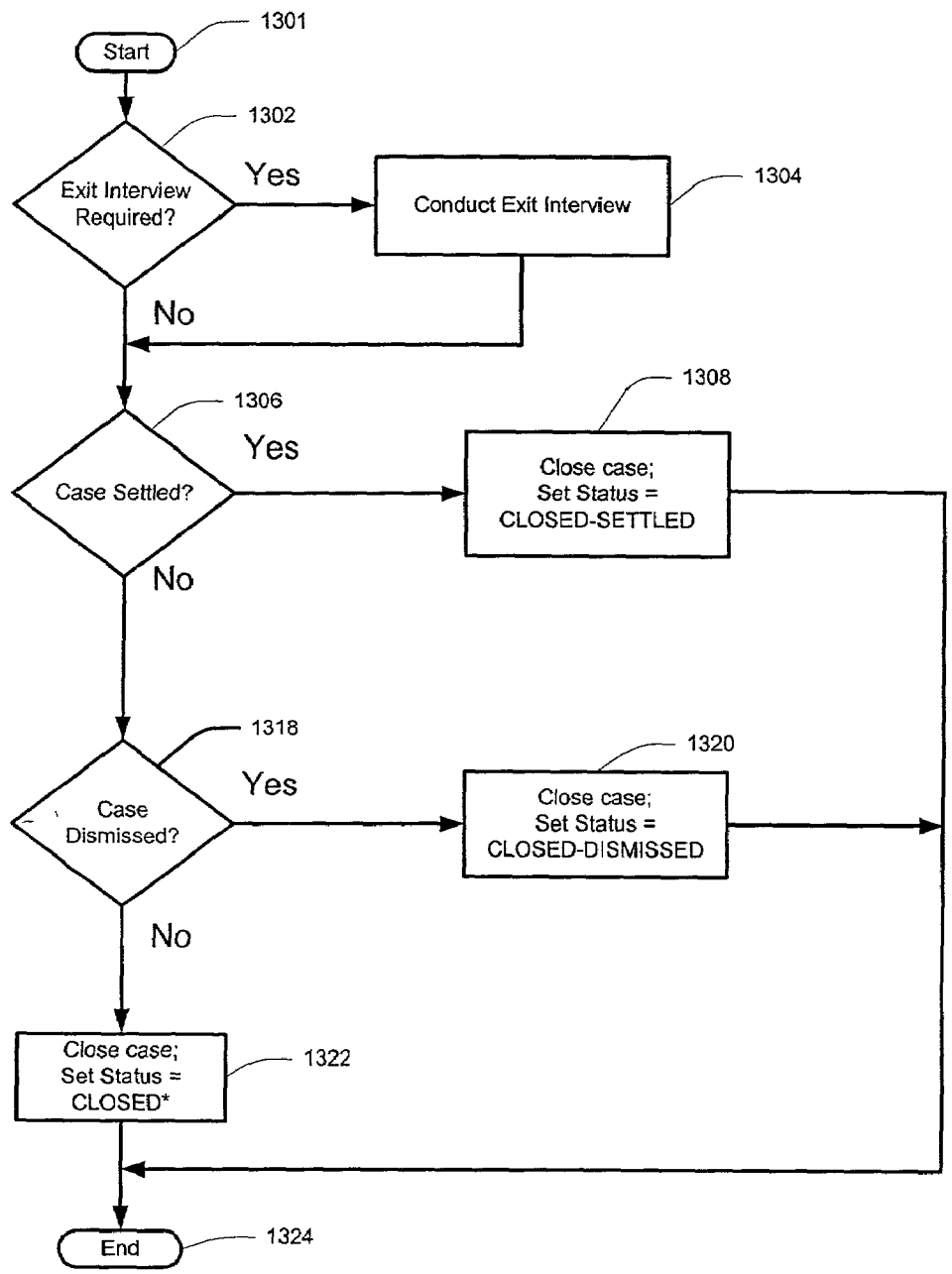
FIG. 13 is a flowchart illustrating the closing of a case of the method of the present invention.

The purpose of the close case flow diagram of FIG. 13 is to depict the flow of activities required by a Consultant to close a case in the present invention. The method of the present invention for closing an internal case requires that the Consultant conduct an exit interview if that particular client's protocol so mandates. The case closure of external cases may be through a settlement or dismissal with the Complainant in order to inform the Complainant of the final decision by the Client, Commission or Court. The case closure may be through a settlement or dismissal. Once a settlement decision has been determined, the closing of a case in the present invention requires several steps that involve the use of several objects within the database of the present invention.

In order to prohibit modification of documents in or for closed cases, the case_status_id property of the case object 402 may to be set to the "CLOSE" value. Once locked, any attempts to update or add new attachments to the case will be rejected. A user attempting to modify the case after closure will be notified that the case has been closed and locked from further changes. The present invention notifies all interested client personnel, the Consultant of the operating organization, and optionally, a Director of the operating organization that the case is closed.

Closing of a case will often affect those objects associated with the instance of the case object 402 that represents the case in question. For example, the status or disposition of instances of the case_status object 408, the user object 420, the user_type object 424, a status-history object 426, and a settlement object 404 may also be affected. Similarly, other objects in other modules may also be affected by the change of status of the case object 402.

The method illustrated in FIG. 13 starts generally at step 1301. A check is made at step 1302 to determine whether an exit interview is required. If so, an exit interview is conducted in step 1304 and the case is then closed in step 1322. If no exit interview is required because the case is external or the client does not require one, execution continues to step 1306. If so, then step 1308 is executed where a status property of, for example, the case object 402 that creates the association with the case_status object 408 (see FIG. 4), is set to indicate that the case was settled. Otherwise, execution continues to step 1318, where a check is made to determine whether the case was dismissed. If so, then step 1320 is executed where a property of, for example, the case_status object 408, is set to indicate that the case was dismissed. Steps 1318 and 1320 can encompass a variety of scenarios. The closure substatus of a case can differ depending upon the reasons for the closing of the case. For example, the case may be settled, in which case the substatus can be set to "SETTLED." Similarly, the substatus may be set to "CLOSED BY CLIENT" or "DISMISSED." Even a "DISMISSED" setting can have additional explanation, such as "no cause," "right to sue upon request," "administrative closure," or "failure of conciliation," depending upon the circumstances. The present invention has the flexibility and capacity to record this type of information, which is useful for compiling statistical information regarding a company's compliance or effectiveness of given laws and/or regulations.

If step 1318 is negative, step 1322 is executed where a property of, for example, the case_status object 408, is set to indicate that the case was simply closed and the method ends generally for all scenarios at step 1324.

Figure 14:
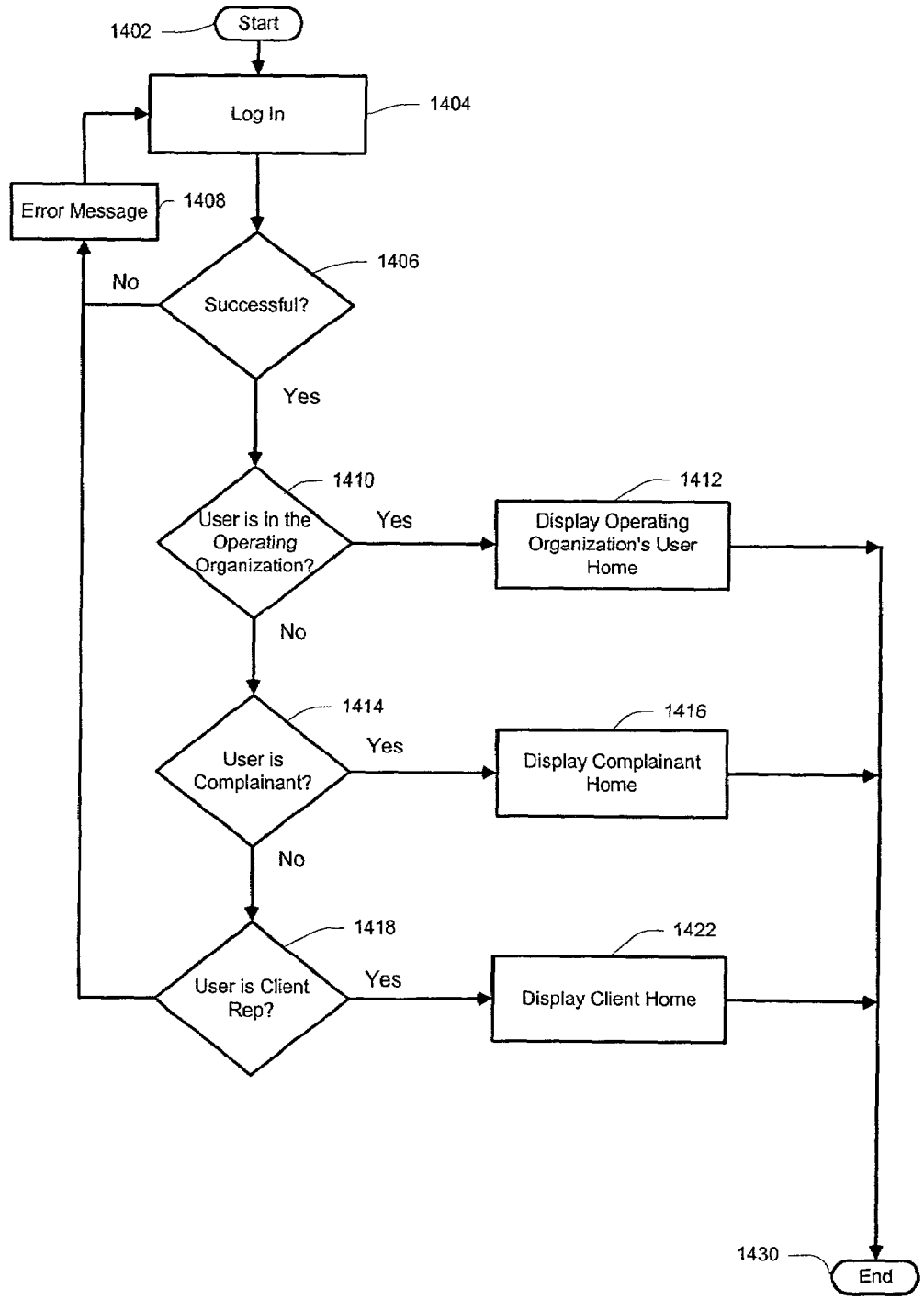
FIG. 14 is a flowchart illustrating the logging in and initial placement of a user according to the method of the present invention.

FIG. 14 illustrates the method of login and placement of the user within the present invention by acquiring access to the present invention via, for example, a web browser through a preferably secure connection. The present invention displays a login form that contains text boxes for the user's name (username) and password. After the appropriate username and password have been submitted and authenticated, the user, whether a Consultant, Complainant, or client representative, is provided a display of their respective home page.

The method illustrated in FIG. 14 begins generally at step 1402. When the user first sends an access request signal through a client device to the network 102 of the present invention (see FIG. 1), the user is challenged to provide (login) with, for example, a username and password to verify his/her identity (authentication), step 1404. A check is made to determine whether or not the response from the user to the challenge was successful, step 1406. If the response did not match an authenticated user, then an error message is displayed to the user in step 1408 and execution resumes back at step 1404, providing the user with another opportunity to login. If the response from the user matches, for example, the username/password of an authenticated user, then that user is granted access to the network 102 of the present invention and provided with an entry screen depending upon the level of authorization as described below.

In step 1410, a check is made to determine if the user to the system is an employee of the organization that operates the present invention (the "operating organization", e.g., an organization that conducts the investigations). If so, then step 1412 is executed, where the user is presented with the home page of the organization that owns the site. Otherwise, a check is made in step 1414 to determine if the user is a Complainant. If so, step 1416 is executed, where the user is presented with a home page relevant to Complainants in general, and optionally includes information that pertains to his/her case in particular. Otherwise, step 1418 is executed, where a check is made to determine if the user is a representative of the owning organization's client (i.e., client representative). If not, an error message is displayed to the user, step 1408, and the user is given an opportunity to re-authenticate, step 1404. Otherwise, i.e., the answer to step 1418 was positive, then the server will return a page designed for the client, step 1422. Once the pages have been returned (rendered) by the server, the method ends generally at step 1430.

A detailed explanation of step 1416 is provided to illustrate one of many features of the present invention. Step 1416 represents the present invention's method of displaying relevant information that is necessary for the Complainant, for example, to electronically submit a new complaint, to view their employer's relevant policies, and/or to view the status of a previous complaint that is stored within the database of the present invention. In the process of viewing documents, it is typical for the particular case object 402 to be referenced. The case object 402 will have links and associations with other instantiations of objects, such as case_document 916, that contains information about the document desired to be viewed by the user. Similarly, the case_status object 408 that is associated with the particular case object 402 (of the user's case) will also contain information that the user may wish to view. Other objects within one or more modules 300 (see FIG. 3) of the present invention, may be similarly accessed. Still other objects may affect control over one or more relevant object instances in order to govern the amount or type of information accessible by the user based on role information stored by, for example, the user_role object 602 and the role object 604.

Once the claim is submitted by the Complainant, the case manager will then proceed with case setup for further review and assignment to a Consultant for investigation. Once the case is under investigation the Complainant may return to his/her home page within the present invention in order to check the status of that case.

Figure 15:
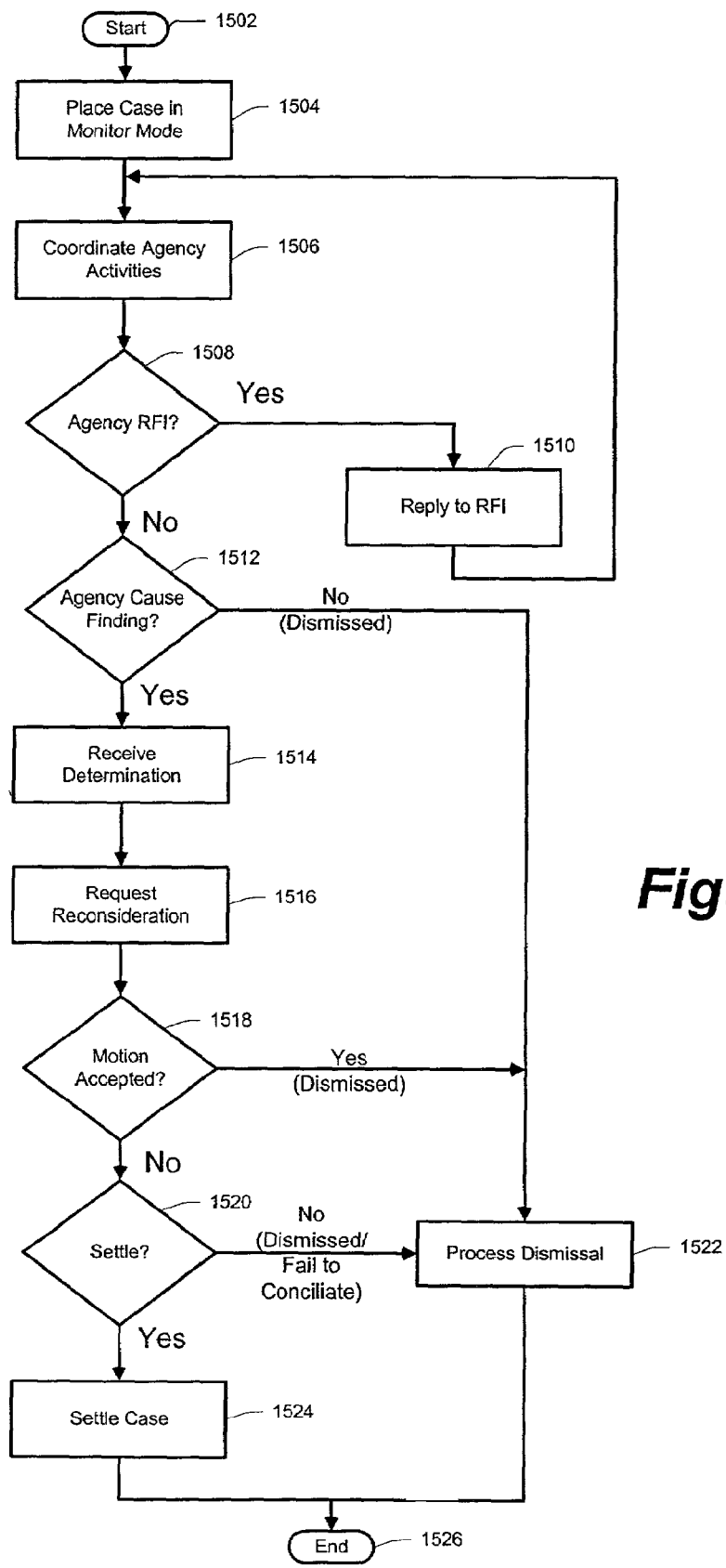
FIG. 15 is a flowchart illustrating the monitoring of a case according to the method of the present invention.

FIG. 15 depicts the methodology for monitoring a case once the case reports (generated via the present invention) have been approved by the client and submitted to the EEOC or FEP agency for a decision. The Consultant will coordinate agency activities and respond to appropriate requests for information (retrieved via the present invention) until the case is finally settled or dismissed.

The method of FIG. 15 starts generally at step 1502. First, the case object 402 is placed into "monitor" mode in step 1504, preferably by setting a property, such as the case_sub_status_id property to indicate monitor mode.

In step 1504, the case is placed in monitor mode for base-lining case progress and setting follow up reminders on the case calendar automatically by the present invention. Upon choosing the monitor case option, all of the case documentation or other artifacts will be locked in order to prohibit modification. Then the case_status_id property of the particular case object 402 will be set (updated) to "MONITOR." The present invention also notifies all interested client personnel, SJBC Consultant and SJBC Director that the case is being monitored. The names and addresses of those individuals involved are stored within specific object instances that are related to the specific case object 402 (see FIG. 4) within the database of the present invention. For example, a user object 420 that is associated with the case object 402 may have a client_ind property value set to indicate that the user represented by the user object 420 is a member of the client's organization for which a specific client_contact object 1102 (see FIG. 11) will have been instantiated. Information about client_contact's organization is stored in a client_hq object 1106 (see FIG. 11) associated with both the user object 420 and the client_contact object 1102. Similarly, address information for the client contact (and/or his/her organization) is stored in an address object 516 (see FIG. 5).

The Consultant may, using the objects in the alert module 310 of the present invention, proceed to schedule follow up reminders on the calendar of the present invention based on the client-required frequency. When calendaring an event, the Consultant will create and update a follow up event to include date, time, type, title and description that are modeled with objects within the present invention. The Consultant is also able to correspond with the client and other appropriate users via the present invention by, for example, email, telephone (VoIP), etc. As a starting point, correspondence is performed through pre-defined templates, such as those defined in an instance of the correspondence_template 902 (see FIG. 9) that is associated with, for example, the a case_type object 416 that is itself associated with the case object 402 (see FIG. 4) that are stored within the present invention. Typically, the Consultant modifies the template content as necessary and the present invention sends notification via email to selected recipients. Actual content is never sent over the Internet; instead, the notification will contain a secure URL to the correspondence that is stored within the database of the present invention. The notification recipient may then gain access to the present invention and view the correspondence in question.

Next, in step 1506, the activities of various agencies (designated in the objects of the agency module 302 of FIGS. 3 and 5) are coordinated. In step 1508, a check is made to determine if an RFI has been submitted by an agency. If so, then a reply to the RFI is prepared in step 1510 and execution is looped back to step 1506. Otherwise (i.e., the result of step 1508 is negative), execution moves forward to step 1512, where a check is made to determine whether an agency has made a cause finding or issued a dismissal. If the result of step 1512 is negative, then the dismissal is processed in step 1522. However, if there is a cause finding by the agency (i.e., the result of step 1512 is positive), then execution continues to step 1514, wherein a determination about the case is received from, for example, an external organization such as a government agency or outside investigator. Next, step 1516 is performed, where a reconsideration may optionally be requested by filing a motion to reconsider. In step 1518, a check is made to determine whether the motion for reconsideration was accepted. If so, then the case is dismissed and the dismissal is processed in step 1522 as illustrated in FIG. 15. If the motion to reconsider was not granted, then there is an opportunity to settle the case. Thus, in step 1520, a check is made to determine if the case was settled. If not, the case is either dismissed or there was a failure to conciliate so the case is processed as a dismissal in step 1522. Otherwise, the case is settled in step 1524.

Figure 16:
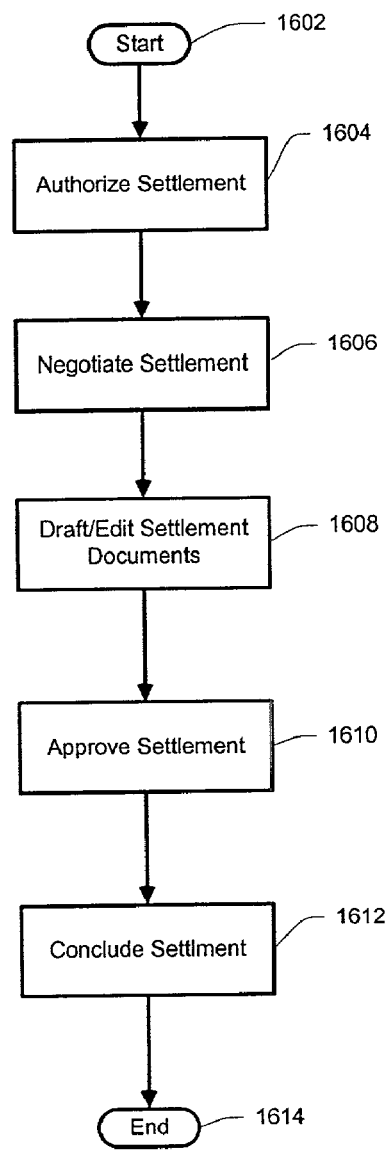
FIG. 16 is a flowchart illustrating the settlement of a case according to the method of the present invention.

FIG. 16 illustrates the methodology for achieving case settlement. This methodology entails several steps in order to authorize a settlement, negotiate settlement terms, and prepare settlement documents. Once the settlement documents and terms have been approved, the settlement process can be brought to a conclusion.

The method for settling a case is illustrated in FIG. 16. The method starts generally at step 1602. First, in step 1604, the settlement is authorized. Typically, this entails obtaining from the client the authorized limits (parameters) that the client is willing to tolerate to settle the case. Next, the settlement is negotiated in step 1606. Thereafter, settlement documents are drafted and/or edited in step 1608.

Step 1608 is an iterative method to draft separate document settlements for approval of all parties in the settlement process. One or more Consultants draft and/or edit settlement documents for review by the client and attach these documents to the particular case within the present invention. The present invention then emails the client to inform them that the settlement documents are available for review along with a URL indicating their specific location within the present invention. As this iterative process continues, the Consultant records events in the activity_jog object 422 that is associated with the particular case object 402 (see FIG. 4). Other objects in other modules, such as the correspondence distribution module 312 (see FIGS. 3 and 9) and the document distribution module (see FIGS. 3 and 10) also contain objects that represent or contain documents generated by users or by the present invention. Similarly, the alert distribution module 310 (see FIGS. 3 and 8) is used to coordinate the email alert to the client and other affected parties.

The documents are stored in the network 102 of the present invention using, for example, the case_document object 916 in order to maintain a complete set of information regarding the negotiations. Moreover, use of these objects enables linking of the documents to the case itself and all the attendant information about the case itself with, for example, the case object 402. The parties approve of the settlement in step 1610 and the settlement is concluded in step 1612, typically with the signing of one or more documents generated by the method and apparatus of the present invention. The method then ends generally at step 1614.

Figure 17:
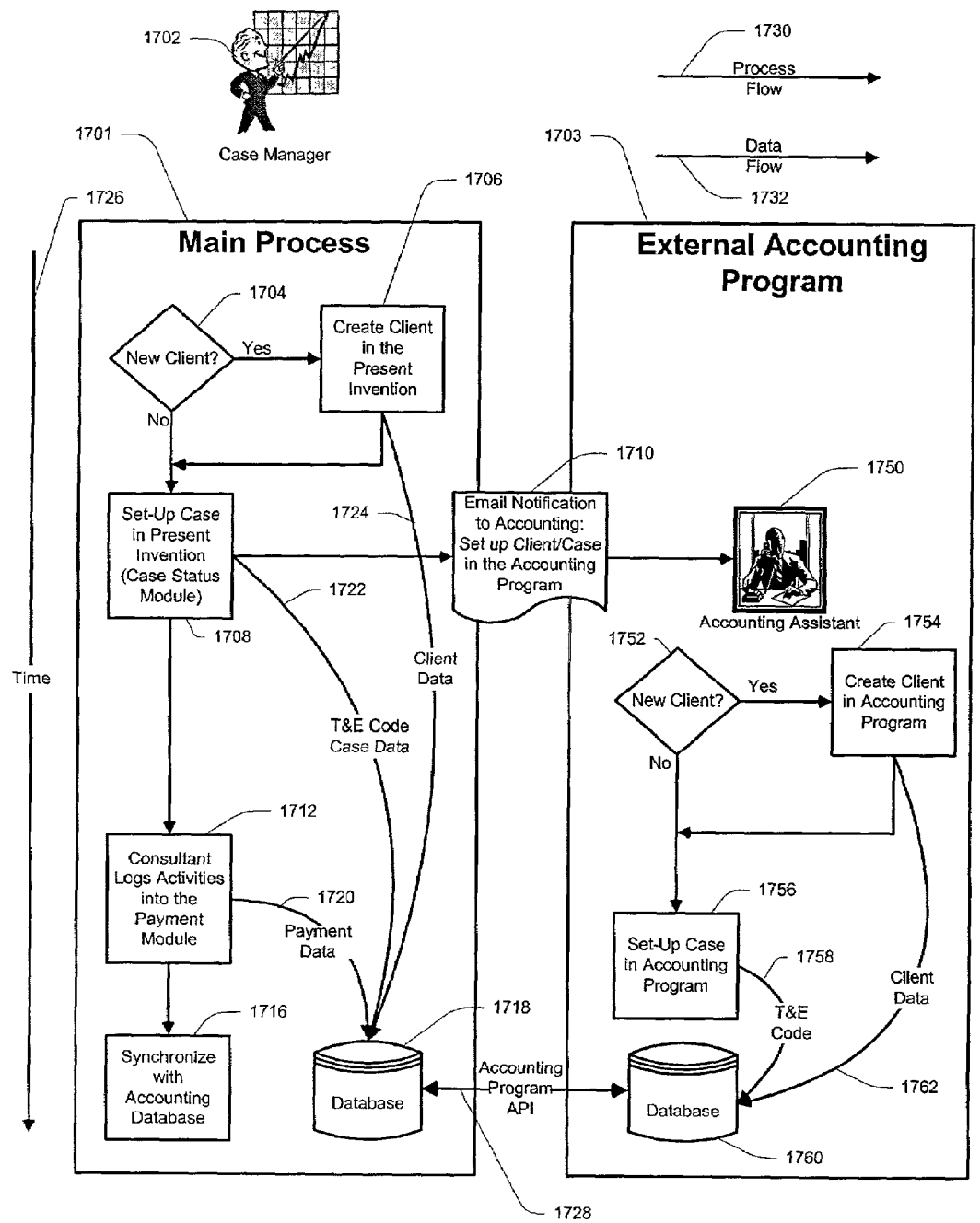
FIG. 17 is a use diagram illustrating the interface between the present invention and an accounting program.

FIG. 17 illustrates the methodology for electronically passing data between the present invention and the accounting program. This methodology follows several steps to synchronize case information in both systems relative to case TE codes, Consultant activity logged during the case investigation (through, for example, the activity_jog object 422), case invoice contents (through, for example, an instance of the invoice_master object 702) and case payment history (through, for example, in one or more instances of the payment object 704). This is accomplished through the implementation of automated (application) programming interface ("API") technology.

FIG. 17 illustrates the interface of the present invention with an accounting system. As illustrated in FIG. 17, two boxes 1701 and 1703 illustrate the main processes of the present invention and the external accounting program, respectively. The two boxes are arranged in parallel with a timeline 1726 indicating the emergence or instantiation of a particular sub-process in either the main process 1701 or the external accounting program 1703. Similarly, the process flow 1730 and the data flow 1732 go from left to right, indicating that, generally speaking, information flows from the main process 1701 to the external accounting program 1703. The case manager 1702, one of the users of the present invention, invokes the main process of the present invention. First, in step 1704, a check is made to determine whether the particular payment/invoice items are for a new client. If so, a set of objects specific to the new client are created in the present invention in step 1706. Next, in step 1708, the case is set-up within the present invention, specifically within the case status module 304 (see FIG. 3). Thereafter, in step 1710, a notification, preferably in the form of an email message is forwarded to the external accounting program 1703.

In step 1710, the present invention issues an email notification to the operating organization's accounting department that a new case has been set-up within the present invention. The accounting department will be provided with the necessary case information (stored in, for example, the case object 402) to enable them to set up a new case in the accounting program (such as TIMESLIPS) for case tracking, client invoicing and payment history. The automatic notification of the accounting personnel is facilitated by objects within the present invention, such as user object 420, employee object 424 and address object 516 that are associated with the particular case object 402 and store personnel-specific information. The particular alerting event is controlled by, for example, an alert object 802 that is associated with a role_alert object 606 (and a role object 604 and user_role object 602 that is associated with the particular user object 420 mentioned above). The alert object then issues the email message that is sent, via the e-mail server 218 (see FIG. 2) to a client device 212 such as PDA 122 via the network 120 (see FIG. 1).

The notification 1710 itself indicates that a new client/case has been set-up in the present invention and indicates that a similar set-up should be accomplished within the external accounting program. It will be understood that alternate mechanisms may be employed for the notification step as long as sufficient information is transferred to the external accounting program. The notification itself alerts an accounting assistant 1750, which may be a human being or may instead be an automated process with limited intelligence. As with the main process of the present invention, the external accounting system determines whether or not the client identified in the message 1710 is a new client. If so, a client record is created in the external accounting program 1703. Next, in step 1756, the case identified in the message 1710 is set-up in the external accounting program. Next, the TE code 1758 (specific to the case itself) and the client data 1762 are stored in the accounting system database 1760.

After the case has been set-up in the main process 1701 (i.e., step 1708 has been completed), the TE code for the case data 1722 as well as the client data 1724 are stored in the system database 1718 (corresponding to databases 110 and 112 of FIG. 1). Thereafter, in step 1712, the Consultant (a user of the present invention) logs activities into the payment module 308. Payment data 1720 can then be loaded into the database 1718 as illustrated in FIG. 17. Finally, in step 1716, the data in the database 1718 is synchronized with the data in the accounting database 1760.

The present invention includes a set of objects used for alerting individuals to various events, such as the assignment of a case, or some activity with a case. The present invention can retain a set of rules for alerting particular individuals, depending upon that individual's role within the case. As indicated before, the case object 402 is the main repository of information about a particular case. However, other objects, such as the role object 604, define the roles that individuals play within the system of the present invention. The alert objects within the alert distribution module 310 work in conjunction with the user object 420 of the case status module 304 and the role_alert object 606 of the roles module 306. This interaction is typical among the various objects of the present invention. All of the objects of the present invention facilitate this type of interaction.

The present invention provides alerts to individuals for instances including, but not limited to, the following:

When a case is assigned;
When a case is not reviewed;
When a case is inactive (for a set period.);
When case status changes;
When a new case is received;
When a new case set-up has been completed;
Upon availability of an invoice;
Upon receipt of an RFI;
Upon receipt of a report;
Upon receipt of a request made internally within a particular organization to close a case;
Upon termination of the case by a governmental or other agency;
Upon the closure of a case from an external authority;
Upon receiving a case;
Upon the completion of the setting-up of a case;
Upon the completion of one or more reports;
Upon the closure of a case made internally within a particular organization;
Upon a determination by a government agency regarding a case;
After an exit interview has been conducted;
After a lawsuit has been filed; and
Upon availability of an invoice.

Figure 18:
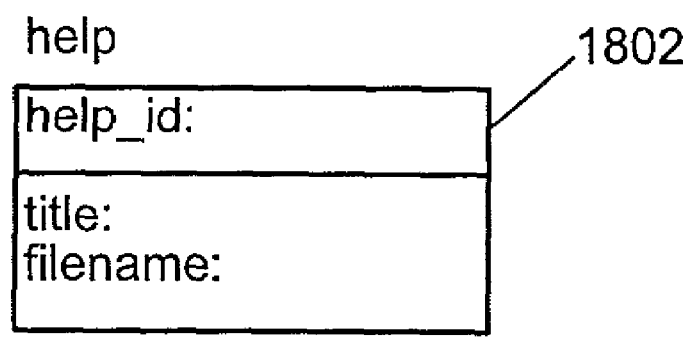
FIG. 18 illustrates a help object of the present invention.

FIG. 18 illustrates a help object of the present invention. The help object 1802 is used to provide context sensitive help to various aspects of the present invention. The help object 1802 has a help_id property, that uniquely identifies the specific help object within the database of the present invention. The help object also has a title property and a filename property as illustrated in FIG. 18. The title property is useful for both search catalog indexing (to identify a help category) and for human searching, to aid in finding the correct help information. The filename property is used to hold a URL or external file location address. The external file would hold the contents of the help information, preferably in HTML format for easy publishing by the web server to a browser that is employed by the user. Multiple instances of the help object 1802 can be instantiated and stored within the database of the present invention for various different help-related issues in order to provide comprehensive and context-sensitive help to users.

The present invention, therefore, is well adapted to carry out the objects and to attain both the ends and the advantages mentioned, as well as other benefits inherent therein. While the present invention has been depicted, described, and is defined by reference to particular embodiments of the invention, such references do not imply a limitation on the invention, and no such limitation is to be inferred. The invention is capable of considerable modification, alternation, alteration, and equivalents in form and/or function, as will occur to those of ordinary skill in the pertinent arts. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer network comprising:
   at least one client device operative with the computer network;
   at least one server, the server constructed and arranged to receive a request from at least one client device, the at least one server enabling the execution and operation of:
   a case status module;
   an intake module operative with the case status module;
   a role module operative with the case status module;
   an accounting module operative with the case status module;

an alert distribution module operative with the case status module and the role module;

a correspondence distribution module operative with the case status module;

a document distribution module operative with the correspondence distribution module; and a client information module, the client information module operative with the case status module, the client information module operative with the correspondence module, the client information module operative with the document distribution module, and the client information module operative with the agency module;

wherein, the modules on the server service the request from the client device.

2. The computer system as in claim 1, wherein the case status module comprises:
a settlement object;
a related_case object;
an employment_status object;
a case object;
a case_status object;
a case_note object;
a case_type object;
a content object;
a user object;
a te_counter object;
an activity_log object;
an employee object;
a status_history object;
an activity object; and
a case_calendar object.

3. The computer system as in claim 1 wherein the intake module comprises:
an issue object;
a case_issue object;
a basis object;
a case_basis object;
a charge object;
an agency_contact object;
a dismissal_type object;
a determination_type object;
a complaint object; and
a submission_type object;
an agency object; and
an address object.

4. The computer system as in claim 1 wherein the role module comprises:
a user_role object;
a role object;
a role_report object;
a report object; and
a role_alert object.

5. The computer system as in claim 1 wherein the alert distribution module comprises:
a user_alert object;
an alert object; and
an alert_history object.

6. The computer system as in claim 1, wherein the accounting module comprises:
an invoice_master object; and
a payment object.

7. The computer system as in claim 1 wherein the client information module comprises:
a client_contact object;
a client_hq object;
a client_division object;
a client_contacts object;
a client_note object;
a union_type object;
a client_union object;
a client_location object;
a sic object; and
a client_sic object.

8. The computer system as in claim 1 wherein the document distribution module comprises:
a document_template object;
a client_document-recipient object;
a document_distribution object; and
a client_document object.

9. The computer system as in claim 1 wherein the correspondence distribution module comprises:
a correspondence_template object;
a client_correspondence_recipient object;
a client_correspondence object;
a case_correspondence object;
a correspondence_distribution object;
an approval_status object; and
a case_document object.

10. The computer system as in claim 1 the computer system further having a help object.

11. The computer system as in claim 2 wherein the settlement object comprises:
a settlement_id property;
a range_lower property;
a range_upper property;
a range_desc property;
a settlement_date property;
a demanded_amount property;
a demand_desc property;
an actual_amount property; and
an actual_desc property.

12. The computer system as in claim 2 wherein the related_case object comprises:
a case_id_2 property;
a case_id_1 property; and
a relationship_desc property.

13. The computer system as in claim 2, wherein the employment_status object comprises:
an emp_status_id property; and
a status-name property.

14. The computer system as in claim 3, wherein the dismissal_type object comprises:
a dismissal_type_id property;
a type_name property; and
an active_ind property.

15. The computer system as in claim 2, wherein the case object comprises:
a case_id property;
a client_location_id property;
an emp_status_id property;
a case_type_id property;
a complaint_id property;
a case_manager-user_id property;
a case_status_id property;
a case_sub_status_id property;
a dismissal_type_id property;
a settlement_id property;
a ts_cliinfo_record_id property;
a consultant_user_id property;
a case_number property;
a te_code property;
a rate property;
a rate_type property;

a date_reactivated property;
a date_closed property;
a report_due_date property;
an insurance_claim_no property;
a court_filing_date property;
a court_state property;
a court_circuit property;
a date_added property;
a date_modified property;
an added_by property;
a modified_by property;
a first_name property;
a last_name property;
a complaint property;
a date_received property;
a job_title property; and
a title property.

16. The computer system as in claim 2, wherein the case_status object comprises:
    a case_status_id property;
    a complainant_content_id property;
    a status_name property;
    a sort_sequence property;
    a closure_ind property;
    a parent_status_id property;
    an active_ind property;
    a temp_active_ind property;
    a client_status property;
    a status_desc property; and
    an abbreviation property.

17. The computer system as in claim 2, wherein the case_note object comprises:
    a case_note_id property;
    a case_id property;
    a note property;
    a user_id property; and
    a note_date property.

18. The computer system as in claim 2, wherein the case-type object comprises:
    a case_type_id property;
    a case_type_name property; and
    an abbreviation property.

19. The computer system as in claim 2, wherein the content object comprises:
    an id property;
    a description property;
    a language property; and
    a body property.

20. The computer system as in claim 2, wherein the user object comprises:
    an id property;
    a client_hq_id property;
    a last_name property;
    a first_name property;
    a middle name property;
    a prefix property;
    a suffix property;
    a username property;
    a password property;
    an employee_ind property;
    an email property;
    a last_visited property;
    a visit_count property;
    a client_ind property;
    a locked_ind property; and
    a status_code property.

21. The computer system as in claim 2, wherein the activity_log object comprises:
    an activity_log_id property;
    an actor_user_id property;
    an activity_date property;
    an activity_id property;
    a case_id property;
    an invoice_id property;
    an activity_description property;
    a time_spent property;
    a ts_description property;
    a ts_task-code property;
    a billable_ind property;
    an exported_ind property;
    an export_date property; and
    a ts_slip_id property.

22. A computer system as in claim 2, wherein the employee object comprises:
    an employee_id property;
    a supervisor_user_id property;
    an employee_user_id property;
    an initials property;
    a title property;
    an education property;
    a background property;
    a date_hired property;
    a work_hours property;
    a friday_group property;
    a special_projects property;
    an active_case_count property;
    a rating property;
    a ts_nickname_1 property;
    a ts_nickname_2 property; and
    a ts_name-id property.

23. A computer system as in claim 2, wherein the status_history object comprises:
    an entity_id property;
    an entity_name property;
    a date_modified property;
    a user_id property; and
    a status_code property.

24. A computer system as in claim 2, wherein the activity object comprises:
    an activity_id property;
    a case_sub_status_id property;
    a case_status_id property;
    an activity_name property;
    an activity_description property;
    a ts_task-code property;
    a sort_sequence property;
    an activity_sequence property; and
    a locked_ind property.

25. A computer system as in claim 2, wherein the case_calendar object comprises:
    a calendar_id property;
    a case_id property;
    a user_id property;
    an activity_id property;
    an event_date property;
    a description property;
    a closed_ind property; and
    an event_title property.

26. The computer system as in claim 3, wherein the complaint object comprises:
    a complaint_id property;
    a submission_user_id property;
    a submission_type_id property;

a complainant_first_name property;
a complainant_last_name property;
a work_address_id property;
a complaint property;
a client_hq_id property;
a job_title property;
a note property;
a date_reported property;
a report_recipient property;
a client_action property;
a sjbc_action property;
a submission_no property;
a submission_date property;
an emp_name property;
an emp_division property;
an emp_location property;
a status_code property; and
a complainant_contact_times property.

27. The computer system as in claim 3, wherein the submission-type object comprises:
a submission_type_id property;
a type_name property; and
a description property.

28. The computer system as in claim 3, wherein the issue object comprises:
an issue_id property; and
an issue_name property.

29. The computer system as in claim 3, wherein the case_issue object comprises:
an issue_id property;
a case_id property; and
an agency_id property.

30. The computer system as in claim 3, wherein the basis object comprises:
a basis_id property; and
a basis_name property.

31. A computer system as in claim 3, wherein the case_basis object comprises:
a basis_id property;
a case_id property; and
an agency_id property.

32. A computer system as in claim 3, wherein the charge object comprises:
an agency_id property;
a case_id property;
an agency_contact_id property;
a determination_type_id property;
a resolution_date property;
a primary_ind property;
a dated_filed property;
a note property;
a determination_date property;
a date_reopened property;
a charge_no property; and
a class_action_ind property.

33. The computer system in claim 3, wherein the agency_contact object comprises:
an agency_contact_id property;
an agency_id property;
an address_id property;
a last_name property;
a first_name property;
a title property;
an investigator_ind property;
an executive_ind property;
a notes property; and
a status-code property.

34. The computer system as in claim 3, wherein the agency object comprises:
an agency_id property;
an address_id property;
an agency_name property;
an agency_type property;
a director_name property;
a url property;
a status_code property;
a time_zone property; and
a notes property.

35. The computer system as in claim 3, wherein the address object comprises:
an address_id property;
an address_1 property;
an address_2 property;
an address_3 property;
a city property;
a state property;
a postal_code property;
a phone property;
an extension property;
a fax property;
an email property;
an addressee_name property;
an aux_phone property;
an aux_phone_note property;
a home_address_ind property; and
a home_phone property.

36. The computer system as in claim 4, wherein the user_role object comprises:
a user_id property; and
a role_id property.

37. The computer system as in claim 4, wherein the role object comprises:
a role_id property;
a role_title property;
a role_name property;
a role_desc property;
an employee_ind property; and
a client_ind property.

38. The computer system as in claim 4, wherein the role-report object comprises:
a report_id property; and
a role_id property.

39. The computer system as in claim 4, wherein the report object comprises:
a report_id property;
a report_title property; and
an orientation property.

40. The computer system as in claim 4, wherein the role_alert object comprises:
an alert_id property; and
a role_id property.

41. The computer system as in claim 5, wherein the user_alert object comprises:
a user_id property; and
an alert_id property.

42. The computer system as in claim 5, wherein the alert object comprises:
an alert_id property;
an alert_name property;
an alert_desc property;
an alert_message property;
an alert_title property;
an alert_subject property;

an email_ind property; and
a website_ind property.

43. The computer system as in claim 5, wherein the alert_history object comprises:
an alert_history_id property;
an alert_id property;
a user_id property;
an alert_subject property;
an alert_body property;
a date_added property;
a date_sent property; and
a date_viewed property.

44. The computer system as in claim 6, wherein the invoice-master object comprises:
an invoice_id property;
a case_id property;
a start_date property;
an end_date property;
an invoice_date property;
a ts_record-id property;
a fee_amount property;
an expense_amount property; and
a pif_ind property.

45. The computer system as in claim 6, wherein the payment object comprises:
a payment_id property;
an invoice_id property;
a payment_no property;
an authrorizing_user_id property;
a paid_amount property;
a payment_date property;
a note property; and
a payment_type property.

46. The computer system as in claim 7, wherein the client_contact object comprises:
a client_contact_id property;
a user_id property;
an address_id property;
a title property;
an active_ind property; and
a status_code property.

47. The computer system as in claim 7, wherein the client-hq object comprises:
a client_hq_id property;
an address_id property;
a client_name property;
a client_name_short property;
a display_name property;
a client_type property;
a client_dba_name property;
a file_number-prefix property;
a file_number_counter property;
an aliases property;
a products_services property;
a president_name property;
a url property;
a ceo_name property;
a state_federal_contract_ind property;
an employee_count property;
a corporate_union-ind property;
a time_zone property;
an incorporation-state property;
an rfi_turnaround property;
a ps_turnaround property;
a followup_period property;
an update_period property;
a witness_interview-ind property;
an int_rate property;
an int_rate-type property;
an ext_rate property; and
an ext_rate-type property.

48. A computer system as in claim 7, wherein the client-division object comprises:
a client_division_id property;
a client_hq-id property;
an address_id property;
a client_name property;
a client_name_short property;
a display_name property;
a client_type property;
a file_number-prefix property;
a time_zone property;
an rfi_turnaround property;
a ps_turnaround property;
a followup_period property;
an update_period property;
a witness_interview-ind property;
an exit_interview-ind property;
an int_rate property;
an int_rate-type property;
an ext_rate property; and
an ext_rate_type property.

49. A computer as in claim 7, wherein the client_contacts object comprises:
a client_contacts_id property;
a client_hq_id property;
a client_contact_id property;
a client_location_id property;
a client_division_id property;
a bill_to_ind property;
a primary_poc_ind property;
an ap_poc_ind property;
an active_ind property;
a status_code property; and
a bill_to_cc_ind property.

50. A computer system as in claim 7, wherein the client_note object comprises:
a client_note_id property;
a client_location_id property;
a client_division_id property;
a client_hq_id property;
a note property;
a user_id property; and
a note_date property.

51. A computer system as in claim 7, wherein the union_type object comprises:
a union_type_id property;
a name property;
an abbreviation property; and
a url property.

52. A computer system as in claim 7, wherein the client_union object comprises:
a union_type_id property;
a client_location-id property;
a client_division-id property;
a client_hq-id property;
an address_id property;
a local_number property;
a url property;
a cba_online_ind property; and
an abbreviation property.

53. A computer system as in claim 7, wherein the client_location object comprises:

a client_location_id property;
a client_hq_id property;
a client_division_id property;
an address_id property;
a client_name property;
a client_name_short property;
a display_name property;
a policy_number property;
a policy_deductible property;
a client_type property; and
a time_zone property.

54. A computer system as in claim 7, wherein the sic object comprises:
a sic_code_id property;
a sic_name property;
a sic_description property; and
a sic_code property.

55. A computer system as in claim 7, wherein the client_sic object comprises:
a client_hq_id property; and
a sic_code_id property.

56. A computer system as in claim 2, wherein the te_counter object comprises:
a counter property.

57. A computer system as in claim 8, wherein the document_template comprises:
a document_template-id property;
a document_title property;
a filename property;
a version property;
an open_date property;
a close_date property; and
an active_ind property.

58. A computer system as in claim 8, wherein the client_document object comprises:
a client_document_id property;
a client_division_id property;
a client_hq_ind property;
a document_template_id property;
a document_title property;
a required_ind property;
a hardcopy_ind property;
a hardcopy_distribution_method property; and
an approval_ind property.

59. A computer system as in claim 8, wherein the document-distribution object comprises:
a document_distribution_id property;
an approval_status property;
a document_id property;
a client_contact_id property;
a view date property;
a response_date property;
a response property;
an approval_ind property; and
a date_added property.

60. A computer system as in claim 8, wherein the client_document_recipient object comprises:
a document_template_id property;
a client_contact_id property;
an approval_ind property; and
a copied_ind property.

61. A computer system as in claim 9, wherein the correspondence_template object comprises:
a correspondence_template_id property;
a case_type_id property;
a correspondence_name property;
a body property;
a subject property;
an open_date property;
a document_ind property;
a close_date property; and
an active_ind property.

62. A computer system as in claim 9, wherein the client_correspondence-recipient object comprises:
a correspondence_template_id property; and
a client_contact_id property.

63. A computer system as in claim 9, wherein the client-correspondence object comprises:
a client_correspondence_id property;
a correspondence_template_id property;
a client_hq_id property;
a client_division_id property; and
a required_ind property.

64. A computer system and in claim 9, wherein the case-correspondence object comprises:
a correspondence_id property;
a correspondence_template-id property;
a case_id property;
a date_added property;
a body property;
a subject property; and
an added_by property.

65. A computer system as in claim 9, wherein the correspondence_distribution object comprises:
a correspondence_distribution_id property;
a correspondence_id property;
a client_contact_id property;
a view_date property;
a response_date property; and
a response property.

66. A computer system as in claim 3, wherein the determination-type object comprises:
a determination_type_id property;
a type_name property; and
an active_ind property.

67. A computer system as in claim 9, wherein the approval_status object comprises:
an approval_status_id property;
a status_name property; and
an active_ind property.

68. A computer system as in claim 9, wherein the case_document object comprises:
a document_id property;
an approval_status_id property;
a case_id property;
a document_template-id property;
a date_approved property;
a locked_ind property;
an override_by property;
an override_reason property;
a date_added property;
an added_by property;
a date_modified property;
a modified_by property;
a filename property;
a document_title property; and
an offline_ind property.

69. A computer system as in claim 10, wherein the help object comprises:
a help_id property;
a title property; and
a filename property.

70. The method as in claim 69, wherein the step of closing the case comprises:

determining if an exit review is required and, if so, conducting the exit review;
determining if the case has settled;
if the case has settled, then setting a status property in one of the case-related objects to indicate the case has settled, otherwise, determining if the case has been dismissed; and
if the case has been dismissed, then setting the status property in one of the case-related objects to indicate the case has been dismissed, otherwise, setting the status property in one of the case-related objects to indicate the case has been closed.

71. The computer system as in claim 10, wherein the help object comprises:
a help_id property;
a title property; and
a filename property.

72. A computer network comprising:
at least one client device operative with the computer network;
at least one server, the server constructed and arranged to receive a request from the at least one client device, the at least one server enabling the execution and operation of:
a case status module comprising:
one or more case objects;
a settlement object associated with one or more case objects;
one or more case_note objects associated with one of the case objects;
a case_status object associated with one or more case objects;
an employment_status object associated with one or more case objects;
one or more related_case objects associated with a case object;
a case_type object associated with one or more case objects;
a content object associated with one or more case_status objects;
a te_counter object;
one or more user objects associated with one or more case objects;
one or more activity_log objects associated with one of the case objects, and one or more activity_log objects associated with one of the user objects;
one or more employee objects associated with one of the user objects;
one or more status_history objects associated with one of the user objects;
one or more activity objects associated with one of the case_status objects, and one of the activity objects associated with one or more activity_log objects;
one or more case_calendar objects associated with one of the activity objects, one or more of the case_calendar objects associated with one of the user objects, and one or more of the case_calendar objects associated with one of the case objects;
an intake module operative with the case status module comprising:
a dismissal_type object associated with one or more case objects;
one or more complaint objects, one of the complaint objects associated with one or more of the case objects;
a submission_type object associated with one or more of the complaint objects;
one or more charge objects, one or more of the charge objects associated with one of the case objects, one or more of the charge objects associated with the dismissal_type object, and one or more of the charge objects associated with one of the case_status objects;
one or more agency objects, one of the agency objects associated with one or more of the charge objects;
one or more case_basis objects, one or more of the case-basis objects associated with one of the case objects, one or more of the case-basis objects associated with one of the agency objects;
a basis object, the basis object associated with one or more of the case_basis objects;
one or more case_issue objects, one or more of the case_issue objects associated with one of the agency objects, and one or more of the case_issue objects associated with one of the case objects;
an issue object, the issue object associated with one or more of the case_issue objects;
one or more agency_contact objects, one or more of the agency_contact objects associated with one of the agency objects, one of the agency_contact objects associated with one or more of the charge objects;
a determination-type object associated with one or more charge objects; and
an address object, the address object begin associated with one or more of the agency_contact objects, and the address object associated with one or more of the agency objects;
a role module operative with the case status module, the role module comprising:
one or more user_role objects, one or more of the user-role objects associated with the user object of the case status module;
a role object, the role object associated with one or more of the user_role objects;
one or more role_alert object, one or more of the role-alert objects associated with the role object;
one or more role_report objects, one or more of the role_report objects associated with the role object; and
a report object, the report object associated with one or more of the role-report objects;
an accounting module operative with the case status module comprising:
one or more invoice_master objects, one of the invoice_master objects associated with one of the activity_log objects, and one or more invoice_master objects associated with a case object;
one or more payment objects, one or more of the payment objects associated with one of the user objects, one or more of the payment objects associated with one of the invoice_master objects;
an alert distribution module operative with the case status module comprising:
a alert object, the alert object associated with one or more of the role_alert objects of the role module;
one or more alert_history objects, one or more of the alert_history objects associated with the alert object, one or more of the alert_history objects associated with the one or more of the user objects; and one or more user_alert objects, one or more of the user_alert objects associated with one of the alert objects, and one or more of the user_alert objects associated with one of the user objects;

a correspondence distribution module operative with the case status module comprising:

one or more correspondence-template objects, one or more of the correspondence_template objects associated with the case-type object;

one or more client_correspondence_receipient objects; one or more of the client_correspondence_receipient objects associated with one of the correspondence_template objects;

one or more client_correspondence objects, one or more of the client_correspondence objects associated with one of the correspondence_template objects;

one or more case_correspondence objects, one or more of the case_correspondence objects associated with one of the case objects of the case status module, and one or more of the case_correspondence objects associated with one of the correspondence-template objects;

one or more correspondence-distribution objects, one or more of the correspondence_distribution objects associated with one of the case_correspondence objects;

an approval_status object; and one or more case_document objects, one or more of the case_document objects associated with one of the case objects, and one or more of the case_document objects associated with the approval_status object;

a document distribution module operative with the correspondence distribution module comprising:

a document-template object, the document-template object associated with one or more case_document objects;

one or more client_document-recipient object, one or more of the client_document_recipient objects associated with the document_template;

one or more client_document objects, one or more of the client_document objects associated with the document-template object; and one or more document_distribution objects, one or more of the document_distribution objects associated with one of the approval-status objects, and one or more of the document_distribution objects associated with one of the case_document objects; and a client information module, the client information module operative with the case status module, the correspondence module, and the document distribution module, the client information module comprising:

one or more client_contact objects, one of the client_contact objects associated with one or more of the correspondence_distribution objects, one of the client_contact objects associated with one or more of the complaint objects, one or more of the client_contact objects associated with the address object, one or more of the client_contact objects associated with one of the user objects, and one of the client_contact objects associated with one or more of the document_distribution objects;

one or more client_division objects, one of the client_division objects associated with one or more client_correspondence objects, one of the client_division objects associated with one or more client_document objects, and one or more of the client_division objects associated with one of the address objects of the agency module;

one or more client_hq objects, one of the client_hq objects associated with one or more user objects, one of the client-hq objects associated with one or more of the client_division objects, one or more of the client_hq objects associated with the address object, one of the client-hq objects associated with one or more client_correspondence objects, and one of the client_hq objects associated with one or more of the client_document objects;

one or more client_sic objects, one or more of the client-sic objects associated with one of the client_hq objects;

a sic object, the sic object associated with one or more of the client_sic objects;

one or more client_location objects, one or more of the client_location objects associated with one of the client_hq objects, one or more of the client_location objects associated with one of the client_division objects, one of the client_location objects associated with one or more case objects, and one or more client_location objects associated with the address object;

one or more client_note objects, one or more of the client-note objects associated with one of the client_hq objects, one or more of the client_note objects associated with one of the client_location objects, and one or more of the client_note objects associated with one of the client_division objects;

one or more client_contacts objects, one or more of the client_contacts objects associated with one of the client_contact objects, one or more of the client_contacts objects associated with one of the client_division objects, one or more of the client_contacts associated with one of the client_hq objects, one or more of the client_contacts objects associated with one of the client_location objects, one of the client_contacts objects associated with one or more of the client_correspondence_recipient objects, and one of the client-contacts objects associated with one or more of the client_document_recipient objects;

one or more client_union objects, one or more of the client_union objects associated with one of the client_hq objects, one or more of the client_union objects associated with one of the client_division objects, one or more of the client_union objects associated with the address object, and one or more of the client_union objects associated with one of the client_location objects; and a union_type object, the union_type object associated with one or more of the client_union objects;

wherein, the modules on the server service the request from the client device.

* * * * *

UNITED STATES PATENT AND TRADEMARK OFFICE
CERTIFICATE OF CORRECTION

PATENT NO. : 6,985,922 B1
DATED : January 10, 2006
INVENTOR(S) : Janet Emerson Bashen et al.

It is certified that error appears in the above-identified patent and that said Letters Patent is hereby corrected as shown below:

<u>Title page,</u>
Item [75], Inventors, should read -- Janet Emerson Bashen, Houston, TX (US)
G. Steven Bashen, Houston, TX (US)
Marjana Lindsey Roach, Houston, TX (US)
Donnie Moore, Deluth, GA (US) --.

Signed and Sealed this

Twenty-fifth Day of April, 2006

JON W. DUDAS
*Director of the United States Patent and Trademark Office*